United States Patent
Wang et al.

(10) Patent No.: US 12,255,711 B2
(45) Date of Patent: Mar. 18, 2025

(54) METHOD FOR DETERMINING FULL-POWER TRANSMISSION CODEBOOK SUBSET AND DEVICE

(71) Applicant: Huawei Technologies Co., Ltd., Shenzhen (CN)

(72) Inventors: Bichai Wang, Beijing (CN); Xueru Li, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 21 days.

(21) Appl. No.: 18/547,577

(22) PCT Filed: Dec. 22, 2021

(86) PCT No.: PCT/CN2021/140338
§ 371 (c)(1),
(2) Date: Aug. 23, 2023

(87) PCT Pub. No.: WO2022/179276
PCT Pub. Date: Sep. 1, 2022

(65) Prior Publication Data
US 2024/0195470 A1 Jun. 13, 2024

(30) Foreign Application Priority Data
Feb. 24, 2021 (CN) .......................... 202110209125.5
Mar. 31, 2021 (CN) .......................... 202110349886.0

(51) Int. Cl.
*H04B 7/06* (2006.01)
*H04B 7/0404* (2017.01)
*H04B 7/0456* (2017.01)

(52) U.S. Cl.
CPC ......... *H04B 7/0602* (2013.01); *H04B 7/0404* (2013.01); *H04B 7/0481* (2023.05)

(58) Field of Classification Search
CPC ... H04B 7/0602; H04B 7/0481; H04B 7/0404
See application file for complete search history.

(56) References Cited

U.S. PATENT DOCUMENTS

| | | | |
|---|---|---|---|
| 11,044,120 B2* | 6/2021 | Davydov | H04B 7/0617 |
| 2020/0267661 A1 | 8/2020 | Park et al. | |
| 2021/0050890 A1* | 2/2021 | Park | H04W 72/23 |
| 2021/0314037 A1* | 10/2021 | Rahman | H04L 25/0226 |

OTHER PUBLICATIONS

QUALCOMM Inc., Full Tx power for UL transmissions, 3GPP TSG RAN WG1 Meeting #95, Nov. 12-16, 2018 (Year: 2018).*

* cited by examiner

*Primary Examiner* — Freshteh N Aghdam
(74) *Attorney, Agent, or Firm* — Slater Matsil, LLP

(57) ABSTRACT

In a method, a terminal device reports, to a network device, a full-power transmission codebook subset corresponding to a frequency band supported by the terminal device before transmission channel switching. The network device or the terminal device in a communications system may determine, according to a specified rule and full-power transmission codebook subsets corresponding to a plurality of source frequency bands, a full-power transmission codebook subset corresponding to a target frequency band after transmission channel switching. The plurality of source frequency bands are frequency bands in which a plurality of target antenna ports are located before antenna port switching, and the plurality of target antenna ports are antenna ports in the target frequency band after antenna port switching.

20 Claims, 6 Drawing Sheets

METHOD FOR DETERMINING FULL-POWER TRANSMISSION CODEBOOK SUBSET AND DEVICE

CROSS-REFERENCE TO RELATED APPLICATIONS

This application is a National Stage of International Application No. PCT/CN2021/140338, filed on Dec. 22, 2021, which claims priorities to Chinese Patent Application No. 202110209125.5, filed on Feb. 24, 2021, and Chinese Patent Application No. 202110349886.0, filed on Mar. 31, 2021, which are incorporated herein by references in their entireties.

TECHNICAL FIELD

This application relates to the field of communications technologies, and in particular, to a method for determining a full-power transmission codebook subset and a device.

BACKGROUND

With diversified development of services such as the mobile Internet and the Internet of Things, a mobile communications system has an increasingly high requirement for uplink transmission of massive data. For example, services such as ultra-high definition video, intelligent monitoring, virtual reality (Virtual Reality, VR), and video live broadcast require a relatively large uplink (uplink, UL) capacity.

In the mobile communications system, a multiple-transmission capability gradually becomes an important configuration of a radio frequency capability of a terminal device. The terminal device having the multiple-transmission capability has a plurality of transmission channels, and each transmission channel includes an antenna port, so that the terminal device can separately transmit radio frequency signals by using the plurality of transmission channels. Signal transmission efficiency of the terminal device is directly related to transmit power of a transmission channel. However, because the terminal device usually needs to be in close contact with a human body, to avoid radiation hazards, transmit power of the terminal device is strictly limited. In addition, sub-6 GHz commercial frequency bands in a current mainstream 5th generation (5th Generation, 5G) mobile communications system are mainly medium- and high-frequency bands such as 2.6 GHz, 3.5 GHz, and 4.9 GHz, and a time division duplex (time division duplex, TDD) mode is generally used. However, a high frequency band causes a relatively large signal propagation path loss; and to ensure a downlink capacity, the TDD mode causes a relatively low uplink duty cycle, and hence causes a limited uplink capacity. In summary, to increase the uplink capacity, the transmit power of the terminal device needs to be optimized, so that more efficient resource utilization is implemented.

In a current transmit power optimization solution for the terminal device, the terminal device reports a full-power transmission capability indication to a network device for each frequency band based on a transmission capability of the terminal device, where the full-power transmission capability indication is used to indicate a full-power transmission codebook subset. When the network device schedules the terminal device to use any codeword in the full-power transmission codebook subset for uplink transmission, the terminal device may set a power scaling factor to 1, to implement uplink full-power transmission.

In addition, to further increase the uplink capacity in the mobile communications system, the mobile communications system may use a transmission channel resource pooling solution for the terminal device, that is, allow the transmission channel of the terminal device to be flexibly switched to different frequency bands. This solution may enable uplink transmission of more streams in a single frequency band without adding an additional radio frequency link. In this way, the network device can optimize a correspondence between transmission channels and frequency bands and power allocation between the frequency bands and within a frequency band together based on channel conditions and maximum transmit power of each transmission channel, to maximize the uplink capacity.

Currently, when the mobile communications system supports a plurality of frequency bands, the terminal device reports, for each frequency band, a full-power transmission codebook subset that can implement full-power transmission. If support of an uplink full-power transmission capability indication in the transmission channel resource pooling solution is considered, depending only on an existing reporting solution, the network device cannot determine a full-power transmission codebook subset of the terminal device after transmission channel switching, and therefore cannot perform accurate scheduling.

SUMMARY

This application provides a method for determining a full-power transmission codebook subset and a device, so that a network device determines a full-power transmission codebook subset of a terminal device after transmission channel switching.

According to a first aspect, an embodiment of this application provides a method for determining a full-power transmission codebook subset. The method may be applied to a network device or a terminal device in a mobile communications system. The following uses a communications device as an execution body to describe steps included in the method.

The communications device determines a full-power transmission codebook subset corresponding to a frequency band supported by a terminal device before antenna port switching of the terminal device; and then the communications device may determine, according to a specified rule and full-power transmission codebook subsets corresponding to a plurality of source frequency bands, a full-power transmission codebook subset corresponding to a target frequency band after antenna port switching of the terminal device, where the plurality of source frequency bands are frequency bands in which a plurality of target antenna ports are located before antenna port switching, the plurality of target antenna ports are antenna ports in the target frequency band after antenna port switching, and the specified rule is used to indicate a correspondence between the full-power transmission codebook subsets corresponding to the plurality of source frequency bands before antenna port switching and the full-power transmission codebook subset corresponding to the target frequency band after antenna port switching.

In this method, the full-power transmission codebook subset after antenna port switching complies with the specified rule, and both a network device and the terminal device determine, according to the specified rule, the full-power transmission codebook subset corresponding to the target frequency band after transmission channel switching. In this case, the terminal device does not need to additionally report the full-power transmission codebook subset after antenna port switching, and no additional signaling overhead of a full-power transmission capability indication is added.

In a possible design, the method is applied to a network device, and the network device may determine, in the following manner, the full-power transmission codebook subset corresponding to the frequency band supported by the terminal device before antenna port switching of the terminal device:

receiving a full-power transmission capability indication from the terminal device, where the full-power transmission capability indication is used to indicate the full-power transmission codebook subset corresponding to the frequency band supported by the terminal device before antenna port switching of the terminal device.

In this design, the network device may determine, according to the full-power transmission capability indication sent by the terminal device, the full-power transmission codebook subset corresponding to the frequency band supported by the terminal device before antenna port switching of the terminal device.

In a possible design, when the method is applied to the terminal device, the terminal device may further send a full-power transmission capability indication to a network device, where the full-power transmission capability indication is used to indicate the full-power transmission codebook subset corresponding to the frequency band supported by the terminal device before antenna port switching of the terminal device.

In this design, the network device may determine, according to the full-power transmission capability indication sent by the terminal device, the full-power transmission codebook subset corresponding to the frequency band supported by the terminal device before antenna port switching of the terminal device.

In a possible design, the specified rule is determined based on a coherence capability of the plurality of target antenna ports in the target frequency band.

In a possible design, when the method is applied to the network device, the coherence capability of the plurality of target antenna ports is determined in the following manner:
receiving a first coherence capability indication from the terminal device, where the first coherence capability indication is used to indicate the coherence capability of the plurality of target antenna ports; or
receiving a second coherence capability indication from the terminal device, where the second coherence capability indication is used to indicate a coherence capability of antenna ports between the plurality of source frequency bands before antenna port switching of the terminal device; and determining the coherence capability of the plurality of target antenna ports based on a coherence capability of antenna ports in the plurality of source frequency bands and the coherence capability of antenna ports between the plurality of source frequency bands.

In this design, the network device may determine the coherence capability of the plurality of target antenna ports in the target frequency band to determine the specified rule.

In a possible design, the terminal device supports a first frequency band and a second frequency band, there are two antenna ports in the first frequency band before antenna port switching, there are two antenna ports in the second frequency band before antenna port switching, at least one antenna port in the second frequency band can be switched to a third frequency band, at least one antenna port in the first frequency band can be switched to the third frequency band, and there are four antenna ports in the third frequency band after antenna port switching; and in the foregoing case, the specified rule complies with a correspondence between a first column, a second column, and a third column in the following table:

| Full-power transmission codebook subset corresponding to the first frequency band before antenna port switching | Full-power transmission codebook subset corresponding to the second frequency band before antenna port switching | Full-power transmission codebook subset corresponding to the third frequency band after antenna port switching |
|---|---|---|
| $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | mode 0 |
| $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | G2 |
| $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | 00 | G1 |
| $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | G1 |
| $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | 00 | G0 |
| 00 | 00 | — | where a full-power transmission codebook subset "00" corresponding to any frequency band indicates that the full-power transmission codebook subset is null, G0 to G6 represent different transmitted precoding matrix indicator TPMI groups, "mode 0" represents all codewords in an uplink precoding codebook, and "—" indicates absence.

In a possible design, the terminal device supports a first frequency band and a second frequency band, there are two antenna ports in the first frequency band before antenna port switching, there are two antenna ports in the second frequency band before antenna port switching, at least one antenna port in the second frequency band can be switched to a third frequency band, at least one antenna port in the first frequency band can be switched to the third frequency band, and there are four antenna ports in the third frequency band after antenna port switching; and in the foregoing case, the specified rule complies with a correspondence between a first column, a second column, and a third column in the following table:

| Full-power transmission codebook subset corresponding to the first frequency band before antenna port switching | Full-power transmission codebook subset corresponding to the second frequency band before antenna port switching | Full-power transmission codebook subset corresponding to the third frequency band after antenna port switching |
|---|---|---|
| $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | mode 0 |
| $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | G2 + G5 |

-continued

| Full-power transmission codebook subset corresponding to the first frequency band before antenna port switching | Full-power transmission codebook subset corresponding to the second frequency band before antenna port switching | Full-power transmission codebook subset corresponding to the third frequency band after antenna port switching |
|---|---|---|
| $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | 00 | G1 + G4 |
| $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | G1 + G4 |
| $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | 00 | G0 |
| 00 | 00 | — | where a full-power transmission codebook subset "00" corresponding to any frequency band indicates that the full-power transmission codebook subset is null, G0 to G6 represent different transmitted precoding matrix indicator TPMI groups, "mode 0" represents all codewords in an uplink precoding codebook, "+" indicates that the full-power transmission codebook subset is a union set of two TPMI groups before and after "+", and "−" indicates absence.

In a possible design, the terminal device supports a first frequency band and a second frequency band, there are two antenna ports in the first frequency band before antenna port switching, there are two antenna ports in the second frequency band before antenna port switching, at least one antenna port in the second frequency band can be switched to a third frequency band, at least one antenna port in the first frequency band can be switched to the third frequency band, and there are four antenna ports in the third frequency band after antenna port switching; and in the foregoing case, the specified rule complies with a correspondence between a first column, a second column, and a third column in the following table:

| Full-power transmission codebook subset corresponding to the first frequency band before antenna port switching | Full-power transmission codebook subset corresponding to the second frequency band before antenna port switching | Full-power transmission codebook subset corresponding to the third frequency band after antenna port switching |
|---|---|---|
| $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | mode 0 |
| $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | G2 + G5 |
| $\left\{\frac{1}{\sqrt{2}}\begin{bmatrix}1\\0\end{bmatrix}, \frac{1}{\sqrt{2}}\begin{bmatrix}0\\1\end{bmatrix}\right\} + 00$ | 00 | G1 + G4 |
| $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | G0 |
| $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\} + 00$ | 00 | G0 |
| 00 + 00 | 00 | — | where a full-power transmission codebook subset "00" corresponding to any frequency band indicates that the full-power transmission codebook subset is null, G0 to G6 represent different transmitted precoding matrix indicator TPMI groups, "mode 0" represents all codewords in an uplink precoding codebook, "+" indicates that the full-power transmission codebook subset is a union set of two TPMI groups before and after "+", and "−" indicates absence.

In a possible design, the terminal device supports a first frequency band and a second frequency band, there are two antenna ports in the first frequency band before antenna port switching, there are two antenna ports in the second frequency band before antenna port switching, at least one antenna port in the second frequency band can be switched to a third frequency band, at least one antenna port in the first frequency band can be switched to the third frequency band, and there are four antenna ports in the third frequency band after antenna port switching; and in the foregoing case, the specified rule complies with a correspondence between a first column, a second column, and a third column in the following table:

| Full-power transmission codebook subset corresponding to the first frequency band before antenna port switching | Full-power transmission codebook subset corresponding to the second frequency band before antenna port switching | Full-power transmission codebook subset corresponding to the third frequency band after antenna port switching |
|---|---|---|
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | mode 0 |
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | G2 |
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | G2 |
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1&0\\0&1\end{bmatrix}\right\}$ | G1 + G3 |
| $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | G1 + G3 |
| $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | G1 + G3 |
| $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1&0\\0&1\end{bmatrix}\right\}$ | G0 + G3 |
| $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | G1 |
| $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | $\left\{\frac{1}{\sqrt{2}}\begin{bmatrix}1&0\\0&1\end{bmatrix}\right\}$ | G0 + G3 |
| $\left\{\frac{1}{\sqrt{2}}\begin{bmatrix}1&0\\0&1\end{bmatrix}\right\}$ | $\left\{\frac{1}{\sqrt{2}}\begin{bmatrix}1&0\\0&1\end{bmatrix}\right\}$ | G3 | where G0 to G6 represent different transmitted precoding matrix indicator TPMI groups, "mode 0" represents all codewords in an uplink precoding codebook, and "+" indicates that the full-power transmission codebook subset is a union set of two TPMI groups before and after "+"; and a codeword $$\frac{1}{\sqrt{2}}\begin{bmatrix}1&0\\0&1\end{bmatrix}$$

included in any full-power transmission codebook subset is an indication codeword, and when a full-power transmission codebook subset corresponding to any frequency band includes the indication codeword, it indicates that maximum transmit power of each antenna port in the frequency band is greater than or equal to a preset value, or when a full-power transmission codebook subset corresponding to any frequency band does not include the indication codeword, it indicates that maximum transmit power of at least one antenna port in the frequency band is less than a preset value.

In a possible design, the two antenna ports in the first frequency band are incoherent, the two antenna ports in the second frequency band are incoherent, and the four antenna ports in the third frequency band after antenna port switching of the terminal device are incoherent.

In a possible design, the antenna ports in the third frequency band after antenna port switching of the terminal device include a first antenna port, a second antenna port, a third antenna port, and a fourth antenna port, where the first antenna port is associated with a first row of a 4-port uplink precoding matrix, the second antenna port is associated with a second row of the 4-port uplink precoding matrix, the third antenna port is associated with a third row of the 4-port uplink precoding matrix, and the fourth antenna port is associated with a fourth row of the 4-port uplink precoding matrix; and by default, in the third frequency band after antenna port switching of the terminal device, maximum transmit power of the first antenna port is not less than maximum transmit power of the third antenna port, the maximum transmit power of the third antenna port is not less than maximum transmit power of the second antenna port, and the maximum transmit power of the second antenna port is not less than maximum transmit power of the fourth antenna port.

In a possible design, the terminal device supports a first frequency band and a second frequency band, there are two antenna ports in the first frequency band before antenna port switching, there are two antenna ports in the second frequency band before antenna port switching, at least one antenna port in the second frequency band can be switched to a third frequency band, at least one antenna port in the first frequency band can be switched to the third frequency band, and there are four antenna ports in the third frequency band after antenna port switching; and in the foregoing case, the specified rule complies with a correspondence between a first column, a second column, and a third column in the following table:

a codeword $$\frac{1}{\sqrt{2}}\begin{bmatrix}1 & 0\\0 & 1\end{bmatrix}$$

included in any full-power transmission codebook subset is an indication codeword, and when a full-power transmission codebook subset corresponding to any frequency band includes the indication codeword, it indicates that maximum transmit power of each antenna port in the frequency band is greater than or equal to a preset value, or when a full-power transmission codebook subset corresponding to any frequency band does not include the indication codeword, it indicates that maximum transmit power of at least one antenna port in the frequency band is less than a preset value.

In a possible design, the two antenna ports in the first frequency band are coherent, the two antenna ports in the second frequency band are coherent, and the four antenna

| Full-power transmission codebook subset corresponding to the first frequency band before antenna port switching | Full-power transmission codebook subset corresponding to the second frequency band before antenna port switching | Full-power transmission codebook subset corresponding to the third frequency band after antenna port switching |
|---|---|---|
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1 & 0\\0 & 1\end{bmatrix}\right\}$ | $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1 & 0\\0 & 1\end{bmatrix}\right\}$ | mode 0 |
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1 & 0\\0 & 1\end{bmatrix}\right\}$ | $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1 & 0\\0 & 1\end{bmatrix}\right\}$ | G2 + G6 |
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1 & 0\\0 & 1\end{bmatrix}\right\}$ | $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | G2 + G5 |
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1 & 0\\0 & 1\end{bmatrix}\right\}$ | $\left\{\frac{1}{\sqrt{2}}\begin{bmatrix}1 & 0\\0 & 1\end{bmatrix}\right\}$ | G1 + G6 |
| $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1 & 0\\0 & 1\end{bmatrix}\right\}$ | $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1 & 0\\0 & 1\end{bmatrix}\right\}$ | G1 + G6 |
| $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1 & 0\\0 & 1\end{bmatrix}\right\}$ | $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | G1 + G4 |
| $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1 & 0\\0 & 1\end{bmatrix}\right\}$ | $\left\{\frac{1}{\sqrt{2}}\begin{bmatrix}1 & 0\\0 & 1\end{bmatrix}\right\}$ | G0 + G6 |
| $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | G1 + G4 |
| $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | $\left\{\frac{1}{\sqrt{2}}\begin{bmatrix}1 & 0\\0 & 1\end{bmatrix}\right\}$ | G0 + G5 |
| $\left\{\frac{1}{\sqrt{2}}\begin{bmatrix}1 & 0\\0 & 1\end{bmatrix}\right\}$ | $\left\{\frac{1}{\sqrt{2}}\begin{bmatrix}1 & 0\\0 & 1\end{bmatrix}\right\}$ | G6 | where G0 to G6 represent different transmitted precoding matrix indicator TPMI groups, "mode 0" represents all codewords in an uplink precoding codebook, and "+" indicates that the full-power transmission codebook subset is a union set of two TPMI groups before and after "+"; and ports in the third frequency band after antenna port switching of the terminal device are completely coherent.

In a possible design, the antenna ports in the third frequency band after antenna port switching of the terminal device include a first antenna port, a second antenna port, a third antenna port, and a fourth antenna port, where the first antenna port is associated with a first row of a 4-port uplink precoding matrix, the second antenna port is associated with a second row of the 4-port uplink precoding matrix, the third antenna port is associated with a third row of the 4-port uplink precoding matrix, and the fourth antenna port is associated with a fourth row of the 4-port uplink precoding matrix; and by default, in the third frequency band after antenna port switching of the terminal device, maximum transmit power of the first antenna port is not less than maximum transmit power of the third antenna port, the maximum transmit power of the third antenna port is not less than maximum transmit power of the second antenna port, and the maximum transmit power of the second antenna port is not less than maximum transmit power of the fourth antenna port.

In a possible design, the terminal device supports a first frequency band and a second frequency band, there are two antenna ports in the first frequency band before antenna port switching, there are two antenna ports in the second frequency band before antenna port switching, at least one antenna port in the second frequency band can be switched to a third frequency band, at least one antenna port in the first frequency band can be switched to the third frequency band, and there are four antenna ports in the third frequency band after antenna port switching; and in the foregoing case, the specified rule complies with a correspondence between a first column, a second column, and a third column in the following table:

where G0 to G6 represent different transmitted precoding matrix indicator TPMI groups, "mode 0" represents all codewords in an uplink precoding codebook, and "+" indicates that the full-power transmission codebook subset is a union set of two TPMI groups before and after "+"; and a codeword $$\frac{1}{\sqrt{2}}\begin{bmatrix}1 & 0\\0 & 1\end{bmatrix}$$

included in any full-power transmission codebook subset is an indication codeword, and when a full-power transmission codebook subset corresponding to any frequency band includes the indication codeword, it indicates that maximum transmit power of each antenna port in the frequency band is greater than or equal to a preset value, or when a full-power transmission codebook subset corresponding to any frequency band does not include the indication codeword, it indicates that maximum transmit power of at least one antenna port in the frequency band is less than a preset value.

In a possible design, the two antenna ports in the first frequency band are coherent, the two antenna ports in the second frequency band are coherent, and the four antenna ports in the third frequency band after antenna port switching of the terminal device are partially coherent.

| Full-power transmission codebook subset corresponding to the first frequency band before antenna port switching | Full-power transmission codebook subset corresponding to the second frequency band before antenna port switching | Full-power transmission codebook subset corresponding to the third frequency band after antenna port switching |
|---|---|---|
| $\left\{\frac{1}{\sqrt{2}}\begin{bmatrix}1\\0\end{bmatrix}\right\}$ | $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1 & 0\\0 & 1\end{bmatrix}\right\}$ | mode 0 |
| $\left\{\frac{1}{\sqrt{2}}\begin{bmatrix}1\\0\end{bmatrix}\right\}$ | $\left\{\frac{1}{\sqrt{2}}\begin{bmatrix}0\\1\end{bmatrix}\right\}$ or $\left\{\frac{1}{\sqrt{2}}\begin{bmatrix}0\\1\end{bmatrix}\right\}$ | G2 + G6 |
| $\left\{\frac{1}{\sqrt{2}}\begin{bmatrix}1\\0\end{bmatrix}$ or $\frac{1}{\sqrt{2}}\begin{bmatrix}0\\1\end{bmatrix}, \frac{1}{\sqrt{2}}\begin{bmatrix}1 & 0\\0 & 1\end{bmatrix}\right\}$ | $\left\{\frac{1}{\sqrt{2}}\begin{bmatrix}1\\0\end{bmatrix}\right\}$ | G2 + G5 |
| $\left\{\frac{1}{\sqrt{2}}\begin{bmatrix}1\\0\end{bmatrix}\right\}$ | $\left\{\frac{1}{\sqrt{2}}\begin{bmatrix}1 & 0\\0 & 1\end{bmatrix}\right\}$ | G1 + G6 |
| $\left\{\frac{1}{\sqrt{2}}\begin{bmatrix}1\\0\end{bmatrix}\right\}$ | $\left\{\frac{1}{\sqrt{2}}\begin{bmatrix}1 & 0\\0 & 1\end{bmatrix}\right\}$ | G0 + G6 |
| $\left\{\frac{1}{\sqrt{2}}\begin{bmatrix}1\\0\end{bmatrix}\right\}$ | $\left\{\frac{1}{\sqrt{2}}\begin{bmatrix}1\\0\end{bmatrix}\right\}$ | G0 + G4 |
| $\left\{\frac{1}{\sqrt{2}}\begin{bmatrix}1\\0\end{bmatrix}\right\}$ | $\left\{\frac{1}{\sqrt{2}}\begin{bmatrix}1 & 0\\0 & 1\end{bmatrix}\right\}$ | G0 + G6 |
| $\left\{\frac{1}{\sqrt{2}}\begin{bmatrix}1\\0\end{bmatrix}\right\}$ | $\left\{\frac{1}{\sqrt{2}}\begin{bmatrix}1\\0\end{bmatrix}\right\}$ | G0 |
| $\left\{\frac{1}{\sqrt{2}}\begin{bmatrix}1\\0\end{bmatrix}\right\}$ | $\left\{\frac{1}{\sqrt{2}}\begin{bmatrix}1 & 0\\0 & 1\end{bmatrix}\right\}$ | G0 |
| $\left\{\frac{1}{\sqrt{2}}\begin{bmatrix}1 & 0\\0 & 1\end{bmatrix}\right\}$ | $\left\{\frac{1}{\sqrt{2}}\begin{bmatrix}1 & 0\\0 & 1\end{bmatrix}\right\}$ | G6 |

In a possible design, the antenna ports in the third frequency band after antenna port switching of the terminal device include a first antenna port, a second antenna port, a third antenna port, and a fourth antenna port, where the first antenna port is associated with a first row of a 4-port uplink and there are four antenna ports in the third frequency band after antenna port switching; and in the foregoing case, the specified rule complies with a correspondence between a first column, a second column, and a third column in the following table:

| Full-power transmission codebook subset corresponding to the first frequency band before antenna port switching | Full-power transmission codebook subset corresponding to the second frequency band before antenna port switching | Full-power transmission codebook subset corresponding to the third frequency band after antenna port switching |
|---|---|---|
| $\left\{\frac{1}{\sqrt{2}}\begin{bmatrix}1\\0\end{bmatrix}\right\}$, | $\left\{\frac{1}{\sqrt{2}}\begin{bmatrix}1\\0\end{bmatrix}\right\}$, | mode 0 |
| $\left\{\frac{1}{\sqrt{2}}\begin{bmatrix}1\\0\end{bmatrix}\right\}$, | $\left\{\frac{1}{\sqrt{2}}\begin{bmatrix}1\\0\end{bmatrix}\right\}$ | G2 + G5 |
| $\left\{\frac{1}{\sqrt{2}}\begin{bmatrix}1\\0\end{bmatrix}\right\}$, | $\left\{\frac{1}{\sqrt{2}}\begin{bmatrix}1\\0\end{bmatrix}\right\}$ | G2 + G5 |
| $\left\{\frac{1}{\sqrt{2}}\begin{bmatrix}1\\0\end{bmatrix}\right\}$, | $\left\{\frac{1}{\sqrt{2}}\begin{bmatrix}1&0\\0&1\end{bmatrix}\right\}$ | G1 + G5 |
| $\left\{\frac{1}{\sqrt{2}}\begin{bmatrix}1\\0\end{bmatrix}\right\}$ | $\left\{\frac{1}{\sqrt{2}}\begin{bmatrix}1\\0\end{bmatrix}\right\}$ | G0 + G5 |
| $\left\{\frac{1}{\sqrt{2}}\begin{bmatrix}1\\0\end{bmatrix}\right\}$ | $\left\{\frac{1}{\sqrt{2}}\begin{bmatrix}1\\0\end{bmatrix}\right\}$ | G0 + G4 |
| $\left\{\frac{1}{\sqrt{2}}\begin{bmatrix}1\\0\end{bmatrix}\right\}$ | $\left\{\frac{1}{\sqrt{2}}\begin{bmatrix}1&0\\0&1\end{bmatrix}\right\}$ | G0 + G5 |
| $\left\{\frac{1}{\sqrt{2}}\begin{bmatrix}1\\0\end{bmatrix}\right\}$ | $\left\{\frac{1}{\sqrt{2}}\begin{bmatrix}1\\0\end{bmatrix}\right\}$ | G0 |
| $\left\{\frac{1}{\sqrt{2}}\begin{bmatrix}1\\0\end{bmatrix}\right\}$ | $\left\{\frac{1}{\sqrt{2}}\begin{bmatrix}1&0\\0&1\end{bmatrix}\right\}$ | G0 |
| $\left\{\frac{1}{\sqrt{2}}\begin{bmatrix}1&0\\0&1\end{bmatrix}\right\}$ | $\left\{\frac{1}{\sqrt{2}}\begin{bmatrix}1&0\\0&1\end{bmatrix}\right\}$ | G5 | precoding matrix, the second antenna port is associated with a second row of the 4-port uplink precoding matrix, the third antenna port is associated with a third row of the 4-port uplink precoding matrix, and the fourth antenna port is associated with a fourth row of the 4-port uplink precoding matrix; and by default, in the third frequency band after antenna port switching of the terminal device, the first antenna port is coherent with the third antenna port, the second antenna port is coherent with the fourth antenna port, maximum transmit power of the first antenna port is not less than maximum transmit power of the third antenna port, and maximum transmit power of the second antenna port is not less than maximum transmit power of the fourth antenna port.

In a possible design, the terminal device supports a first frequency band and a second frequency band, there are two antenna ports in the first frequency band before antenna port switching, there are two antenna ports in the second frequency band before antenna port switching, at least one antenna port in the second frequency band can be switched to a third frequency band, at least one antenna port in the first frequency band can be switched to the third frequency band, where G0 to G6 represent different transmitted precoding matrix indicator TPMI groups, "mode 0" represents all codewords in an uplink precoding codebook, and "+" indicates that the full-power transmission codebook subset is a union set of two TPMI groups before and after "+"; and a codeword $$\frac{1}{\sqrt{2}}\begin{bmatrix}1 & 0\\0 & 1\end{bmatrix}$$

included in any full-power transmission codebook subset is an indication codeword, and when a full-power transmission codebook subset corresponding to any frequency band includes the indication codeword, it indicates that maximum transmit power of each antenna port in the frequency band is greater than or equal to a preset value, or when a full-power transmission codebook subset corresponding to any frequency band does not include the indication codeword, it indicates that maximum transmit power of at least one antenna port in the frequency band is less than a preset value.

In a possible design, the two antenna ports in the first frequency band are coherent and the two antenna ports in the second frequency band are incoherent, or the two antenna ports in the first frequency band are incoherent and the two antenna ports in the second frequency band are coherent; and in the third frequency band after antenna port switching of the terminal device, only two of the four antenna ports are coherent.

In a possible design, the antenna ports in the third frequency band after antenna port switching of the terminal device include a first antenna port, a second antenna port, a third antenna port, and a fourth antenna port, where the first antenna port is associated with a first row of a 4-port uplink precoding matrix, the second antenna port is associated with a second row of the 4-port uplink precoding matrix, the third antenna port is associated with a third row of the 4-port uplink precoding matrix, and the fourth antenna port is associated with a fourth row of the 4-port uplink precoding matrix; and by default, in the third frequency band after antenna port switching of the terminal device, the first antenna port is coherent with the third antenna port, the second antenna port is incoherent with the fourth antenna port, maximum transmit power of the first antenna port is not less than maximum transmit power of the third antenna port, and maximum transmit power of the second antenna port is not less than maximum transmit power of the fourth antenna port.

In a possible design, when the method is applied to the network device, the network device may further determine maximum transmit power of the plurality of target antenna ports in the target frequency band in the following manner:
manner 1: determining the maximum transmit power of the plurality of target antenna ports in the target frequency band based on the full-power transmission codebook subset corresponding to the target frequency band; or
manner 2: receiving transmit power indication information from the terminal device, where the transmit power indication information is used to indicate the maximum transmit power of the plurality of target antenna ports in the target frequency band after antenna port switching of the terminal device.

In this design, the network device may further determine the maximum transmit power of the plurality of target antenna ports after antenna port switching of the terminal device.

In a possible design, when the plurality of source frequency bands include a first frequency band and a second frequency band, the receiving a full-power transmission capability indication from the terminal device by the network device includes the following steps:
receiving a first full-power transmission capability indication from the terminal device, and receiving a second full-power transmission capability indication from the terminal device, where the first full-power transmission capability indication includes first indication information and second indication information, the second full-power transmission capability indication includes third indication information and fourth indication information, the first indication information is used to indicate a full-power transmission codebook subset corresponding to the first frequency band, the second indication information is used to indicate value distribution of maximum transmit power of antenna ports in the first frequency band, the third indication information is used to indicate a full-power transmission codebook subset corresponding to the second frequency band, and the fourth indication information is used to indicate value distribution of maximum transmit power of antenna ports in the second frequency band; and
in this case, the network device may further determine, by performing the following step, maximum transmit power of the plurality of target antenna ports after antenna port switching of the terminal device:
determining the maximum transmit power of the plurality of target antenna ports in the target frequency band based on the full-power transmission codebook subset that is corresponding to the first frequency band and that is indicated by the first indication information, the value distribution indicated by the second indication information, the full-power transmission codebook subset that is corresponding to the second frequency band and that is indicated by the third indication information, and the value distribution indicated by the fourth indication information.

In this design, the network device may further determine, based on the full-power transmission codebook subsets corresponding to the plurality of source frequency bands and value distribution of maximum transmit power of antenna ports in each source frequency band, the maximum transmit power of the plurality of target antenna ports after antenna port switching of the terminal device.

According to a second aspect, an embodiment of this application provides a method for determining a full-power transmission codebook subset. The method may be applied to a network device in a mobile communications system. The method includes the following steps:

The network device receives a full-power transmission capability indication from a terminal device, where the full-power transmission capability indication is used to indicate a full-power transmission codebook subset corresponding to a target frequency band after antenna port switching of the terminal device; and the network device determines, according to the full-power transmission capability indication, the full-power transmission codebook subset corresponding to the target frequency band after antenna port switching of the terminal device, where the target frequency band is a frequency band to which an antenna port of the terminal device is switched.

In this method, the network device may determine, according to the full-power transmission capability indication reported by the terminal device, the full-power transmission codebook subset corresponding to the target frequency band after antenna port switching of the terminal device.

According to a third aspect, an embodiment of this application provides a method for determining a full-power transmission codebook subset. The method may be applied to a terminal device in a mobile communications system. The method includes the following steps:

The terminal device determines a full-power transmission codebook subset corresponding to a target frequency band after antenna port switching of the terminal device; and the terminal device sends a full-power transmission capability indication to a network device, where the full-power transmission capability indication is used to indicate the full-power transmission codebook subset corresponding to the target frequency band after antenna port switching of the terminal device, and the target frequency band is a frequency band to which an antenna port of the terminal device is switched.

In this method, the network device may determine, according to the full-power transmission capability indication reported by the terminal device, the full-power transmission codebook subset corresponding to the target frequency band after antenna port switching of the terminal device.

According to a fourth aspect, an embodiment of this application provides a method for determining maximum transmit power of an antenna port (that is, a transmission channel). The method is applied to a network device in a mobile communications system. The method includes the following steps:

The network device receives a full-power transmission capability indication from a terminal device, where the full-power transmission capability indication includes first indication information and second indication information, the first indication information is used to indicate a full-power transmission codebook subset corresponding to a first frequency band, and the second indication information is used to indicate value distribution of maximum transmit power of antenna ports in the first frequency band; and the network device determines the maximum transmit power of the antenna ports in the first frequency band based on the full-power transmission codebook subset and the value distribution.

In this method, the network device may directly determine, according to the full-power transmission capability indication sent by the terminal device, the full-power transmission codebook subset corresponding to the first frequency band and the value distribution of the maximum transmit power of the antenna ports in the first frequency band, to determine maximum transmit power of each antenna port of the terminal device in the first frequency band based on the two pieces of information. In this method, the terminal device does not need to additionally send transmit power indication information, and therefore does not cause relatively high signaling overheads to the mobile communications system.

In a possible design, the second indication information is used to indicate that maximum transmit power of all antenna ports in the first frequency band is greater than or equal to a first preset value; or
when a value of the second indication information is a first value, the second indication information indicates that maximum transmit power of all antenna ports in the first frequency band is greater than or equal to a first preset value; or when a value of the second indication information is a second value, the second indication information indicates that maximum transmit power of at least one antenna port in the first frequency band is less than a first preset value, where
the first preset value is less than maximum total transmit power P of the terminal device allowed in the first frequency band.

In a possible design, the terminal device has two antenna ports in the first frequency band; and
when the full-power transmission codebook subset indicated by the first indication information is $$\left\{\frac{1}{\sqrt{2}}\begin{bmatrix}1\\0\end{bmatrix}, \frac{1}{\sqrt{2}}\begin{bmatrix}0\\1\end{bmatrix}\right\},$$

and the second indication information indicates that the maximum transmit power of all the antenna ports in the first frequency band is greater than or equal to the first preset value, maximum transmit power of the two antenna ports in the first frequency band is P and P respectively; or
when the full-power transmission codebook subset indicated by the first indication information is $$\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\},$$

and the second indication information indicates that the maximum transmit power of all the antenna ports in the first frequency band is greater than or equal to the first preset value, maximum transmit power of the two antenna ports in the first frequency band is P and the first preset value respectively; or
when the full-power transmission codebook subset indicated by the first indication information is $$\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\},$$

and the second indication information indicates that the maximum transmit power of the at least one antenna port in the first frequency band is less than the first preset value, maximum transmit power of the two antenna ports in the first frequency band is P and a second preset value respectively, where the second preset value is less than the first preset value; or
when the full-power transmission codebook subset indicated by the first indication information is null, and the second indication information indicates that the maximum transmit power of all the antenna ports in the first frequency band is greater than or equal to the first preset value, maximum transmit power of the two antenna ports in the first frequency band is the first preset value and the first preset value respectively.

In a possible design, when the second indication information indicates that the maximum transmit power of all the antenna ports in the first frequency band is greater than or equal to the first preset value, the second indication information is used to indicate a codeword $$\frac{1}{\sqrt{2}}\begin{bmatrix}1 & 0\\0 & 1\end{bmatrix}.$$

In a possible design, after determining the maximum transmit power of the antenna ports in the first frequency band, the network device may further determine, in the following manner, maximum transmit power of a target antenna port in another frequency band after antenna port switching of the terminal device:
manner 1: receiving a switching adjustment value of the target antenna port from the terminal device, where the target antenna port is an antenna port that is in the first frequency band and that can be switched to the another frequency band, and the switching adjustment value is an adjustment value of maximum transmit power of the target antenna port after the target antenna port is switched to the another frequency band; and determining, based on maximum transmit power of the target antenna port in a target frequency band and the switching adjustment value of the target antenna port, the maximum transmit power of the target antenna port in the another frequency band after antenna port switching of the terminal device; or manner 2: receiving transmit power indication information from the terminal device, where the transmit power indication information is used to indicate maximum transmit power of antenna ports in a second frequency band after antenna port switching of the terminal device.

According to a fifth aspect, an embodiment of this application provides a method for determining maximum transmit power of an antenna port (that is, a transmission channel). The method is applied to a terminal device in a mobile communications system. The method includes the following steps:

The terminal device determines a full-power transmission codebook set corresponding to a first frequency band, and maximum transmit power of antenna ports in the first frequency band; and the terminal device sends a full-power transmission capability indication to a network device, where the full-power transmission capability indication includes first indication information and second indication information, the first indication information is used to indicate a full-power transmission codebook subset corresponding to the first frequency band, and the second indication information is used to indicate value distribution of the maximum transmit power of the antenna ports in the first frequency band.

In this method, the network device may directly determine, according to the full-power transmission capability indication sent by the terminal device, the full-power transmission codebook subset corresponding to the first frequency band and the value distribution of the maximum transmit power of the antenna ports in the first frequency band, to determine maximum transmit power of each antenna port of the terminal device in the first frequency band based on the two pieces of information. In this method, the terminal device does not need to additionally send transmit power indication information, and therefore does not cause relatively high signaling overheads to the mobile communications system.

In a possible design, the second indication information is used to indicate that maximum transmit power of all antenna ports in the first frequency band is greater than or equal to a first preset value; or when a value of the second indication information is a first value, the second indication information indicates that maximum transmit power of all antenna ports in the first frequency band is greater than or equal to a first preset value; or when a value of the second indication information is a second value, the second indication information indicates that maximum transmit power of at least one antenna port in the first frequency band is less than a first preset value, where the first preset value is less than maximum total transmit power P of the terminal device allowed in the first frequency band.

In a possible design, the terminal device has two antenna ports in the first frequency band; and when the full-power transmission codebook subset indicated by the first indication information is $$\left\{\frac{1}{\sqrt{2}}\begin{bmatrix}1\\0\end{bmatrix}, \frac{1}{\sqrt{2}}\begin{bmatrix}0\\1\end{bmatrix}\right\},$$

and maximum transmit power of the two antenna ports in the first frequency band is P and P respectively, the second indication information indicates that the maximum transmit power of all the antenna ports in the first frequency band is greater than or equal to the first preset value; or when the full-power transmission codebook subset indicated by the first indication information is $$\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\},$$

and maximum transmit power of the two antenna ports in the first frequency band is P and the first preset value respectively, the second indication information indicates that the maximum transmit power of all the antenna ports in the first frequency band is greater than or equal to the first preset value; or when the full-power transmission codebook subset indicated by the first indication information is $$\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\},$$

and maximum transmit power of the two antenna ports in the first frequency band is P and a second preset value respectively, the second indication information indicates that the maximum transmit power of the at least one antenna port in the first frequency band is less than the first preset value, where the second preset value is less than the first preset value; or when the full-power transmission codebook subset indicated by the first indication information is null, and maximum transmit power of the two antenna ports in the first frequency band is the first preset value and the first preset value respectively, the second indication information indicates that the maximum transmit power of all the antenna ports in the first frequency band is greater than or equal to the first preset value.

In a possible design, when the second indication information indicates that the maximum transmit power of all the antenna ports in the first frequency band is greater than or equal to the first preset value, the second indication information is used to indicate a codeword $$\frac{1}{\sqrt{2}}\begin{bmatrix}1 & 0\\0 & 1\end{bmatrix}.$$

In a possible design, the terminal device determines a switching adjustment value of a target antenna port, where the target antenna port is an antenna port that is in a target frequency band and that can be switched to another frequency band, and the switching adjustment value is an adjustment value of maximum transmit power of the target antenna port after the target antenna port is switched to the another frequency band; and the terminal device sends the switching adjustment value of the target antenna port to the network device; or the terminal device sends transmit power indication information to the network device, where the transmit power indication information is used to indicate maximum transmit power of antenna ports in a second frequency band after antenna port switching of the terminal device.

In this design, the network device may determine, based on the switching adjustment value of the target antenna port and the transmit power indication information that are reported by the terminal device, the maximum transmit power of the target antenna port in the another frequency band after antenna port switching of the terminal device.

According to a sixth aspect, an embodiment of this application provides a method for determining maximum transmit power of an antenna port (that is, a transmission channel). The method is applied to a network device in a mobile communications system. The method includes the following steps:

The network device receives transmit power indication information from a terminal device, where the transmit power indication information is used to indicate maximum transmit power of antenna ports in a first frequency band supported by the terminal device; and the network device determines the maximum transmit power of the antenna ports of the terminal device in the first frequency band according to the transmit power indication information.

In this method, the network device may directly determine the maximum transmit power of the antenna ports of the terminal device in the first frequency band according to the transmit power indication information transmitted by the terminal device.

According to a seventh aspect, an embodiment of this application provides a method for determining maximum transmit power of an antenna port (that is, a transmission channel). The method is applied to a network device in a mobile communications system. The method includes the following steps:

The terminal device determines maximum transmit power of antenna ports in a supported first frequency band; and the terminal device sends transmit power indication information to a network device, where the transmit power indication information is used to indicate the maximum transmit power of the antenna ports in the first frequency band.

In this method, the network device may directly determine the maximum transmit power of the antenna ports of the terminal device in the first frequency band according to the transmit power indication information transmitted by the terminal device.

According to an eighth aspect, an embodiment of this application provides a communications apparatus, including units configured to perform the steps in any one of the foregoing aspects.

According to a ninth aspect, an embodiment of this application provides a communications device, including at least one processing element and at least one storage element. The at least one storage element is configured to store a program and data, and the at least one processing element is configured to perform the method according to any one of the foregoing aspects of this application.

According to a tenth aspect, an embodiment of this application further provides a communications system, including a terminal device configured to perform the method according to the first aspect of this application and a network device configured to perform the method according to the first aspect of this application.

According to an eleventh aspect, an embodiment of this application further provides a communications system, including a network device configured to perform the method according to the second aspect of this application and a terminal device configured to perform the method according to the third aspect of this application.

According to a twelfth aspect, an embodiment of this application further provides a communications system, including a network device configured to perform the method according to the fourth aspect of this application and a terminal device configured to perform the method according to the fifth aspect of this application.

According to a thirteenth aspect, an embodiment of this application further provides a communications system, including a network device configured to perform the method according to the sixth aspect of this application and a terminal device configured to perform the method according to the seventh aspect of this application.

According to a fourteenth aspect, an embodiment of this application further provides a computer program. When the computer program runs on a computer, the computer is enabled to perform the method according to any one of the foregoing aspects.

According to a fifteenth aspect, an embodiment of this application further provides a computer storage medium. The computer storage medium stores a computer program, and when the computer program is executed by a computer, the computer is enabled to perform the method according to any one of the foregoing aspects.

According to a sixteenth aspect, an embodiment of this application further provides a chip. The chip is configured to read a computer program stored in a memory, to perform the method according to any one of the foregoing aspects.

According to a seventeenth aspect, an embodiment of this application further provides a chip system. The chip system includes a processor, configured to support a computer apparatus in implementing the method according to any one of the foregoing aspects. In a possible design, the chip system further includes a memory. The memory is configured to store a program and data that are necessary for the computer apparatus. The chip system may include a chip, or may include a chip and another discrete component.

DETAILED DESCRIPTION OF EMBODIMENTS

Figure 1A:
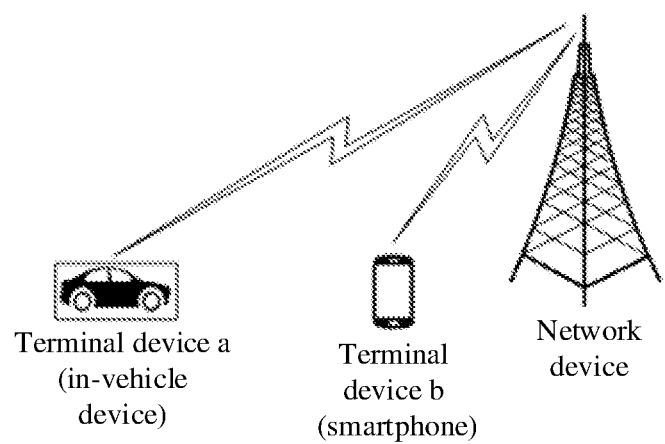
FIG. 1A is a diagram of an architecture of a mobile communications system according to an embodiment of this application.

This application provides a method for determining a full-power transmission codebook subset and a device, so that a network device determines a full-power transmission codebook subset of a terminal device after transmission channel switching. The method and the device are based on a same technical concept. Because problem resolving principles of the method and the device are similar, for implementation of the device and the method, refer to each other, and repeated parts are not described again.

The following describes some terms in this application, to help a person skilled in the art have a better understanding.

(1) A network device is a device that connects a terminal device to a wireless network in a communications system. As a node in a radio access network, the network device may be a base station, a radio access network (radio access network, RAN) node (or device), or the like, or may be an access point (access point, AP).

Currently, some examples of the network device are a gNB, a transmission reception point (transmission reception point, TRP), an evolved NodeB (evolved NodeB, eNB), a radio network controller (radio network controller, RNC), a NodeB (NodeB, NB), an access point (access point, AP), a base station controller (base station controller, BSC), a base transceiver station (base transceiver station, BTS), a home base station (for example, a home evolved NodeB or a home NodeB, HNB), a baseband unit (base band unit, BBU), an enterprise LTE discrete spectrum aggregation (Enterprise LTE Discrete Spectrum Aggregation, eLTE-DSA) base station, and the like.

In addition, in a network structure, the network device may include a central unit (central unit, CU) node and a distributed unit (distributed unit, DU) node. In this structure, a protocol layer of an eNB in a long term evolution (long term evolution, LTE) system is split, some functions of the protocol layer are controlled by a CU in a centralized manner, remaining or all functions of the protocol layer are distributed in DUs, and the CU controls the DUs in a centralized manner.

(2) A terminal device is a device that provides voice and/or data connectivity for a user. The terminal device may also be referred to as user equipment (user equipment, UE), a mobile station (mobile station, MS), a mobile terminal (mobile terminal, MT), or the like.

For example, the terminal device may be a handheld device, an in-vehicle device, or a road side unit that has a wireless connection function. Currently, some examples of the terminal device are a mobile phone (mobile phone), a tablet computer, a notebook computer, a palmtop computer, a mobile Internet device (mobile Internet device, MID), an intelligent point of sale (point of sale, POS), a wearable device, a virtual reality (virtual reality, VR) device, an augmented reality (augmented reality, AR) device, a wireless terminal in industrial control (industrial control), a wireless terminal in self driving (self driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), various smart meters (a smart water meter, a smart electric meter, and a smart gas meter), eLTE-DSA UE, a device having an integrated access and backhaul (integrated access and backhaul, IAB) capability, a vehicle-mounted electronic control unit (electronic control unit, ECU), a vehicle-mounted computer, an in-vehicle cruise system, and a telematics box (telematics box, T-Box).

(3) A transmission channel of the terminal device is used by the terminal device to transmit a radio frequency signal, and may be represented by Tx (transmission) in embodiments of this application. In embodiments of this application, a terminal device having a multiple-transmission capability has a plurality of transmission channels. Each transmission channel corresponds to one antenna port.

It should be noted that an antenna port is a logical port used for transmission, and is not defined in a one-to-one correspondence with a physical antenna, but is a virtual representation of the physical antenna. For example, physically, a plurality of transmission channels may share one or more physical antennas, but logically, each transmission channel corresponds to a different antenna port.

For example, from a perspective of a hardware structure, each transmission channel includes a physical antenna and at least one of the following components: a power amplifier (power amplifier, PA), a band-pass filter, a signal amplifier, a frequency mixer, a digital-to-analog converter (digital to analog converter, DAC), and a digital front end (digital front end, DFE).

In some possible embodiments, different transmission channels may share one or more of a power amplifier (power amplifier, PA), a band-pass filter, a signal amplifier, a frequency mixer, a digital-to-analog converter (digital to analog converter, DAC), a digital front end (digital front end, DFE), and a physical antenna.

In some possible embodiments, each transmission channel independently has one or more of a PA, a band-pass filter, a signal amplifier, a frequency mixer, a DAC, a DFE, and a physical antenna.

It should be further noted that when the terminal device supports a plurality of frequency bands, the transmission channels of the terminal device may work in different frequency bands. For example, Tx0 and Tx1 work in a frequency band 1, and Tx2 and Tx3 work in a frequency band 2. In embodiments of this application, for ease of description, "a transmission channel working in a frequency band" may be expressed as "a transmission channel corresponding to a frequency band".

(4) Transmit power of a transmission channel is actual transmit power of the transmission channel in signal transmission, and is determined by operating parameters of components (for example, output power of a PA) in the transmission channel together. In some scenarios, transmit power of the transmission channel is equal to output power of the PA in the transmission channel. Therefore, the transmit power and the output power may be replaced with each other in these scenarios.

Generally, when the terminal device transmits a service signal, transmit power of the plurality of transmission channels of the terminal device is the same. The service signal is a signal that carries specific data such as user plane data, signaling, or a message.

(5) Maximum transmit power of a transmission channel is determined by a transmission capability of the transmission channel and maximum total transmit power of the terminal device, and is a maximum threshold of the transmit power allowed in the transmission channel. To be specific, when the terminal device transmits a signal by using the transmission channel, transmit power of the transmission channel is less than or equal to the maximum transmit power of the transmission channel.

(6) Total transmit power of the terminal device is transmit power allowed when the terminal device transmits a signal, that is, a maximum threshold of a sum of transmit power of all transmission channels at any moment when the terminal device transmits the signal.

In other words, the sum of transmit power of all the transmission channels of the terminal device at any moment when the terminal device transmits the signal is less than or equal to the total transmit power of the terminal device.

Usually, to increase an uplink capacity, the sum of transmit power of all the transmission channels of the terminal device at any moment when the terminal device transmits the signal is equal to the total transmit power of the terminal device.

(7) Maximum total transmit power of the terminal device is determined by a transmission capability of the terminal device (that is, transmission capabilities of all the transmission channels of the terminal device) and a power class (power class, PC) of the terminal device. For example, when the power class of the terminal device is PC3, the maximum total transmit power of the terminal device is 23 dBm.

From the foregoing descriptions of terms in (4) to (7), the following association relationships can be learned:

Maximum total transmit power of the terminal device≥Total transmit power of the terminal device≥Sum of transmit power of all the transmission channels of the terminal device≥Transmit power of any transmission channel of the terminal device; and Maximum total transmit power of the terminal device-≥Maximum transmit power of any transmission channel of the terminal device≥Transmit power of the transmission channel of the terminal device.

(8) Full-power transmission of the terminal device means that the total transmit power of the terminal device reaches the maximum total transmit power of the terminal device, and may also be referred to as uplink full-power transmission of the terminal device.

In addition, when a transmission channel of the terminal device can implement full-power transmission, it indicates that maximum transmit power of the transmission channel is equal to the maximum total transmit power of the terminal device.

(9) A power scaling factor is a ratio of actual total transmit power of a non-zero-power antenna port of the terminal device to transmit power of a channel. The transmit power of the channel may be determined based on a path loss parameter, a parameter configured by the network device, or the like. A maximum value of the transmit power of the channel is the maximum total transmit power of the terminal device.

(10) A frequency band is a segment of continuous frequency domain resources, and may also be referred to as a frequency domain unit. In the communications field, a frequency band used for carrier modulation is a carrier. A mobile communications system may support one frequency band, or may support a plurality of frequency bands.

In addition, when the mobile communications system supports a plurality of frequency bands, a radio frequency capability of the terminal device may vary in different frequency bands. In other words, maximum transmit power of a same transmission channel of the terminal device and the maximum total transmit power of the terminal device may vary in different frequency bands. Correspondingly, a full-power transmission codebook subset of the terminal device may vary in different frequency bands.

(11) Codebook, codebook subset, codeword, and precoding matrix.

A codebook is a set of a series of V matrices that meet a transmission condition and that are defined to implement channel precoding. When quantities of transmission channels of terminal devices in a communications system are different and coherence capabilities of the transmission channels are different, codebooks applicable to the communications system are also different.

A codeword is equivalent to a precoding matrix. Both the codeword and the precoding matrix are V matrices in the codebook.

A codebook subset includes some codewords in the codebook.

The full-power transmission codebook subset is a codebook subset that is determined in the codebook by the terminal device based on the radio frequency capability of the terminal device and that can implement full-power transmission. When the network device schedules the terminal device to use any codeword in the full-power transmission codebook subset for uplink transmission, the terminal device may set the power scaling factor to 1, to implement full-power transmission.

(12) The term "and/or" describes an association relationship for describing associated objects and represents that three relationships may exist. For example, A and/or B may represent the following three cases: Only A exists, both A and B exist, and only B exists. The character "/" generally indicates an "or" relationship between associated objects.

It should be noted that "a plurality of" in this application refers to two or more. "At least one" means one or more.

In addition, it should be understood that, in descriptions of this application, terms such as "first" and "second" are merely used for distinguishing and description, but should not be understood as indicating or implying relative importance, or should not be understood as indicating or implying a sequence.

It can be learned from the foregoing descriptions of the transmission channels of the terminal device that the transmission channels of the terminal device are in a one-to-one correspondence with antenna ports. In some cases in the communications field, the "antenna port" may refer to a "transmission channel", and the "antenna port" and the "transmission channel" may be equivalent and replaced with each other. Therefore, "transmit power of a transmission channel" and "maximum transmit power of a transmission channel" described in embodiments of this application may be equivalent to "transmit power of an antenna port" and "maximum transmit power of an antenna port"; "transmission channel switching" is equivalent to "antenna port switching"; "a coherence capability of transmission channels" may be equivalent to "a coherence capability of antenna ports"; "X antenna ports" may be equivalent to "X transmission channels"; and "a transmission channel corresponding to a frequency band" may be equivalent to "an antenna port corresponding to a frequency band".

The following describes embodiments of this application in detail with reference to the accompanying drawings.

FIG. 1A shows a structure of a mobile communications system to which a method according to an embodiment of this application is applicable. Refer to FIG. 1A. The system includes a network device and a terminal device (for example, a terminal device a and a terminal device b shown in FIG. 1A).

The network device is an entity that can receive and transmit radio signals on a network side, and is responsible for providing a radio access related service for a terminal device within coverage of the network device. The network device implements a physical layer function, resource scheduling and radio resource management, quality of service (Quality of Service, QoS) management, radio access control, and mobility management functions.

The terminal device is an entity that can receive and transmit radio signals on a user side, and needs to access a network by using the network device. The terminal device may be various devices that provide voice and/or data connectivity for a user. For example, as shown in FIG. 1A, the terminal device may be an in-vehicle device or a smartphone.

The terminal device has a multiple-transmission capability, and can transmit signals by using a plurality of transmission channels. Certainly, the terminal device may also have a multiple-receiving capability, that is, can receive signals by using a plurality of receiving channels.

In addition, the network device may also have a multiple-transmission capability and/or a multiple-receiving capability. When the terminal device and the network device have the multiple-transmission capability and the multiple-receiving capability, the system may also be referred to as a multiple-input multiple-output (multiple-input multiple-output, MIMO) system.

In addition, the terminal device may establish a connection to one network device to form a single-connectivity communications system, or may establish connections to two network devices to form a dual-connectivity (dual connectivity, DC) communications system.

It should be further noted that the mobile communications system shown in FIG. 1A is used as an example, and constitutes no limitation on a communications system to which a method according to an embodiment of this application is applicable. In conclusion, the method provided in embodiments of this application is applicable to various communications systems and application scenarios in which terminal devices support multiple-transmission capabilities. To be specific, embodiments of this application may be further applied to communications systems of various types and standards, for example, a 5th Generation (The 5th Generation, 5G) communications system, a long term evolution (Long Term Evolution, LTE) communications system, a Wi-Fi system, vehicle to everything (vehicle to everything, V2X), long term evolution-vehicle (LTE-vehicle, LTE-V), vehicle to vehicle (vehicle to vehicle, V2V), Internet of Vehicles, machine type communication (Machine Type Communication, MTC), Internet of Things (internet of things, IoT), long term evolution-machine to machine (LTE-machine to machine, LTE-M), and machine to machine (machine to machine, M2M). This is not limited in embodiments of this application.

Figure 1B:
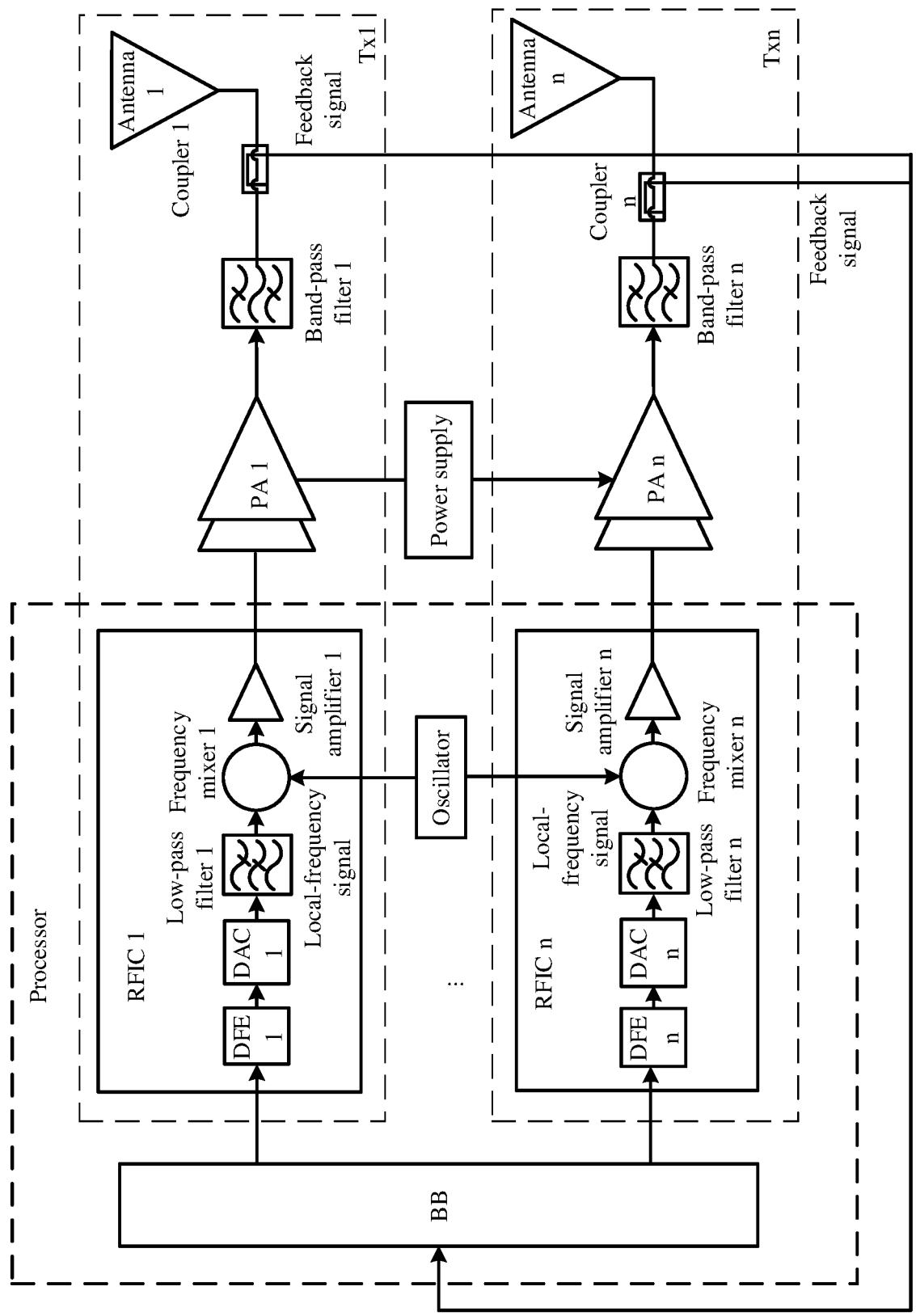
FIG. 1B is a schematic diagram of a structure of a radio transmission system in a terminal device according to an embodiment of this application.

FIG. 1B is a block diagram of a structure of a radio transmission system in a terminal device according to an embodiment of this application. Refer to FIG. 1B. The radio transmission system may include a processor, a power amplifier (Power Amplifier, PA), a band-pass filter, a coupler, and a physical antenna.

The processor may include one or more processing units. For example, the processor may include an application processor (application processor, AP), a modem processor, a graphics processing unit (graphics processing unit, GPU), an image signal processor (image signal processor, ISP), a neural-network processing unit (neural-network processing unit, NPU), a controller, a video codec, a digital signal processor (digital signal processor, DSP), and the like. The controller may generate an operation control signal based on an instruction operation code and a time sequence signal, to complete control of instruction fetch and instruction execution.

A memory may be further disposed in the processor, and is configured to store instructions and data. In some embodiments, the memory in the processor is a cache. The memory may store instructions or data just used or cyclically used by the processor. If the processor needs to use the instruction or the data again, the processor may directly invoke the instruction or the data from the memory. Disposition of the memory can avoid repeated access operations of the processor, reduce waiting time of the processor, and improve system efficiency. In some embodiments, the memory may be further disposed outside the processor and coupled to the processor.

In addition, the processor in embodiments may include a baseband (baseband, BB) and/or a radio frequency integrated circuit (radio frequency integrated circuit, RFIC).

The baseband is used to synthesize a baseband signal to be transmitted, and/or is used to decode a received baseband signal. Specifically, in a process of transmitting a signal by the terminal device, the baseband encodes a voice signal or another data signal into a baseband signal (baseband code) for transmission; and in a process of receiving a signal, the terminal device decodes the received baseband signal (baseband code) into a voice signal or another data signal. The baseband may include components such as an encoder, a decoder, and a baseband processor. The encoder is configured to synthesize the baseband signal to be transmitted, and the decoder is configured to decode the received baseband signal. The baseband processor may be a microprocessor (MCU). The baseband processor may be configured to control the encoder and the decoder. For example, the baseband processor may be configured to complete scheduling of encoding and decoding, communication between the encoder and the decoder, and driving of a peripheral (an enable signal may be sent to a component outside the baseband, to enable the component outside the baseband).

The radio frequency integrated circuit is configured to process a baseband signal to form a radio frequency signal, and transfer the radio frequency signal to the power amplifier for amplification. In addition, the radio frequency integrated circuit may be further configured to process a received radio frequency signal to form a baseband signal, and send the formed baseband signal to the baseband for decoding. The radio frequency signal is an electromagnetic wave signal that has been modulated and that has a transmit frequency. For example, as shown in the figure, the radio frequency integrated circuit may include the following components: a DFE, a DAC, a low-pass filter, a frequency mixer, and a signal amplifier. In addition, each radio frequency integrated circuit may further include an oscillator; or a plurality of radio frequency integrated circuits may share a same oscillator to receive a local-frequency signal of the same oscillator.

The processor may perform frequency modulation on a signal based on a mobile communications technology or a wireless communications technology. The mobile communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), an emerging wireless communications technology (which may also be referred to as a 5th generation mobile communications technology, 5th-Generation, 5th-Generation New Radio, 5G, 5G technology, or 5G NR for short), or the like. The wireless communications technology may include a wireless local area network (wireless local area network, WLAN) (for example, a Wireless Fidelity (Wireless Fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like.

The processor may include at least one baseband and at least one radio frequency integrated circuit. In some embodiments, each baseband corresponds to one radio frequency integrated circuit, so that frequency modulation is performed on a signal based on one or more communications technologies. For example, a first baseband and a first radio frequency integrated circuit perform frequency modulation on a signal based on a 5G technology, a second baseband and a second radio frequency integrated circuit perform frequency modulation on a signal based on a 4G technology, a third baseband and a third radio frequency integrated circuit perform frequency modulation on a signal based on a Wi-Fi technology, and a fourth baseband and a fourth radio frequency integrated circuit perform frequency modulation on a signal based on a Bluetooth technology. For another example, a first baseband and a first radio frequency integrated circuit may perform frequency modulation on a signal based on both a 4G technology and a 5G technology, and a second baseband and a second radio frequency integrated circuit may perform frequency modulation on a signal based on a Wi-Fi technology. In some embodiments, alternatively, one baseband may correspond to a plurality of radio frequency integrated circuits, to improve integration, as shown in FIG. 1B.

In some embodiments, the baseband, the radio frequency integrated circuit, and another component in the processor may be integrated into one integrated circuit. In some embodiments, either of the baseband and the radio frequency integrated circuit may be an independent component independent of the processor. In some embodiments, one baseband and at least one radio frequency integrated circuit corresponding to the baseband may be integrated into one component independent of the processor 100. In some embodiments, the baseband and the radio frequency integrated circuit are integrated in different integrated circuits, and the baseband and the radio frequency integrated circuit are packaged together, for example, packaged in a system on a chip (System on a Chip, SOC for short).

In the processor, different processing units may be independent components, or may be integrated into one or more integrated circuits.

The physical antenna is configured to transmit and receive electromagnetic wave signals (radio frequency signals). Examples of antennas are an antenna 1, . . . , an antenna n in the figure. The terminal device may include a plurality of physical antennas, and each physical antenna may be configured to cover one or more communication frequency bands. The plurality of physical antennas may be one or more types of a multi-band antenna, an array antenna, or an on-chip (on-chip) antenna.

The processor is coupled to the physical antenna to implement various functions associated with transmitting and receiving radio frequency signals. For example, in a signal transmission process of the terminal device, the baseband synthesizes to-be-transmitted data (a digital signal) into a to-be-transmitted baseband signal, and the baseband signal is converted into a radio frequency signal by the radio frequency integrated circuit. After being amplified by the power amplifier, filtered by the band-pass filter, and processed by the coupler, the radio frequency signal is finally transmitted by the physical antenna.

As shown in FIG. 1B, a path in which a baseband signal generated by the baseband is processed by the radio frequency integrated circuit, amplified by the power amplifier, processed by the band-pass filter, processed by the coupler, and the like, and a radio frequency signal that finally needs to be transmitted is generated and is finally transmitted by the antenna may be referred to as a transmission channel. In embodiments of this application, the terminal device has a multiple-transmission capability. Therefore, as shown in the figure, the terminal device has a plurality of transmission channels (Tx1 to Txn), for example, two transmission channels, four transmission channels, or eight transmission channels. For example, when the terminal device has a dual-transmission capability, the radio transmission system includes two transmission channels.

Optionally, as shown in the figure, power amplifiers in different transmission channels may be powered by one power supply. Certainly, power amplifiers in different transmission channels may alternatively be powered by different power supplies.

It should be further noted that, in the foregoing radio transmission system, the baseband may manage and adjust operating parameters of the baseband and other components in the system. Specifically, the baseband may have a plurality of pins, configured to connect to corresponding pins of other components, to achieve an objective of sending control signals to these components and adjusting operating parameters of the components.

For example, the baseband may adjust an operating parameter of the baseband, to adjust transmit power of a baseband signal generated by the baseband, and further adjust transmit power of each transmission channel. For another example, the baseband may adjust operating parameters of a DFE and a signal amplifier in a radio frequency integrated circuit in any transmission channel, to increase transmit power of the transmission channel. For another example, the baseband may adjust an operating parameter of a PA in any transmission channel, or adjust a voltage of a power supply that supplies power to the PA in the transmission channel, to adjust output power of the PA in the transmission channel, and further adjust transmit power of the transmission channel. To be specific, the baseband may have pins connected to a DFE, a signal amplifier, a power amplifier, and a power supply in each transmission channel. Correspondingly, the DFE, the signal amplifier, the power amplifier, and the power supply in each transmission channel also have pins connected to the baseband.

It should be noted that FIG. 1B is an example of a structure of a radio transmission system in a terminal device, and does not constitute any limitation. In some other embodiments, the terminal device may include more or fewer components than those shown in the figure, or some components may be combined, or some components may be split, or different component arrangements may be used. In addition, the components shown in the figure may be implemented by hardware, software, or a combination of software and hardware.

In the mobile communications system shown in FIG. 1A, the network device may schedule, based on a codebook, a codeword for uplink transmission for the terminal device. For different quantities of antenna ports, different quantities of transmission layers, and different waveforms, both the network device and the terminal device prestore a plurality of codebooks, as shown in Table 1 to Table 7. Each table represents one codebook, and W in each table represents a codeword (a precoding matrix). Each row of the precoding matrix corresponds to one antenna port, and each column corresponds to one transmission layer. In other words, a quantity of rows of the precoding matrix is equal to a quantity of antenna ports of the terminal device, and a quantity of columns of the precoding matrix is equal to a quantity of transmission layers for uplink transmission. In addition, in each codebook, one transmitted precoding matrix indicator (transmitted precoding matrix indicator, TPMI) index corresponds to one precoding matrix, and precoding matrices in each table are arranged from left to right in ascending order of TPMI indexes. In the table, "–" indicates unavailability and absence of a precoding matrix. The transmission layer is also referred to as a data layer, a data stream, a spatial stream, or the like.

It should be noted that values of elements in different rows in a same column in the precoding matrix indicate phase differences between different antenna ports. When a value of an element in a row and a column in the precoding matrix is 0, it indicates that an antenna port corresponding to the row is not used to transmit the transmission layer. In other words, transmit power of a transmission channel in which the antenna port is located at the transmission layer is 0.

TABLE 1

| TPMI index | W |
|---|---|
| 0 to 5 | $\frac{1}{\sqrt{2}}\begin{bmatrix}1\\0\end{bmatrix}$ $\frac{1}{\sqrt{2}}\begin{bmatrix}0\\1\end{bmatrix}$ $\frac{1}{\sqrt{2}}\begin{bmatrix}1\\1\end{bmatrix}$ $\frac{1}{\sqrt{2}}\begin{bmatrix}1\\-1\end{bmatrix}$ $\frac{1}{\sqrt{2}}\begin{bmatrix}1\\j\end{bmatrix}$ $\frac{1}{\sqrt{2}}\begin{bmatrix}1\\-j\end{bmatrix}$ — — |

Table 1 is a codebook used for uplink transmission of one transmission layer on two antenna ports. TPMI index values 0 and 1 correspond to codewords (precoding matrices) of an incoherent type, and TPMI index values 2 to 5 correspond to codewords (precoding matrices) of a completely coherent type.

TABLE 2

| TPMI index | W |
|---|---|
| 0 to 2 | $\frac{1}{\sqrt{2}}\begin{bmatrix}1&0\\0&1\end{bmatrix}$ $\frac{1}{\sqrt{2}}\begin{bmatrix}1&1\\1&-1\end{bmatrix}$ $\frac{1}{\sqrt{2}}\begin{bmatrix}1&1\\j&-j\end{bmatrix}$ — |

Table 2 is a codebook used for uplink transmission of two transmission layers on two antenna ports. A TPMI index value 0 corresponds to a codeword (precoding matrix) of an incoherent type, and TPMI index values 1 and 2 correspond to codewords (precoding matrices) of a completely coherent type.

TABLE 3

| TPMI index | W |
|---|---|
| 0 to 7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |
| 8 to 15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\-1\end{bmatrix}$ $\frac{1}{2}\begin{bmatrix}1\\1\\j\\j\end{bmatrix}$ $\frac{1}{2}\begin{bmatrix}1\\1\\-1\\1\end{bmatrix}$ $\frac{1}{2}\begin{bmatrix}1\\1\\-j\\-j\end{bmatrix}$ |
| 16 to 23 | $\frac{1}{2}\begin{bmatrix}1\\j\\1\\j\end{bmatrix}$ $\frac{1}{2}\begin{bmatrix}1\\j\\j\\1\end{bmatrix}$ $\frac{1}{2}\begin{bmatrix}1\\j\\-1\\-j\end{bmatrix}$ $\frac{1}{2}\begin{bmatrix}1\\j\\-j\\-1\end{bmatrix}$ $\frac{1}{2}\begin{bmatrix}1\\-1\\1\\1\end{bmatrix}$ $\frac{1}{2}\begin{bmatrix}1\\-1\\j\\-j\end{bmatrix}$ $\frac{1}{2}\begin{bmatrix}1\\-1\\-1\\-1\end{bmatrix}$ $\frac{1}{2}\begin{bmatrix}1\\-1\\-j\\j\end{bmatrix}$ |
| 24 to 27 | $\frac{1}{2}\begin{bmatrix}1\\-j\\1\\-j\end{bmatrix}$ $\frac{1}{2}\begin{bmatrix}1\\-j\\j\\-1\end{bmatrix}$ $\frac{1}{2}\begin{bmatrix}1\\-j\\-1\\j\end{bmatrix}$ $\frac{1}{2}\begin{bmatrix}1\\-j\\-j\\1\end{bmatrix}$ — — — — |

Table 3 is a codebook using a discrete Fourier transformation-spread-orthogonal frequency division multiplexing (discrete Fourier transformation-spread-orthogonal frequency division multiplexing, DFT-s-OFDM) waveform and used for uplink transmission of one transmission layer on four antenna ports. TPMI index values 0 to 3 correspond to codewords (precoding matrices) of an incoherent type, TPMI index values 4 to 11 correspond to codewords (precoding matrices) of a partially coherent type, and TPMI index values 12 to 27 correspond to codewords (precoding matrices) of a completely coherent type.

TABLE 4

| TPMI index | W |
|---|---|
| 0 to 7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\1\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |
| 8 to 15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\1\end{bmatrix}$ $\frac{1}{2}\begin{bmatrix}1\\1\\j\\j\end{bmatrix}$ $\frac{1}{2}\begin{bmatrix}1\\1\\-1\\-1\end{bmatrix}$ $\frac{1}{2}\begin{bmatrix}1\\1\\-j\\-j\end{bmatrix}$ |
| 16 to 23 | $\frac{1}{2}\begin{bmatrix}1\\j\\1\\j\end{bmatrix}$ $\frac{1}{2}\begin{bmatrix}1\\j\\j\\-1\end{bmatrix}$ $\frac{1}{2}\begin{bmatrix}1\\j\\-1\\-j\end{bmatrix}$ $\frac{1}{2}\begin{bmatrix}1\\j\\-j\\1\end{bmatrix}$ $\frac{1}{2}\begin{bmatrix}1\\-1\\1\\-1\end{bmatrix}$ $\frac{1}{2}\begin{bmatrix}1\\-1\\j\\-j\end{bmatrix}$ $\frac{1}{2}\begin{bmatrix}1\\-1\\-1\\1\end{bmatrix}$ $\frac{1}{2}\begin{bmatrix}1\\-1\\-j\\j\end{bmatrix}$ |
| 24 to 27 | $\frac{1}{2}\begin{bmatrix}1\\-j\\1\\-j\end{bmatrix}$ $\frac{1}{2}\begin{bmatrix}1\\-j\\j\\1\end{bmatrix}$ $\frac{1}{2}\begin{bmatrix}1\\-j\\-1\\j\end{bmatrix}$ $\frac{1}{2}\begin{bmatrix}1\\-j\\-j\\-1\end{bmatrix}$ |

Table 4 is a codebook using a cyclic prefix-orthogonal frequency division multiplexing (cyclic prefix-orthogonal frequency division multiplexing, CP-OFDM) waveform and used for uplink transmission codebook of one transmission layer on antenna ports. TPMI index values 0 to 3 correspond to codewords (precoding matrices) of an incoherent type, TPMI index values 4 to 11 correspond to codewords (precoding matrices) of a partially coherent type, and TPMI index values 12 to 27 correspond to codewords (precoding matrices) of a completely coherent type.

TABLE 5

| TPMI index | W |
|---|---|
| 0 to 3 | $\frac{1}{2}\begin{bmatrix}1&0\\0&1\\0&0\\0&0\end{bmatrix}$ $\frac{1}{2}\begin{bmatrix}1&0\\0&0\\0&1\\0&0\end{bmatrix}$ $\frac{1}{2}\begin{bmatrix}1&0\\0&0\\0&0\\0&1\end{bmatrix}$ $\frac{1}{2}\begin{bmatrix}0&0\\1&0\\0&1\\0&0\end{bmatrix}$ |
| 4 to 7 | $\frac{1}{2}\begin{bmatrix}0&0\\1&0\\0&0\\0&1\end{bmatrix}$ $\frac{1}{2}\begin{bmatrix}0&0\\0&0\\1&0\\0&1\end{bmatrix}$ $\frac{1}{2}\begin{bmatrix}1&0\\0&1\\1&0\\0&-j\end{bmatrix}$ $\frac{1}{2}\begin{bmatrix}1&0\\0&1\\-1&0\\0&j\end{bmatrix}$ |
| 8 to 11 | $\frac{1}{2}\begin{bmatrix}1&0\\0&1\\-j&0\\0&1\end{bmatrix}$ $\frac{1}{2}\begin{bmatrix}1&0\\0&1\\-j&0\\0&-1\end{bmatrix}$ $\frac{1}{2}\begin{bmatrix}1&0\\0&1\\-1&0\\0&-j\end{bmatrix}$ $\frac{1}{2}\begin{bmatrix}1&0\\0&1\\-1&0\\0&j\end{bmatrix}$ |
| 12 to 15 | $\frac{1}{2}\begin{bmatrix}1&0\\0&1\\j&0\\0&1\end{bmatrix}$ $\frac{1}{2}\begin{bmatrix}1&0\\0&1\\j&0\\0&-1\end{bmatrix}$ $\frac{1}{2}\begin{bmatrix}1&1\\1&1\\1&-1\\1&-1\end{bmatrix}$ $\frac{1}{2}\begin{bmatrix}1&1\\1&1\\j&-j\\j&-j\end{bmatrix}$ |
| 16 to 19 | $\frac{1}{2\sqrt{2}}\begin{bmatrix}1&1\\j&j\\1&-1\\j&-j\end{bmatrix}$ $\frac{1}{2\sqrt{2}}\begin{bmatrix}1&1\\j&j\\j&-j\\-1&1\end{bmatrix}$ $\frac{1}{2\sqrt{2}}\begin{bmatrix}1&1\\-1&-1\\1&-1\\-1&1\end{bmatrix}$ $\frac{1}{2\sqrt{2}}\begin{bmatrix}1&1\\-1&-1\\j&-j\\-j&j\end{bmatrix}$ |
| 20 to 21 | $\frac{1}{2\sqrt{2}}\begin{bmatrix}1&1\\-j&-j\\1&-1\\-j&j\end{bmatrix}$ $\frac{1}{2\sqrt{2}}\begin{bmatrix}1&1\\-j&-j\\j&-j\\1&-1\end{bmatrix}$ |

Table 5 is a codebook using a CP-OFDM waveform and used for uplink transmission of two transmission layers on four antenna ports. TPMI index values 0 to 5 correspond to codewords (precoding matrices) of an incoherent type, TPMI index values 6 to 13 correspond to codewords (precoding matrices) of a partially coherent type, and TPMI index values 14 to 21 correspond to codewords (precoding matrices) of a completely coherent type.

TABLE 6

| TPMI index | W | | | |
|---|---|---|---|---|
| 0 to 3 | $\frac{1}{2}\begin{bmatrix} 1 & 0 & 0 \\ 0 & 1 & 0 \\ 0 & 0 & 1 \\ 0 & 0 & 0 \end{bmatrix}$ | $\frac{1}{2}\begin{bmatrix} 1 & 0 & 0 \\ 0 & 1 & 0 \\ 1 & 0 & 0 \\ 0 & 0 & 1 \end{bmatrix}$ | $\frac{1}{2}\begin{bmatrix} 1 & 0 & 0 \\ 0 & 1 & 0 \\ -1 & 0 & 0 \\ 0 & 0 & 1 \end{bmatrix}$ | $\frac{1}{2\sqrt{3}}\begin{bmatrix} 1 & 1 & 1 \\ 1 & -1 & 1 \\ 1 & 1 & -1 \\ 1 & -1 & -1 \end{bmatrix}$ |
| 4 to 6 | $\frac{1}{2\sqrt{3}}\begin{bmatrix} 1 & 1 & 1 \\ 1 & -1 & 1 \\ j & j & -j \\ j & -j & -j \end{bmatrix}$ | $\frac{1}{2\sqrt{3}}\begin{bmatrix} 1 & 1 & 1 \\ -1 & 1 & -1 \\ 1 & 1 & -1 \\ -1 & 1 & 1 \end{bmatrix}$ | $\frac{1}{2\sqrt{3}}\begin{bmatrix} 1 & 1 & 1 \\ -1 & 1 & -1 \\ j & j & -j \\ -j & j & j \end{bmatrix}$ | — |

Table 6 is a codebook using a CP-OFDM waveform and used for uplink transmission of three transmission layers on four antenna ports. A TPMI index value 0 corresponds to a codeword (precoding matrix) of an incoherent type, TPMI index values 1 and 2 correspond to codewords (precoding matrices) of a partially coherent type, and TPMI index values 3 to 6 correspond to codewords (precoding matrices) of a completely coherent type.

TABLE 7

| TPMI index | W | | | |
|---|---|---|---|---|
| 0 to 3 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ | $\frac{1}{2\sqrt{2}}\begin{bmatrix} 1 & 1 & 0 & 0 \\ 0 & 0 & 1 & 1 \\ 1 & -1 & 0 & 0 \\ 0 & 0 & 1 & -1 \end{bmatrix}$ | $\frac{1}{2\sqrt{2}}\begin{bmatrix} 1 & 1 & 0 & 0 \\ 0 & 0 & 1 & 1 \\ j & -j & 0 & 0 \\ 0 & 0 & j & -j \end{bmatrix}$ | $\frac{1}{4}\begin{bmatrix} 1 & 1 & 1 & 1 \\ 1 & -1 & 1 & -1 \\ 1 & 1 & -1 & -1 \\ 1 & -1 & -1 & 1 \end{bmatrix}$ |
| 4 | $\frac{1}{4}\begin{bmatrix} 1 & 1 & 1 & 1 \\ 1 & -1 & 1 & -1 \\ j & j & -j & -j \\ j & -j & -j & j \end{bmatrix}$ | — | — | — |

Table 7 is a codebook using a CP-OFDM waveform and used for uplink transmission of four transmission layers on four antenna ports. A TPMI index value 0 corresponds to a codeword (precoding matrix) of an incoherent type, TPMI index values 1 and 2 correspond to codewords (precoding matrices) of a partially coherent type, and TPMI index values 3 and 4 correspond to codewords (precoding matrices) of a completely coherent type.

Considering that power cannot be borrowed between different transmission channels, Power scaling factor of the codebook=Quantity of ports whose power is greater than 0/Total quantity of ports. As a result, some codewords cannot implement full-power transmission. For example, in the codebook used for uplink transmission of one transmission layer on two antenna ports in Table 1, a power scaling factor of a codeword $$\frac{1}{\sqrt{2}}\begin{bmatrix} 1 \\ 1 \end{bmatrix}$$

is 1, but a power scaling factor of a codeword $$\frac{1}{\sqrt{2}}\begin{bmatrix} 1 \\ 0 \end{bmatrix}$$

and a power scaling factor of a codeword $$\frac{1}{\sqrt{2}}\begin{bmatrix} 0 \\ 1 \end{bmatrix}$$

are ½. In other words, if the network device schedules the terminal device to use the codeword $$\frac{1}{\sqrt{2}}\begin{bmatrix} 1 \\ 0 \end{bmatrix}$$

or the codeword $$\frac{1}{\sqrt{2}}\begin{bmatrix} 0 \\ 1 \end{bmatrix}$$

for uplink transmission, even if transmit power of each transmission channel of the terminal device can reach maximum transmit power of the transmission channel allowed in a corresponding frequency band, actual total transmit power of a non-zero-power antenna port of the terminal device cannot exceed ½ of maximum total transmit power of the terminal device. It is clearly that the terminal device cannot implement full-power transmission.

Because some codewords in the codebook cannot implement full-power transmission, uplink transmission performance of the terminal device is limited, and further, an uplink capacity is limited. To resolve this problem, currently, a transmit power optimization solution for the terminal device may be used to improve the uplink transmission performance.

The optimization solution is a method for indicating a full-power transmission capability of the terminal device based on a codebook subset. Specifically, if the terminal device has an uplink transmission capability in a plurality of transmission channels in one frequency band, the terminal device may determine, based on the transmission capability of the terminal device, in a codebook that meets a transmission condition, at least one codeword (that is, a full-power transmission codebook subset) that can implement uplink full-power transmission, and then the terminal device may report a full-power transmission capability indication to the network device, where the full-power transmission capability indication is used to indicate the full-power transmission codebook subset. The network device may determine the full-power transmission codebook subset of the terminal device according to the full-power transmission capability indication. In this way, when the network device schedules a codeword for uplink transmission for the terminal device, the network device may refer to the determined full-power transmission codebook subset. However, when the network device schedules, for the terminal device, any codeword in the full-power transmission codebook subset to perform uplink transmission, the terminal device may set a power scaling factor of the codeword to 1, to implement uplink full-power transmission of the terminal device.

In embodiments of this application, an information element of the full-power transmission capability indication may be represented as full power transmission, and may be carried in UE capability (UE capability) information for transmission.

Example 1: When the terminal device has an uplink transmission capability in two transmission channels (2Tx) in one frequency band, and a codebook that meets a current transmission condition is the codebook shown in Table 1, the terminal device may indicate the full-power transmission codebook subset by using a 2-bit full-power transmission capability indication.

Scenario 1: If full-power transmission can be implemented on either of the two transmission channels of the terminal device, the terminal device may determine, in the codebook shown in Table 1, that the full-power transmission codebook subset is $$\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\},$$

and the terminal device may report a full-power transmission capability indication whose value is "11" to the network device. The network device may determine, according to the full-power transmission capability indication, that the full-power transmission codebook subset of the terminal device is $$\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}.$$

When the network device schedules the codeword $$\frac{1}{\sqrt{2}}\begin{bmatrix}1\\0\end{bmatrix}$$

or the codeword $$\frac{1}{\sqrt{2}}\begin{bmatrix}0\\1\end{bmatrix}$$

for the terminal device to perform uplink transmission, the terminal device may set a power scaling factor of the codeword to 1, to implement uplink full-power transmission.

Scenario 2: If a transmission channel Tx0 of the terminal device can implement full-power transmission, but a transmission channel Tx1 cannot implement full-power transmission, the terminal device may determine, in the codebook in Table 1, that the full-power transmission codebook subset is $$\left\{\frac{1}{\sqrt{2}}\begin{bmatrix}1\\0\end{bmatrix}\right\},$$

and the terminal device may report a full-power transmission capability indication whose value is "10" to the network device. The network device may determine, according to the full-power transmission capability indication, that the full-power transmission codebook subset of the terminal device is $$\left\{\frac{1}{\sqrt{2}}\begin{bmatrix}1\\0\end{bmatrix}\right\}.$$

When the network device schedules the codeword $$\frac{1}{\sqrt{2}}\begin{bmatrix}1\\0\end{bmatrix}$$

for the terminal device to perform uplink transmission, the terminal device may set a power scaling factor of the codeword to 1, to implement uplink full-power transmission.

Scenario 3: If a transmission channel Tx1 of the terminal device can implement full-power transmission, but a transmission channel Tx0 cannot implement full-power transmission, the terminal device may determine, in the codebook in Table 1, that the full-power transmission codebook subset is $$\left\{\frac{1}{\sqrt{2}}\begin{bmatrix}0\\1\end{bmatrix}\right\},$$

and the terminal device may report a full-power transmission capability indication whose value is "01" to the network device.

The network device may determine, according to the full-power transmission capability indication, that the full-power transmission codebook subset of the terminal device is $$\left\{\frac{1}{\sqrt{2}}\begin{bmatrix}0\\1\end{bmatrix}\right\}.$$

When the network device schedules the codeword $$\frac{1}{\sqrt{2}}\begin{bmatrix}0\\1\end{bmatrix}$$

for the terminal device to perform uplink transmission, the terminal device may set a power scaling factor of the codeword to 1, to implement uplink full-power transmission.

A correspondence between the full-power transmission capability indication and the full-power transmission codebook subset in scenarios 1 to 3 in the foregoing example 1 is shown in the following Table 8.

It should be further noted that, in the foregoing transmit power optimization solution for the terminal device, after determining the full-power transmission codebook subset, the network device may further determine maximum transmit power of each transmission channel of the terminal device based on the full-power transmission codebook subset. In the following description, it is only assumed that a power class (Power Class, PC) of each frequency band of the terminal device is PC3, that is, maximum total transmit power of the terminal device that is allowed in each frequency band is 23 dBm. However, it should be noted that neither the following example nor the solution provided in embodiments of this application is limited to PC3, and the solutions are still applicable when the maximum total transmit power of the terminal device that is allowed in each frequency band is another value.

Example 2: An example in which the terminal device has two transmission channels in one frequency band is still used for description. As shown in Table 8, when the full-power transmission capability indication is "11", the network device may infer that maximum transmit power of the two transmission channels is both 23 dBm; when the full-power transmission capability indication is "10", the network device may infer that maximum transmit power of a transmission channel Tx0 is 23 dBm; or when the full-power transmission capability indication is "01", the network device may infer that maximum transmit power of a transmission channel Tx1 is 23 dBm.

TABLE 8

| | $\frac{1}{\sqrt{2}}\begin{bmatrix}1\\0\end{bmatrix}$ | $\frac{1}{\sqrt{2}}\begin{bmatrix}0\\1\end{bmatrix}$ | Inferred maximum transmit power (dBm) of each transmission channel of the terminal device |
|---|---|---|---|
| 2Tx | 1 | 1 | 23 + 23 |
| | 1 | 0 | 23 + X |
| | 0 | 1 | X + 23 |

"X" in Table 8 represents an unknown number less than 23 dBm.

Example 3: If the terminal device has an uplink transmission capability in four transmission channels (4Tx) in one frequency band, as shown in Table 9, when a coherence capability of antenna ports of the terminal device is incoherent, the full-power transmission capability indication sent by the terminal device may indicate one TPMI group (TPMI Group) in G0 to G3; or when a coherence capability of antenna ports of the terminal device is partially coherent or completely coherent, the full-power transmission capability indication sent by the terminal device may indicate one TPMI group in G0 to G3 and one TPMI group in G4 to G6.

As shown in Table 10, codewords included in the TPMI groups G0 to G6 are all subsets of the uplink precoding codebooks shown in Table 1 to Table 7.

As shown in a last column of Table 9, the network device may roughly infer maximum transmit power of each transmission channel of the terminal device based on the full-power transmission codebook subset (TPMI Group) indicated by the full-power transmission capability indication sent by the terminal device. For example, if the full-power transmission capability indication sent by the terminal device indicates the TPMI group G0, it means that a transmission channel Tx0 can implement full-power transmission, and the network device may infer that maximum transmit power of Tx0 can reach 23 dBm.

In addition, if the network device schedules the terminal device to use a codeword $$\frac{1}{2}\begin{bmatrix}1\\0\\0\\0\end{bmatrix}$$

to perform uplink transmission, the terminal device may set a power scaling factor to 1, to implement uplink full-power transmission.

TABLE 9

| | Coherence capability of antenna ports | TPMI group | Inferred maximum transmit power (dBm) of each transmission channel of the terminal device |
|---|---|---|---|
| 4Tx | Incoherent, partially coherent, or completely coherent | G0 | 23 + X + X + X |
| | | G1 | 23 + X + 23 + X |
| | | G2 | 23 + 23 + 23 + X |
| | | G3 | 20 + 20 + 20 + X |
| | Partially coherent or completely coherent | G4 | 20 + 17 + 20 + 17 |
| | | G5 | 20 + 20 + 20 + 17 |
| | | G6 | 20 + 20 + 20 + 20 |

"X" in Table 9 represents an unknown number less than 23 dBm.

TABLE 10

| TPMI group | Codeword included in the TPMI group |
|---|---|
| G0 | $\frac{1}{2}\begin{bmatrix}1\\0\\0\\0\end{bmatrix}$ |
| G1 | $\left\{\frac{1}{2}\begin{bmatrix}1\\0\\0\\0\end{bmatrix}, \frac{1}{2}\begin{bmatrix}0\\0\\1\\0\end{bmatrix}\right\}; \left\{\frac{1}{2}\begin{bmatrix}1&0\\0&0\\0&1\\0&0\end{bmatrix}\right\}$ |
| G2 | $\left\{\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}\right\};$ $\left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\};$ $\left\{\frac{1}{2}\begin{bmatrix}1&0&0\\0&0&0\\0&0&1\\0&0&0\end{bmatrix}\right\}$ |
| G3 | $\left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\};$ $\left\{\frac{1}{2}\begin{bmatrix}1&0&0\\0&1&0\\0&0&1\\0&0&0\end{bmatrix}\right\}$ |

TABLE 10-continued

| TPMI group | Codeword included in the TPMI group |
|---|---|
| G4 | $\left\{\frac{1}{2}\begin{bmatrix}1\\1\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\};$ $\left\{\frac{1}{2}\begin{bmatrix}1&0\\0&0\\0&1\\0&0\end{bmatrix}\right\}$ |
| G5 | $\left\{\frac{1}{2}\begin{bmatrix}1\\1\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\};$ $\left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\};$ $\left\{\frac{1}{2}\begin{bmatrix}1&0&0\\0&1&0\\0&0&1\\0&0&0\end{bmatrix}\right\}$ |
| G6 | $\left\{\frac{1}{2}\begin{bmatrix}1\\1\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\};$ $\left\{\frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix}\right\};$ $\left\{\frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&1\\0&0\end{bmatrix}, \frac{1}{2}\begin{bmatrix}0&0\\0&0\\1&0\\0&1\end{bmatrix}\right\};$ $\left\{\frac{1}{2}\begin{bmatrix}1&0&0\\0&1&0\\0&0&1\\0&0&0\end{bmatrix}\right\}$ |

In the mobile communications system shown in FIG. 1A, to optimize uplink transmission performance, the network device needs to consider a maximum transmit power constraint of each transmission channel of the terminal device, that is, transmit power allocated to each transmission channel cannot exceed maximum transmit power allowed in the transmission channel. Otherwise, there may be a relatively large difference between actual transmission performance and theoretical performance.

It can be learned from the foregoing description of the transmit power optimization solution for the terminal device and Table 8 to Table 10 that after the terminal device reports the full-power transmission codebook subset, the network device may roughly infer the maximum transmit power of each transmission channel of the terminal device based on the full-power transmission codebook subset. However, because the full-power transmission codebook subset is limited, if only an existing method is used, the network device can infer maximum transmit power of each transmission channel only when the terminal device indicates a specific codeword, or can infer maximum transmit power of only some transmission channels, and cannot accurately obtain maximum transmit power of all transmission channels of the terminal device. For example, when the terminal device has two transmission channels in one frequency band, as shown in Table 8, when the full-power transmission capability indication of the terminal device is "10", the network device may infer that maximum transmit power of a transmission channel Tx0 is 23 dBm and that maximum transmit power of a transmission channel Tx1 is less than 23 dBm. However, the network device cannot accurately infer whether the maximum transmit power of the transmission channel Tx1 is 20 dBm or 17 dBm.

To enable a network device to accurately determine maximum transmit power of each transmission channel of a terminal device, an embodiment of this application provides a method for determining maximum transmit power of a transmission channel. The method may be but is not limited to the methods provided in the following Embodiment 1 and Embodiment 2.

Embodiment 1

A terminal device reports, to a network device, maximum transmit power of a transmission channel in each frequency band supported by the terminal device. For example, the terminal device may indicate, by using a 3-bit sequence, that a value of maximum transmit power of one transmission channel is 23 dBm, 20 dBm, or 17 dBm.

Specifically, the terminal device may determine maximum transmit power of a transmission channel in a first frequency band based on information such as an uplink transmission capability in the transmission channel in the first frequency band and maximum total transmit power of the terminal device that is allowed in the first frequency band. Then, as shown in S201 in FIG. 2, the terminal device sends transmit power indication information to the network device, where the transmit power indication information is used to indicate the maximum transmit power of the transmission channel in the first frequency band.

In a first implementation, the transmit power indication information includes at least one field. Each field corresponds to a frequency band. Any field is used to indicate maximum transmit power of a transmission channel in a frequency band corresponding to the field.

In addition, each field may include at least one indication field. Each indication field is used to indicate maximum transmit power of one transmission channel in a frequency band corresponding to the field. A quantity of indication fields included in each field is the same as a quantity of transmission channels working in the frequency band corresponding to the field.

In a second implementation, the transmit power indication information may be carried in different information elements. Each information element corresponds to one frequency band. Transmit power indication information carried in any information element is used to indicate maximum transmit power of a transmission channel in a frequency band corresponding to the information element.

Similarly to the first implementation, each information element may include at least one indication field. Each indication field is used to indicate maximum transmit power of one transmission channel in a frequency band corresponding to the information element. A quantity of indication fields included in each information element is the same as a quantity of transmission channels working in the frequency band corresponding to the information element.

Figure 2:
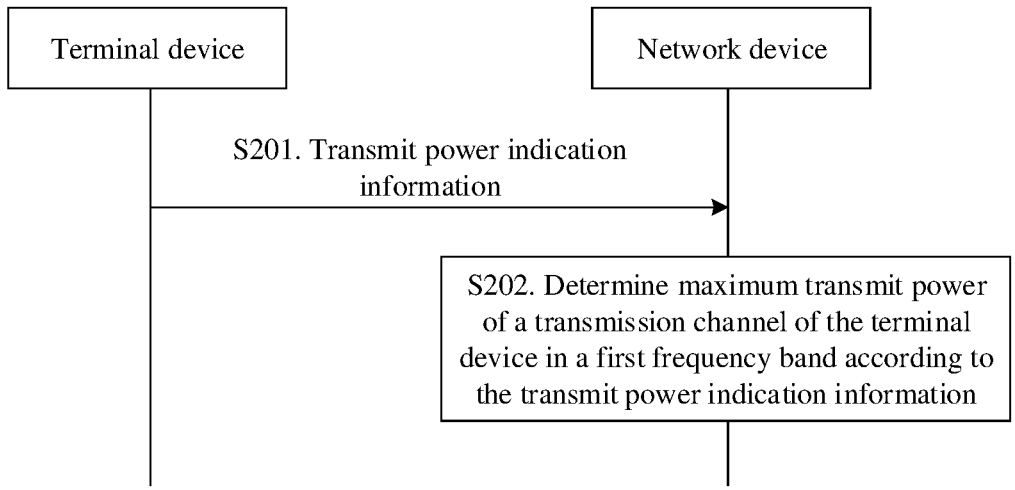
FIG. 2 is a flowchart of a method for determining maximum transmit power of a transmission channel according to an embodiment of this application.

In the method provided in this embodiment of this application, as shown in S202 in FIG. 2, the network device may directly determine the maximum transmit power of the transmission channel of the terminal device in the first frequency band according to the transmit power indication information sent by the terminal device.

It should be noted that, in this method, the terminal device needs to additionally send the transmit power indication information, causing relatively high signaling overheads in a mobile communications system.

Embodiment 2

On a basis of a conventional full-power transmission capability indication method based on a codebook subset, this embodiment of this application may further extend a full-power transmission capability indication, and indication information used to indicate value distribution of maximum transmit power of transmission channels is added to the full-power transmission capability indication, so that a network device can determine maximum transmit power of each transmission channel of the terminal device based on a full-power transmission codebook subset and the value distribution of the maximum transmit power of the transmission channels, without additionally adding massive signaling overheads.

The following uses a first frequency band supported by the terminal device as an example for description. Specifically, the terminal device may determine, based on information such as an uplink transmission capability in a transmission channel in the first frequency band and maximum total transmit power of the terminal device that is allowed in the first frequency band, a full-power transmission codebook set corresponding to the first frequency band and maximum transmit power of the transmission channel in the first frequency band. Then, as shown in S301 in FIG. 3, the terminal device sends a full-power transmission capability indication to the network device.

The full-power transmission capability indication includes first indication information and second indication information. The first indication information is used to indicate a full-power transmission codebook subset corresponding to the first frequency band, and the second indication information is used to indicate value distribution of maximum transmit power of transmission channels in the first frequency band.

In this embodiment of this application, the second indication information may indicate, in the following implementations without limitation, the value distribution of the maximum transmit power of the transmission channels in the first frequency band.

In a first implementation, the second indication information is used to indicate that maximum transmit power of all transmission channels in the first frequency band is greater than or equal to a first preset value.

In this implementation, when the full-power transmission capability indication sent by the terminal device includes the second indication information, it indicates that the maximum transmit power of all the transmission channels in the first frequency band is greater than or equal to the first preset value; or when the full-power transmission capability indication sent by the terminal device does not include the second indication information, it indicates that maximum transmit power of at least one transmission channel in the first frequency band is less than the first preset value.

In a second implementation, when a value of the second indication information is a first value, the second indication information indicates that maximum transmit power of all antenna ports in the first frequency band is greater than or equal to a first preset value; or when a value of the second indication information is a second value, the second indication information indicates that maximum transmit power of at least one antenna port in the first frequency band is less than a first preset value.

The first preset value is less than maximum total transmit power P of the terminal device allowed in the first frequency band. For example, First preset value=P−3.

For example, the terminal device has two antenna ports in the first frequency band. In this case:
when the full-power transmission codebook subset indicated by the first indication information is $$\left\{ \frac{1}{\sqrt{2}} \begin{bmatrix} 1 \\ 0 \end{bmatrix}, \frac{1}{\sqrt{2}} \begin{bmatrix} 0 \\ 1 \end{bmatrix} \right\},$$

and maximum transmit power of the two antenna ports in the first frequency band is P and P respectively, the second indication information indicates that the maximum transmit power of all the antenna ports in the first frequency band is greater than or equal to the first preset value; or
when the full-power transmission codebook subset indicated by the first indication information is $$\left\{ \frac{1}{\sqrt{2}} \begin{bmatrix} 1 \\ 0 \end{bmatrix} \right\} \text{ or } \left\{ \frac{1}{\sqrt{2}} \begin{bmatrix} 0 \\ 1 \end{bmatrix} \right\},$$

and maximum transmit power of the two antenna ports in the first frequency band is P and the first preset value respectively, the second indication information indicates that the maximum transmit power of all the antenna ports in the first frequency band is greater than or equal to the first preset value; or
when the full-power transmission codebook subset indicated by the first indication information is $$\left\{ \frac{1}{\sqrt{2}} \begin{bmatrix} 1 \\ 0 \end{bmatrix} \right\} \text{ or } \left\{ \frac{1}{\sqrt{2}} \begin{bmatrix} 0 \\ 1 \end{bmatrix} \right\},$$

and maximum transmit power of the two antenna ports in the first frequency band is P and a second preset value respectively, the second indication information indicates that the maximum transmit power of the at least one antenna port in the first frequency band is less than the first preset value, where the second preset value is less than the first preset value; or
when the full-power transmission codebook subset indicated by the first indication information is null, and maximum transmit power of the two antenna ports in the first frequency band is the first preset value and the first preset value respectively, the second indication information indicates that the maximum transmit power of all the antenna ports in the first frequency band is greater than or equal to the first preset value.

Optionally, when the second indication information indicates that the maximum transmit power of all the antenna ports in the first frequency band is greater than or equal to the first preset value, the second indication information is used to indicate a codeword $$\frac{1}{\sqrt{2}} \begin{bmatrix} 1 & 0 \\ 0 & 1 \end{bmatrix}.$$

Figure 3:
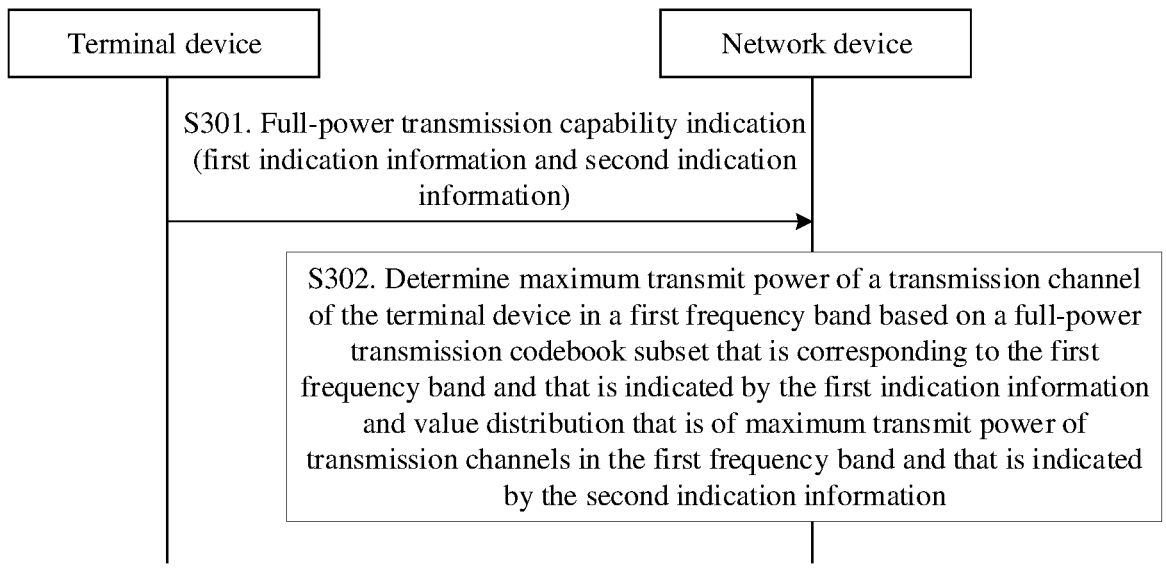
FIG. 3 is a flowchart of another method for determining maximum transmit power of a transmission channel according to an embodiment of this application.

As shown in S302 in FIG. 3, after receiving the full-power transmission capability indication from the terminal device, the network device may determine the maximum transmit power of the transmission channel of the terminal device in the first frequency band based on the full-power transmission codebook subset indicated by the first indication information and the value distribution indicated by the second indication information.

The foregoing example in which the terminal device has two antenna ports in the first frequency band is still used for description.

When the full-power transmission codebook subset indicated by the first indication information is $$\left\{\frac{1}{\sqrt{2}}\begin{bmatrix}1\\0\end{bmatrix}, \frac{1}{\sqrt{2}}\begin{bmatrix}0\\1\end{bmatrix}\right\},$$

and the second indication information indicates that the maximum transmit power of all the antenna ports in the first frequency band is greater than or equal to the first preset value, maximum transmit power of the two antenna ports in the first frequency band is P and P respectively.

When the full-power transmission codebook subset indicated by the first indication information is $$\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\},$$

and the second indication information indicates that the maximum transmit power of all the antenna ports in the first frequency band is greater than or equal to the first preset value, maximum transmit power of the two antenna ports in the first frequency band is P and the first preset value respectively.

When the full-power transmission codebook subset indicated by the first indication information is $$\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\},$$

and the second indication information indicates that the maximum transmit power of the at least one antenna port in the first frequency band is less than the first preset value, maximum transmit power of the two antenna ports in the first frequency band is P and a second preset value respectively, where the second preset value is less than the first preset value.

When the full-power transmission codebook subset indicated by the first indication information is null, and the second indication information indicates that the maximum transmit power of all the antenna ports in the first frequency band is greater than or equal to the first preset value, maximum transmit power of the two antenna ports in the first frequency band is the first preset value and the first preset value respectively.

In the following description, it is assumed that the terminal device has two transmission channels (Tx0 and Tx1) in one frequency band and that a power class of the frequency band is PC3. When the second indication information in the full-power transmission capability indication is used to indicate that the maximum transmit power of all the antenna ports in the frequency band is greater than or equal to the first preset value, the second indication information is used to indicate an indication codeword $$\frac{1}{\sqrt{2}}\begin{bmatrix}1 & 0\\0 & 1\end{bmatrix}.$$

In other words, the first indication information and the second indication information in the full-power transmission capability indication may jointly indicate an extended full-power transmission codebook subset. In some cases, the extended full-power transmission codebook subset may include the indication codeword.

For example, in this application, a candidate codeword set of a full-power transmission codebook subset corresponding to two transmission channels is extended, and an indication codeword $$\frac{1}{\sqrt{2}}\begin{bmatrix}1 & 0\\0 & 1\end{bmatrix}$$

is added. If the extended full-power transmission codebook subset indicated by the terminal device includes the codeword $$\frac{1}{\sqrt{2}}\begin{bmatrix}1 & 0\\0 & 1\end{bmatrix},$$

it means that maximum transmit power of each transmission channel may reach at least 20 dBm. Therefore, the network device can determine, based on whether the terminal device indicates the codeword $$\frac{1}{\sqrt{2}}\begin{bmatrix}1 & 0\\0 & 1\end{bmatrix},$$

whether a value of maximum transmit power of a target transmission channel is 20 dBm or 17 dBm. The target transmission channel is a transmission channel whose maximum transmit power is less than 23 dBm.

As shown in Table 11, the network device may accurately determine the maximum transmit power of each transmission channel of the terminal device based on the codeword indicated by the full-power transmission capability indication reported by the terminal device. For example, when the terminal device reports a full-power transmission capability indication whose value is "101", the network device may determine that maximum transmit power of Tx0 is 23 dBm and that maximum transmit power of Tx1 is 20 dBm. For another example, when the terminal device reports a full-power transmission capability indication whose value is "100", the network device may determine that maximum transmit power of Tx0 is 23 dBm and that maximum transmit power of Tx1 is 17 dBm.

TABLE 11

| | $\frac{1}{\sqrt{2}}\begin{bmatrix}1\\0\end{bmatrix}$ | $\frac{1}{\sqrt{2}}\begin{bmatrix}0\\1\end{bmatrix}$ | $\frac{1}{\sqrt{2}}\begin{bmatrix}1 & 0\\0 & 1\end{bmatrix}$ | Inferred maximum transmit power (dBm) of each transmission channel of the terminal device |
|---|---|---|---|---|
| 2Tx | 1 | 1 | 1 | 23 + 23 |
| | 1 | 0 | 1 | 23 + 20 |

TABLE 11-continued

| $\frac{1}{\sqrt{2}}\begin{bmatrix}1\\0\end{bmatrix}$ | $\frac{1}{\sqrt{2}}\begin{bmatrix}0\\1\end{bmatrix}$ | $\frac{1}{\sqrt{2}}\begin{bmatrix}1&0\\0&1\end{bmatrix}$ | Inferred maximum transmit power (dBm) of each transmission channel of the terminal device |
|---|---|---|---|
| 1 | 0 | 0 | 23 + 17 |
| 0 | 1 | 1 | 20 + 23 |
| 0 | 1 | 0 | 17 + 23 |
| 0 | 0 | 1 | 20 + 20 |

It can be learned by comparing Table 11 with Table 8 that, in a same scenario, in the method provided in this embodiment of this application, a conventional full-power transmission codebook subset is extended, and an indication codeword (a third codeword column added in Table 11) is added. In this case, an overhead of one bit is added to the full-power transmission capability indication transmitted in the mobile communications system, so that the network device can accurately determine transmit power of each transmission channel.

In the method provided in this embodiment of this application, the network device may directly determine, according to the full-power transmission capability indication sent by the terminal device, the full-power transmission codebook subset corresponding to the first frequency band and the value distribution of the maximum transmit power of the transmission channels in the first frequency band, to determine maximum transmit power of each transmission channel of the terminal device in the first frequency band based on the two pieces of information. In comparison with Embodiment 1, in this method, the terminal device does not need to additionally send transmit power indication information, and therefore does not cause relatively high signaling overheads to the mobile communications system.

It should be further noted that, when the mobile communications system supports a transmission channel resource pooling solution for the terminal device, to enable the network device to determine maximum transmit power of each transmission channel in a frequency band after transmission channel switching, this application provides the following implementations based on the methods provided in Embodiment 1 and Embodiment 2.

In a first implementation, after transmission channel switching of the terminal device, the terminal device determines, by using again the method provided in Embodiment 1 or Embodiment 2, maximum transmit power of each transmission channel in a target frequency band, and indicates the maximum transmit power of each transmission channel in the target frequency band by using transmit power indication information or a full-power transmission capability indication. For a specific process, refer to the description in the foregoing embodiment, and details are not described herein again.

In a second implementation, considering that values of maximum transmit power of transmission channels in different frequency bands may be different, the terminal device may send a switching adjustment value (for example, a power back-off value, 0 dBm, 3 dBm, or 6 dBm) of the transmission channel to the network device. For example, maximum transmit power of two transmission channels (Tx2 and Tx3) of the terminal device in a frequency band 2 before switching is both 23 dBm, and maximum transmit power of the two transmission channels after switching to a frequency band 1 is both 20 dBm. In this case, the terminal device may send a switching adjustment value −3 dBm of Tx2 and a switching adjustment value −3 dBm of Tx2 to the network device.

In this way, the network device can determine, based on maximum transmit power of the target transmission channel before transmission channel switching and a switching adjustment value of the target transmission channel, maximum transmit power of the target transmission channel after transmission channel switching.

In the mobile communications system shown in FIG. 1A, to further increase an uplink capacity in the mobile communications system, the mobile communications system may use a transmission channel resource pooling solution for the terminal device, to allow a transmission channel of the terminal device to be flexibly switched to different frequency bands. However, in this scenario, if a conventional transmit power optimization solution for the terminal device is still used, although the terminal device reports, for each frequency band, a full-power transmission codebook subset that can implement full-power transmission, the network device cannot determine a full-power transmission codebook subset of the terminal device after transmission channel switching, and further, accurate scheduling cannot be performed.

For example, the terminal device supports two transmission channels in both a frequency band 1 and a frequency band 2. The two transmission channels in the frequency band 2 may be switched to the frequency band 1, so that there are four transmission channels in the frequency band 1 for uplink parallel transmission. For a logical relationship between a frequency band and a transmission channel, refer to FIG. 4. The terminal device has two uplink transmission channels in both the frequency band 1 and the frequency band 2. The two uplink transmission channels in the frequency band 1 are Tx0 and Tx1, and the two uplink transmission channels in the frequency band 2 are Tx2 and Tx3. In addition, Tx2 and Tx3 in the frequency band 2 may be connected to a switch and switched to the frequency band 1. Therefore, after transmission channel switching, there are four uplink transmission channels (that is, Tx1_0 to Tx1_3 in FIG. 4) in the frequency band 1. Merely based on existing content (including a full-power transmission codebook subset corresponding to each frequency band before transmit antenna switching, a coherence capability of transmission channels, a power class, and the like) reported by the terminal device, the network device cannot determine a full-power transmission codebook subset corresponding to the frequency band 1 after transmission channel switching, and therefore cannot accurately schedule uplink data transmission.

Based on this, this application provides a method for determining a full-power transmission codebook subset, so that a network device determines a full-power transmission codebook subset of a terminal device after transmission channel switching. The method may be but is not limited to the following Embodiment 3 and Embodiment 4.

Embodiment 3

A terminal device reports, to a network device, a full-power transmission codebook subset corresponding to each frequency band supported by the terminal device before transmission channel switching, and a full-power transmission codebook subset corresponding to each frequency band supported by the terminal device after transmission channel switching.

Specifically, the terminal device may determine, based on an uplink transmission capability in a transmission channel in each frequency band, a full-power transmission codebook subset corresponding to each frequency band before transmission channel switching and a full-power transmission codebook subset corresponding to each frequency band after transmission channel switching. Using a target frequency band after switching as an example, the terminal device determines, based on an uplink transmission capability in a transmission channel in the target frequency band, a full-power transmission codebook subset corresponding to the target frequency band after antenna port switching of the terminal device. Then, as shown in S501 in FIG. 5, the terminal device sends a full-power transmission capability indication to the network device, where the full-power transmission capability indication is used to indicate a full-power transmission codebook subset corresponding to the target frequency band after transmission channel switching of the terminal device.

Optionally, the full-power transmission capability indication further includes the full-power transmission codebook subset corresponding to each frequency band supported by the terminal device before transmission channel switching.

In a first implementation, the full-power transmission capability indication includes a first field and a second field. The first field is used to indicate the full-power transmission codebook subset corresponding to each frequency band before switching, and the second field is used to indicate the full-power transmission codebook subset corresponding to the target frequency band after transmission channel switching.

In addition, the first field may include at least one first indication field, and each first indication field is used to indicate a full-power transmission codebook subset corresponding to a frequency band before transmission channel switching. A quantity of first indication fields in the first field is the same as a quantity of frequency bands supported by the terminal device before transmission channel switching.

The second field may include at least one second indicator field, and each second indicator field is used to indicate a full-power transmission codebook subset corresponding to a frequency band after switching. A quantity of second indication fields in the second field is the same as a quantity of frequency bands supported by the terminal device after transmission channel switching. One of the at least one second indication field indicates the full-power transmission codebook subset corresponding to the target frequency band after switching.

Finally, a value of each indication field may be determined by using the full-power transmission codebook subset indicated by the indication field. For details, refer to Table 8 to Table 10. Details are not described herein again.

In a second implementation, the full-power transmission capability indication may be carried in different information elements. A full-power transmission capability indication carried in a first information element is used to indicate the full-power transmission codebook subset corresponding to each frequency band before switching, and a full-power transmission capability indication carried in a second information element is used to indicate the full-power transmission codebook subset corresponding to each frequency band after transmission channel switching.

Similarly to the first implementation, the first information element may include at least one first indication field, and the second information element may include at least one second indication field. For content indicated by the first indication field and the second indication field and quantities and values of the indication fields, refer to the descriptions in the foregoing first implementation. Details are not described herein again.

In a third implementation, full-power transmission capability indications indicating full-power transmission codebook subsets corresponding to different frequency bands are carried in different information elements. One frequency band corresponds to one information element. A same frequency band corresponds to different information elements before and after switching. To be specific, there is an indication field in a full-power transmission codebook subset, and the indication field is used to indicate a full-power transmission codebook subset corresponding to a frequency band.

Figure 5:
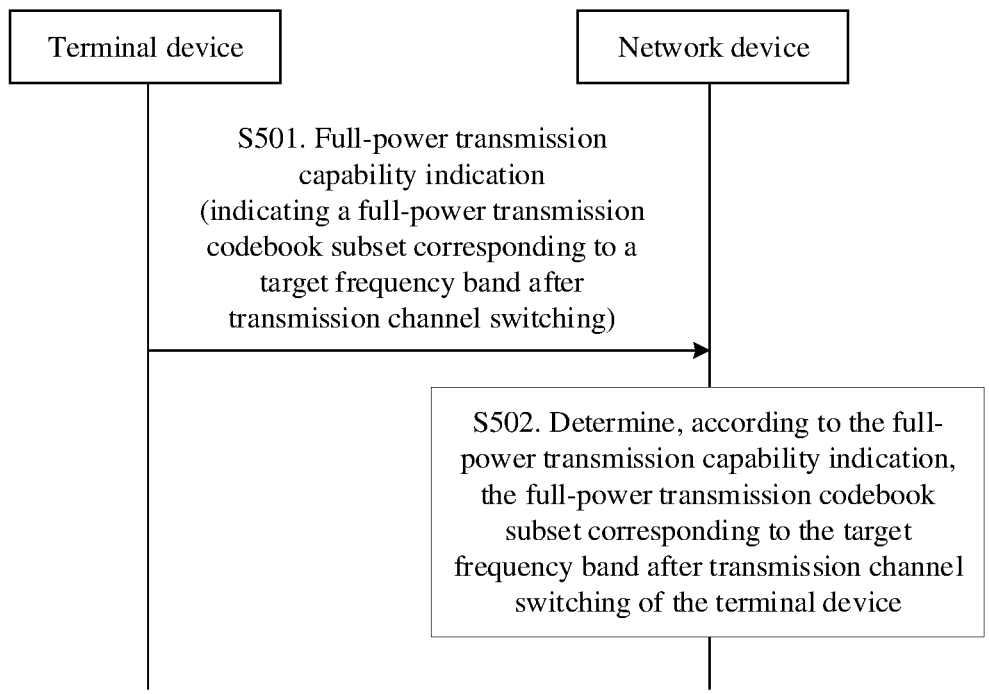
FIG. 5 is a flowchart of a method for determining a full-power transmission codebook subset according to an embodiment of this application.

In this embodiment, as shown in S502 in FIG. 5, the network device may determine, according to the full-power transmission capability indication reported by the terminal device, the full-power transmission codebook subset corresponding to the target frequency band after transmission channel switching of the terminal device.

In this way, before transmission channel switching of the terminal device, the network device may schedule, based on a full-power transmission codebook subset corresponding to a first frequency band before transmission channel switching, a codeword for uplink transmission for the terminal device working in the first frequency band. After transmission channel switching of the terminal device, the network device may schedule, based on a full-power transmission codebook subset corresponding to a second frequency band after transmission channel switching, a codeword for uplink transmission for the terminal device working in the second frequency band. Finally, uplink transmit power of the terminal device is optimized.

Figure 4:
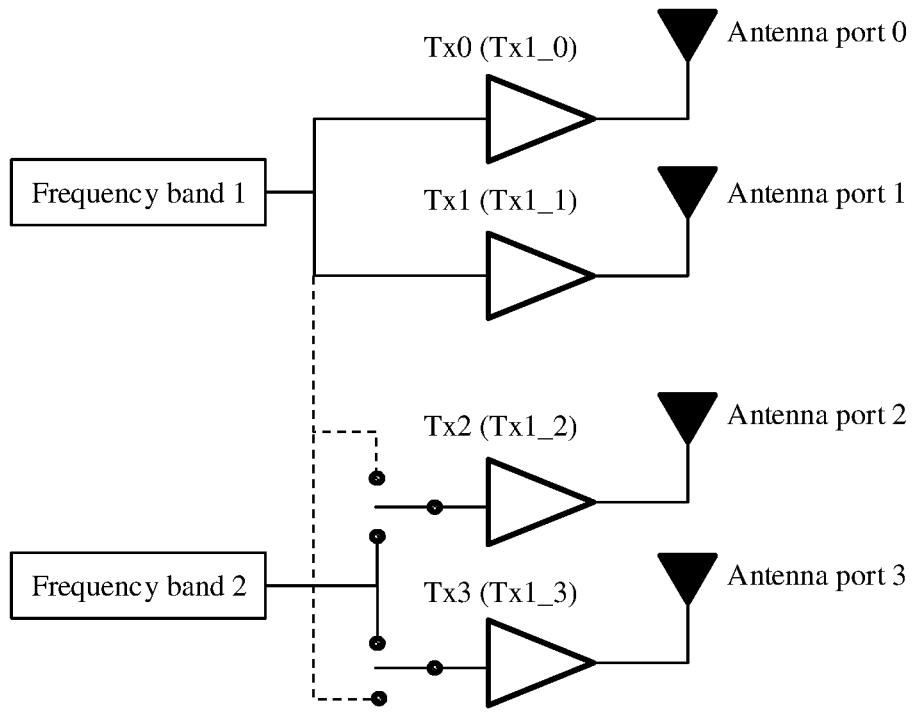
FIG. 4 is a schematic logical diagram of transmission channel switching of a terminal device according to an embodiment of this application.

FIG. 4 is still used as an example. The terminal device needs to report a full-power transmission codebook subset 1 corresponding to Tx0 and Tx1 in the frequency band 1, a full-power transmission codebook subset 2 corresponding to Tx2 and Tx3 in the frequency band 2, and a full-power transmission codebook subset 3 corresponding to Tx0 to Tx3 in the frequency band 1 after transmission channel switching. In comparison with a conventional method, in this method, the terminal device needs to additionally report a full-power transmission codebook subset after transmission channel switching. Therefore, more signaling overheads of the full-power transmission capability indication are additionally added.

Figure 6:
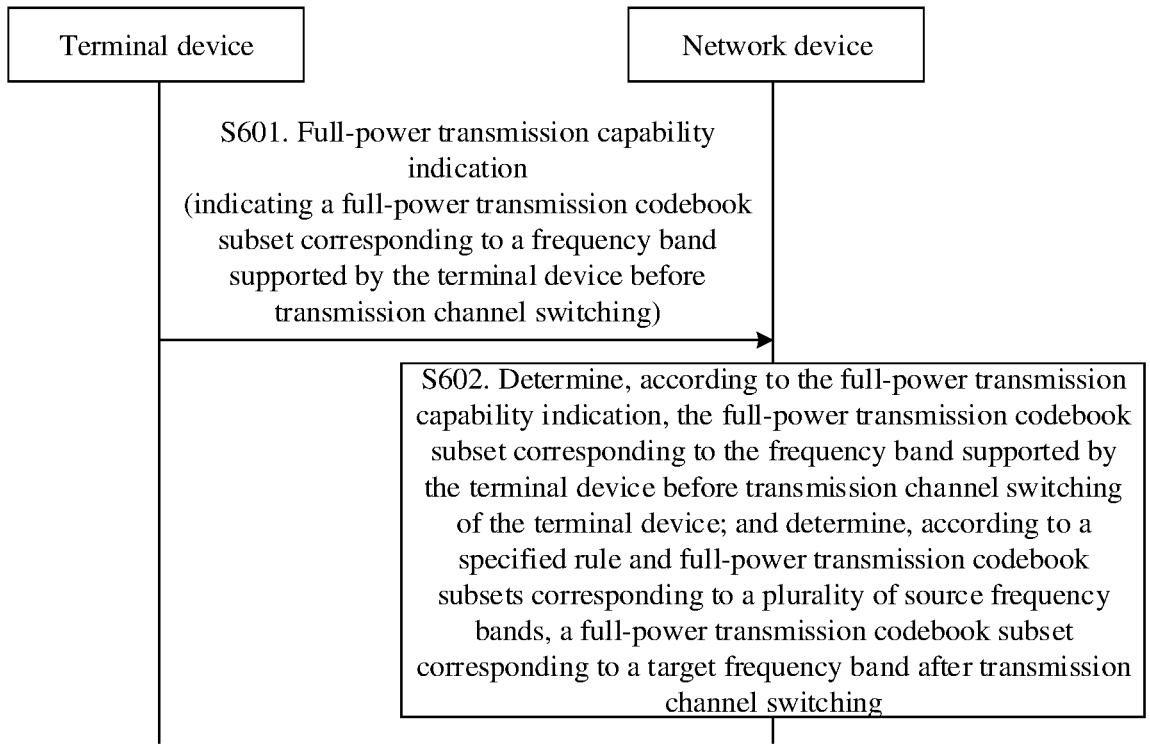
FIG. 6 is a flowchart of another method for determining a full-power transmission codebook subset according to an embodiment of this application.

Embodiment 4: as shown in FIG. 6.

S601. As in a conventional method, a terminal device reports, to a network device by using a full-power transmission capability indication, a full-power transmission codebook subset corresponding to a frequency band supported by the terminal device before transmission channel switching.

Specifically, the terminal device may determine, based on an uplink transmission capability in a transmission channel in each supported frequency band, a full-power transmission codebook subset corresponding to each frequency band before transmission channel switching.

S602. The network device and the terminal device may determine, according to the full-power transmission capability indication, the full-power transmission codebook subset corresponding to the frequency band supported by the terminal device before transmission channel switching; and determine, according to a specified rule and full-power transmission codebook subsets corresponding to a plurality of source frequency bands, a full-power transmission codebook subset corresponding to a target frequency band after transmission channel switching of the terminal device.

The plurality of source frequency bands are frequency bands in which a plurality of target transmission channels are located before transmission channel switching, a plurality of target antenna ports are transmission channels in the target frequency band after transmission channel switching, and the specified rule is used to indicate a correspondence between the full-power transmission codebook subsets corresponding to the plurality of source frequency bands before transmission channel switching and the full-power transmission codebook subset corresponding to the target frequency band after transmission channel switching. The target frequency band is a frequency band to which an antenna port of the terminal device is switched.

In an implementation, the specified rule may be determined by the network device based on a coherence capability (completely coherent, partially coherent, or incoherent) of the plurality of target transmission channels corresponding to the target frequency band.

Optionally, the network device may determine, in a plurality of manners, the coherence capability of the plurality of target transmission channels corresponding to the target frequency band.

Manner 1: The terminal device sends a first coherence capability indication to the network device. The first coherence capability indication is used to indicate the coherence capability of the plurality of target transmission channels in the target frequency band after transmission channel switching.

Optionally, the first coherence capability indication is further used to indicate a coherence capability of the transmission channel in the frequency band supported by the terminal device before transmission channel switching.

In the manner 1, the network device may determine, according to the first coherence capability indication, the coherence capability of the plurality of target transmission channels corresponding to the target frequency band.

FIG. 4 is still used as an example. The first coherence capability indication sent by the terminal device to the network device may indicate a coherence capability (coherent or incoherent) of Tx0 and Tx1 in the frequency band 1 before transmission channel switching, a coherence capability of Tx2 and Tx3 in the frequency band 2 before transmission channel switching, and a coherence capability (completely coherent, partially coherent, or incoherent) of Tx0 to Tx3 in the frequency band 1 after transmission channel switching.

Manner 2: The terminal device sends a second coherence capability indication to the network device. The second coherence capability indication is used to indicate a coherence capability of transmission channels between the plurality of source frequency bands (that is, a cross-band coherence capability of transmission channels) before transmission channel switching. The network device may determine a coherence capability of the plurality of target antenna ports based on a coherence capability of the antenna ports in the plurality of source frequency bands and the coherence capability of the transmission channels between the plurality of source frequency bands.

In the manner 2, the network device determines the plurality of source frequency bands in which the plurality of target transmission channels in the target frequency band are located; and then determines the coherence capability of the plurality of target transmission channels in the target frequency band based on a coherence capability of transmission channels corresponding to each source frequency band and the coherence capability of the transmission channels between the plurality of source frequency bands.

FIG. 4 is still used as an example. The first coherence capability indication sent by the terminal device to the network device may indicate a coherence capability (coherent or incoherent) of Tx0 and Tx1 in the frequency band 1 before transmission channel switching, a coherence capability of Tx2 and Tx3 in the frequency band 2 before transmission channel switching, and a coherence capability (coherent or incoherent) between Tx2 and Tx3 in the frequency band 2 after switching to the frequency band 1 and Tx0 and Tx1 in the frequency band 1.

Based on the foregoing method, this application provides the following possible implementations: In each implementation, the terminal device supports a first frequency band and a second frequency band, there are two antenna ports in the first frequency band before antenna port switching, there are two antenna ports in the second frequency band before antenna port switching, at least one antenna port in the second frequency band can be switched to a third frequency band, at least one antenna port in the first frequency band can be switched to the third frequency band, and there are four antenna ports in the third frequency band after antenna port switching. Optionally, the third frequency band may be the same as the first frequency band, or may be the same as the second frequency band, or the third frequency band is different from both the first frequency band and the second frequency band.

First Implementation:

The specified rule complies with a correspondence between a first column, a second column, and a third column in the following Table 12:

TABLE 12

| Full-power transmission codebook subset corresponding to the first frequency band before antenna port switching | Full-power transmission codebook subset corresponding to the second frequency band before antenna port switching | Full-power transmission codebook subset corresponding to the third frequency band after antenna port switching |
|---|---|---|
| $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | mode o |
| $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | $G_2$ |
| $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | oo | $G_1$ |

TABLE 12-continued

| Full-power transmission codebook subset corresponding to the first frequency band before antenna port switching | Full-power transmission codebook subset corresponding to the second frequency band before antenna port switching | Full-power transmission codebook subset corresponding to the third frequency band after antenna port switching |
|---|---|---|
| $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | $G_1$ |
| $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | oo | Go |
| oo | oo | — | where a full-power transmission codebook subset "00" corresponding to any frequency band indicates that the full-power transmission codebook subset is null, G0 to G6 represent different transmitted precoding matrix indicator TPMI groups, "mode 0" represents all codewords in an uplink precoding codebook, and "–" indicates absence.

In this implementation, the two antenna ports in the first frequency band are incoherent, the two antenna ports in the second frequency band are incoherent, and the four antenna ports in the third frequency band after antenna port switching of the terminal device are incoherent.

The antenna ports in the third frequency band after antenna port switching of the terminal device include a first antenna port, a second antenna port, a third antenna port, and a fourth antenna port, where the first antenna port is associated with a first row of a 4-port uplink precoding matrix, the second antenna port is associated with a second row of the 4-port uplink precoding matrix, the third antenna port is associated with a third row of the 4-port uplink precoding matrix, and the fourth antenna port is associated with a fourth row of the 4-port uplink precoding matrix; and by default, in the third frequency band after antenna port switching of the terminal device, maximum transmit power of the first antenna port is not less than maximum transmit power of the third antenna port, the maximum transmit power of the third antenna port is not less than maximum transmit power of the second antenna port, and the maximum transmit power of the second antenna port is not less than maximum transmit power of the fourth antenna port.

Second Implementation:

The specified rule complies with a correspondence between a first column, a second column, and a third column in the following Table 3:

TABLE 13

| Full-power transmission codebook subset corresponding to the first frequency band before antenna port switching | Full-power transmission codebook subset corresponding to the second frequency band before antenna port switching | Full-power transmission codebook subset corresponding to the third frequency band after antenna port switching |
|---|---|---|
| $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | mode o |
| $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | $G_2 + G_5$ |
| $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | oo | $G_1 + G_4$ |
| $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | $G_1 + G_4$ |
| $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | oo | Go |
| oo | oo | — | where a full-power transmission codebook subset "00" corresponding to any frequency band indicates that the full-power transmission codebook subset is null, G0 to G6 represent different transmitted precoding matrix indicator TPMI groups, "mode 0" represents all codewords in an uplink precoding codebook, "+" indicates that the full-power transmission codebook subset is a union set of two TPMI groups before and after "+", and "–" indicates absence.

In this implementation, the two antenna ports in the first frequency band are coherent, the two antenna ports in the second frequency band are coherent, and the four antenna ports in the third frequency band after antenna port switching of the terminal device are completely coherent.

The antenna ports in the third frequency band after antenna port switching of the terminal device include a first antenna port, a second antenna port, a third antenna port, and a fourth antenna port, where the first antenna port is associated with a first row of a 4-port uplink precoding matrix, the second antenna port is associated with a second row of the 4-port uplink precoding matrix, the third antenna port is associated with a third row of the 4-port uplink precoding matrix, and the fourth antenna port is associated with a fourth row of the 4-port uplink precoding matrix; and by default, in the third frequency band after antenna port switching of the terminal device, maximum transmit power of the first antenna port is not less than maximum transmit power of the third antenna port, the maximum transmit power of the third antenna port is not less than maximum transmit power of the second antenna port, and the maximum transmit power of the second antenna port is not less than maximum transmit power of the fourth antenna port.

Third Implementation:

The specified rule complies with a correspondence between a first column, a second column, and a third column in the following Table 14:

that the full-power transmission codebook subset is a union set of two TPMI groups before and after "+", and "−" indicates absence.

In this implementation, the two antenna ports in the first frequency band are coherent, the two antenna ports in the second frequency band are coherent, and the four antenna ports in the third frequency band after antenna port switching of the terminal device are partially coherent.

The antenna ports in the third frequency band after antenna port switching of the terminal device include a first antenna port, a second antenna port, a third antenna port, and a fourth antenna port, where the first antenna port is associated with a first row of a 4-port uplink precoding matrix, the second antenna port is associated with a second row of the 4-port uplink precoding matrix, the third antenna port is associated with a third row of the 4-port uplink precoding matrix, and the fourth antenna port is associated with a fourth row of the 4-port uplink precoding matrix; and by default, in the third frequency band after antenna port switching of the terminal device, the first antenna port is coherent with the third antenna port, the second antenna port is coherent with the fourth antenna port, maximum transmit power of the first antenna port is not less than maximum transmit power of the third antenna port, and maximum

TABLE 14

| Full-power transmission codebook subset corresponding to the first frequency band before antenna port switching | Full-power transmission codebook subset corresponding to the second frequency band before antenna port switching | Full-power transmission codebook subset corresponding to the third frequency band after antenna port switching |
|---|---|---|
| $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | mode o |
| $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | $G_2 + G_5$ |
| $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | oo | $G_1 + G_4$ |
| $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | Go |
| $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | oo | Go |
| oo | oo | — | where a full-power transmission codebook subset "00" corresponding to any frequency band indicates that the full-power transmission codebook subset is null, G0 to G6 represent different transmitted precoding matrix indicator TPMI groups, "mode 0" represents all codewords in an uplink precoding codebook, "+" indicates transmit power of the second antenna port is not less than maximum transmit power of the fourth antenna port.

Fourth Implementation:

The specified rule complies with a correspondence between a first column, a second column, and a third column in the following Table 15:

TABLE 15

| Full-power transmission codebook subset corresponding to the first frequency band before antenna port switching | Full-power transmission codebook subset corresponding to the second frequency band before antenna port switching | Full-power transmission codebook subset corresponding to the third frequency band after antenna port switching |
|---|---|---|
| $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | mode 0 |
| $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | $G_2 + G_5$ |
| $\left\{\frac{1}{\sqrt{2}}\begin{bmatrix}1\\0\end{bmatrix}, \frac{1}{\sqrt{2}}\begin{bmatrix}0\\1\end{bmatrix}\right\} + oo$ | oo | $G_1 + G_4$ |
| $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | $G_0$ |
| $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\} + oo$ | oo | $G_0$ |
| oo + oo | oo | — | where a full-power transmission codebook subset "00" corresponding to any frequency band indicates that the full-power transmission codebook subset is null, G0 to G6 represent different transmitted precoding matrix indicator TPMI groups, "mode 0" represents all codewords in an uplink precoding codebook, "+" indicates that the full-power transmission codebook subset is a union set of two TPMI groups before and after "+", and "—" indicates absence.

In this implementation, the two antenna ports in the first frequency band are coherent and the two antenna ports in the second frequency band are incoherent, or the two antenna ports in the first frequency band are incoherent and the two antenna ports in the second frequency band are coherent; and in the third frequency band after antenna port switching of the terminal device, only two of the four antenna ports are coherent.

The antenna ports in the third frequency band after antenna port switching of the terminal device include a first antenna port, a second antenna port, a third antenna port, and a fourth antenna port, where the first antenna port is associated with a first row of a 4-port uplink precoding matrix, the second antenna port is associated with a second row of the 4-port uplink precoding matrix, the third antenna port is associated with a third row of the 4-port uplink precoding matrix, and the fourth antenna port is associated with a fourth row of the 4-port uplink precoding matrix; and by default, in the third frequency band after antenna port switching of the terminal device, the first antenna port is coherent with the third antenna port, the second antenna port is incoherent with the fourth antenna port, maximum transmit power of the first antenna port is not less than maximum transmit power of the third antenna port, and maximum transmit power of the second antenna port is not less than maximum transmit power of the fourth antenna port.

Fifth Implementation:

The specified rule complies with a correspondence between a first column, a second column, and a third column in the following Table 16:

TABLE 16

| Full-power transmission codebook subset corresponding to the first frequency band before antenna port switching | Full-power transmission codebook subset corresponding to the second frequency band before antenna port switching | Full-power transmission codebook subset corresponding to the third frequency band after antenna port switching |
|---|---|---|
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | mode 0 |
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix}\text{ or }\frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $G_2$ |
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | $G_2$ |
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1&0\\0&1\end{bmatrix}\right\}$ | $G_1 + G_3$ |

TABLE 16-continued

| Full-power transmission codebook subset corresponding to the first frequency band before antenna port switching | Full-power transmission codebook subset corresponding to the second frequency band before antenna port switching | Full-power transmission codebook subset corresponding to the third frequency band after antenna port switching |
|---|---|---|
| $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $G_1 + G_3$ |
| $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | $G_1 + G_3$ |
| $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1&0\\0&1\end{bmatrix}\right\}$ | $G_0 + G_3$ |
| $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | $G_1$ |
| $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | $\left\{\frac{1}{\sqrt{2}}\begin{bmatrix}1&0\\0&1\end{bmatrix}\right\}$ | $G_0 + G_3$ |
| $\left\{\frac{1}{\sqrt{2}}\begin{bmatrix}1&0\\0&1\end{bmatrix}\right\}$ | $\left\{\frac{1}{\sqrt{2}}\begin{bmatrix}1&0\\0&1\end{bmatrix}\right\}$ | $G_3$ | where G0 to G6 represent different transmitted precoding matrix indicator TPMI groups, "mode 0" represents all codewords in an uplink precoding codebook, and "+" indicates that the full-power transmission codebook subset is a union set of two TPMI groups before and after "+"; and
a codeword $$\frac{1}{\sqrt{2}}\begin{bmatrix}1&0\\0&1\end{bmatrix}$$

included in any full-power transmission codebook subset is an indication codeword, and when a full-power transmission codebook subset corresponding to any frequency band includes the indication codeword, it indicates that maximum transmit power of each antenna port in the frequency band is greater than or equal to a preset value, or when a full-power transmission codebook subset corresponding to any frequency band does not include the indication codeword, it indicates that maximum transmit power of at least one antenna port in the frequency band is less than a preset value.

In this implementation, the two antenna ports in the first frequency band are incoherent, the two antenna ports in the second frequency band are incoherent, and the four antenna ports in the third frequency band after antenna port switching of the terminal device are incoherent.

The antenna ports in the third frequency band after antenna port switching of the terminal device include a first antenna port, a second antenna port, a third antenna port, and a fourth antenna port, where the first antenna port is associated with a first row of a 4-port uplink precoding matrix, the second antenna port is associated with a second row of the 4-port uplink precoding matrix, the third antenna port is associated with a third row of the 4-port uplink precoding matrix, and the fourth antenna port is associated with a fourth row of the 4-port uplink precoding matrix; and by default, in the third frequency band after antenna port switching of the terminal device, maximum transmit power of the first antenna port is not less than maximum transmit power of the third antenna port, the maximum transmit power of the third antenna port is not less than maximum transmit power of the second antenna port, and the maximum transmit power of the second antenna port is not less than maximum transmit power of the fourth antenna port.

Sixth Implementation:

The specified rule complies with a correspondence between a first column, a second column, and a third column in the following Table 17:

TABLE 17

| Full-power transmission codebook subset corresponding to the first frequency band before antenna port switching | Full-power transmission codebook subset corresponding to the second frequency band before antenna port switching | Full-power transmission codebook subset corresponding to the third frequency band after antenna port switching |
|---|---|---|
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | mode o |
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $G_2 + G_6$ |

TABLE 17-continued

| Full-power transmission codebook subset corresponding to the first frequency band before antenna port switching | Full-power transmission codebook subset corresponding to the second frequency band before antenna port switching | Full-power transmission codebook subset corresponding to the third frequency band after antenna port switching |
|---|---|---|
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | G2 + G5 |
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1&0\\0&1\end{bmatrix}\right\}$ | G1 + G6 |
| $\left\{\frac{1}{\sqrt{2}}\begin{bmatrix}1\\0\end{bmatrix}\text{ or }\frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix}\text{ or }\frac{1}{\sqrt{2}}\begin{bmatrix}0\\1\end{bmatrix}, \frac{1}{\sqrt{2}}\begin{bmatrix}1&0\\0&1\end{bmatrix}\right\}$ | G1 + G6 |
| $\left\{\frac{1}{\sqrt{2}}\begin{bmatrix}1\\0\end{bmatrix}\text{ or }\frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | G1 + G4 |
| $\left\{\frac{1}{\sqrt{2}}\begin{bmatrix}1\\0\end{bmatrix}\text{ or }\frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1&0\\0&1\end{bmatrix}\right\}$ | G0 + G6 |
| $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | G1 + G4 |
| $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | $\left\{\frac{1}{\sqrt{2}}\begin{bmatrix}1&0\\0&1\end{bmatrix}\right\}$ | G0 + G5 |
| $\left\{\frac{1}{\sqrt{2}}\begin{bmatrix}1&0\\0&1\end{bmatrix}\right\}$ | $\left\{\frac{1}{\sqrt{2}}\begin{bmatrix}1&0\\0&1\end{bmatrix}\right\}$ | G6 | where G0 to G6 represent different transmitted precoding matrix indicator TPMI groups, "mode 0" represents all codewords in an uplink precoding codebook, and "+" indicates that the full-power transmission codebook subset is a union set of two TPMI groups before and after "+"; and
a codeword $$\frac{1}{\sqrt{2}}\begin{bmatrix}1&0\\0&1\end{bmatrix}$$

included in any full-power transmission codebook subset is an indication codeword, and when a full-power transmission codebook subset corresponding to any frequency band includes the indication codeword, it indicates that maximum transmit power of each antenna port in the frequency band is greater than or equal to a preset value, or when a full-power transmission codebook subset corresponding to any frequency band does not include the indication codeword, it indicates that maximum transmit power of at least one antenna port in the frequency band is less than a preset value.

In this implementation, the two antenna ports in the first frequency band are coherent, the two antenna ports in the second frequency band are coherent, and the four antenna ports in the third frequency band after antenna port switching of the terminal device are completely coherent.

The antenna ports in the third frequency band after antenna port switching of the terminal device include a first antenna port, a second antenna port, a third antenna port, and a fourth antenna port, where the first antenna port is associated with a first row of a 4-port uplink precoding matrix, the second antenna port is associated with a second row of the 4-port uplink precoding matrix, the third antenna port is associated with a third row of the 4-port uplink precoding matrix, and the fourth antenna port is associated with a fourth row of the 4-port uplink precoding matrix; and by default, in the third frequency band after antenna port switching of the terminal device, maximum transmit power of the first antenna port is not less than maximum transmit power of the third antenna port, the maximum transmit power of the third antenna port is not less than maximum transmit power of the second antenna port, and the maximum transmit power of the second antenna port is not less than maximum transmit power of the fourth antenna port.

Seventh Implementation:

The specified rule complies with a correspondence between a first column, a second column, and a third column in the following Table 18:

TABLE 18

| Full-power transmission codebook subset corresponding to the first frequency band before antenna port switching | Full-power transmission codebook subset corresponding to the second frequency band before antenna port switching | Full-power transmission codebook subset corresponding to the third frequency band after antenna port switching |
|---|---|---|
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | mode 0 |
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | G2 + G6 |
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | G2 + G5 |
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1&0\\0&1\end{bmatrix}\right\}$ | G1 + G6 |
| $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | G0 + G6 |
| $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | G0 + G4 |
| $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1&0\\0&1\end{bmatrix}\right\}$ | G0 + G6 |
| $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | G0 |
| $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | $\left\{\frac{1}{\sqrt{2}}\begin{bmatrix}1&0\\0&1\end{bmatrix}\right\}$ | G0 |
| $\left\{\frac{1}{\sqrt{2}}\begin{bmatrix}1&0\\0&1\end{bmatrix}\right\}$ | $\left\{\frac{1}{\sqrt{2}}\begin{bmatrix}1&0\\0&1\end{bmatrix}\right\}$ | G6 | where G0 to G6 represent different transmitted precoding matrix indicator TPMI groups, "mode 0" represents all codewords in an uplink precoding codebook, and "+" indicates that the full-power transmission codebook subset is a union set of two TPMI groups before and after "+"; and
a codeword $$\frac{1}{\sqrt{2}}\begin{bmatrix}1&0\\0&1\end{bmatrix}$$

included in any full-power transmission codebook subset is an indication codeword, and when a full-power transmission codebook subset corresponding to any frequency band includes the indication codeword, it indicates that maximum transmit power of each antenna port in the frequency band is greater than or equal to a preset value, or when a full-power transmission codebook subset corresponding to any frequency band does not include the indication codeword, it indicates that maximum transmit power of at least one antenna port in the frequency band is less than a preset value.

In this implementation, the two antenna ports in the first frequency band are coherent, the two antenna ports in the second frequency band are coherent, and the four antenna ports in the third frequency band after antenna port switching of the terminal device are partially coherent.

The antenna ports in the third frequency band after antenna port switching of the terminal device include a first antenna port, a second antenna port, a third antenna port, and a fourth antenna port, where the first antenna port is associated with a first row of a 4-port uplink precoding matrix, the second antenna port is associated with a second row of the 4-port uplink precoding matrix, the third antenna port is associated with a third row of the 4-port uplink precoding matrix, and the fourth antenna port is associated with a fourth row of the 4-port uplink precoding matrix; and by default, in the third frequency band after antenna port switching of the terminal device, the first antenna port is coherent with the third antenna port, the second antenna port is coherent with the fourth antenna port, maximum transmit power of the first antenna port is not less than maximum transmit power of the third antenna port, and maximum transmit power of the second antenna port is not less than maximum transmit power of the fourth antenna port.

Eighth Implementation:

The specified rule complies with a correspondence between a first column, a second column, and a third column in the following Table 19:

TABLE 19

| Full-power transmission codebook subset corresponding to the first frequency band before antenna port switching | Full-power transmission codebook subset corresponding to the second frequency band before antenna port switching | Full-power transmission codebook subset corresponding to the third frequency band after antenna port switching |
|---|---|---|
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | mode 0 |
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $G_2 + G_5$ |
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | $G_2 + G_5$ |
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1&0\\0&1\end{bmatrix}\right\}$ | $G_1 + G_5$ |
| $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $G_0 + G_5$ |
| $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | $G_0 + G_4$ |
| $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1&0\\0&1\end{bmatrix}\right\}$ | $G_0 + G_5$ |
| $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | $G_0$ |
| $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | $\left\{\frac{1}{\sqrt{2}}\begin{bmatrix}1&0\\0&1\end{bmatrix}\right\}$ | $G_0$ |
| $\left\{\frac{1}{\sqrt{2}}\begin{bmatrix}1&0\\0&1\end{bmatrix}\right\}$ | $\left\{\frac{1}{\sqrt{2}}\begin{bmatrix}1&0\\0&1\end{bmatrix}\right\}$ | $G_5$ | where G0 to G6 represent different transmitted precoding matrix indicator TPMI groups, "mode 0" represents all codewords in an uplink precoding codebook, and "+" indicates that the full-power transmission codebook subset is a union set of two TPMI groups before and after "+"; and
a codeword $$\frac{1}{\sqrt{2}}\begin{bmatrix}1&0\\0&1\end{bmatrix}$$

included in any full-power transmission codebook subset is an indication codeword, and when a full-power transmission codebook subset corresponding to any frequency band includes the indication codeword, it indicates that maximum transmit power of each antenna port in the frequency band is greater than or equal to a preset value, or when a full-power transmission codebook subset corresponding to any frequency band does not include the indication codeword, it indicates that maximum transmit power of at least one antenna port in the frequency band is less than a preset value.

In this implementation, the two antenna ports in the first frequency band are coherent and the two antenna ports in the second frequency band are incoherent, or the two antenna ports in the first frequency band are incoherent and the two antenna ports in the second frequency band are coherent; and in the third frequency band after antenna port switching of the terminal device, only two of the four antenna ports are coherent.

The antenna ports in the third frequency band after antenna port switching of the terminal device include a first antenna port, a second antenna port, a third antenna port, and a fourth antenna port, where the first antenna port is associated with a first row of a 4-port uplink precoding matrix, the second antenna port is associated with a second row of the 4-port uplink precoding matrix, the third antenna port is associated with a third row of the 4-port uplink precoding matrix, and the fourth antenna port is associated with a fourth row of the 4-port uplink precoding matrix; and by default, in the third frequency band after antenna port switching of the terminal device, the first antenna port is coherent with the third antenna port, the second antenna port is incoherent with the fourth antenna port, maximum transmit power of the first antenna port is not less than maximum transmit power of the third antenna port, and maximum transmit power of the second antenna port is not less than maximum transmit power of the fourth antenna port.

In addition, in the method provided in this embodiment of this application, the network device may further determine maximum transmit power of the plurality of target transmission channels in the target frequency band in the following manner:

Manner 1: The network device determines the maximum transmit power of the plurality of target transmission channels in the target frequency band based on the full-power transmission codebook subset corresponding to the target frequency band. For a specific process, refer to a conventional process of inferring maximum transmit power of each transmission channel based on a full-power transmission codebook subset. Details are not described herein again.

Manner 2: The network device receives transmit power indication information from the terminal device, where the transmit power indication information is used to indicate the maximum transmit power of the plurality of target transmission channels after antenna port switching of the terminal device.

Manner 3: This manner is implemented when a communications system supports the method provided in Embodiment 2 to determine the maximum transmit power of the transmission channel in the frequency band supported by the terminal device. An example in which the plurality of source frequency bands of the plurality of target transmission channels in the target frequency band are the first frequency band and the second frequency band is used for description.

The network device receives a first full-power transmission capability indication from the terminal device, and receives a second full-power transmission capability indication from the terminal device, where the first full-power transmission capability indication includes first indication information and second indication information, the second full-power transmission capability indication includes third indication information and fourth indication information, the first indication information is used to indicate a full-power transmission codebook subset corresponding to the first frequency band, the second indication information is used to indicate value distribution of maximum transmit power of transmission channels in the first frequency band, the third indication information is used to indicate a full-power transmission codebook subset corresponding to the second frequency band, and the fourth indication information is used to indicate value distribution of maximum transmit power of transmission channels in the second frequency band; and the network device determines maximum transmit power of the plurality of target antenna ports in the target frequency band based on the full-power transmission codebook subset that is corresponding to the first frequency band and that is indicated by the first indication information, the value distribution indicated by the second indication information, the full-power transmission codebook subset that is corresponding to the second frequency band and that is indicated by the third indication information, and the value distribution indicated by the fourth indication information.

Specifically, the network device may determine the maximum transmit power of the transmission channels in the first frequency band based on the full-power transmission codebook subset indicated by the first indication information and the value distribution indicated by the second indication information. The network device may determine the maximum transmit power of the transmission channels in the second frequency band based on the full-power transmission codebook subset indicated by the third indication information and the value distribution indicated by the fourth indication information. For details, refer to descriptions in Embodiment 2. Details are not described herein again. Finally, the network device may determine the maximum transmit power of the plurality of target antenna ports in the target frequency band based on the maximum transmit power of the transmission channels in the first frequency band and the maximum transmit power of the transmission channels in the second frequency band.

In the method provided in this embodiment, the full-power transmission codebook subset after transmission channel switching complies with the specified rule, and both the network device and the terminal device determine, according to the specified rule, the full-power transmission codebook subset corresponding to the target frequency band after transmission channel switching. Therefore, in comparison with the method provided in Embodiment 1, the terminal device does not need to additionally report the full-power transmission codebook subset after transmission channel switching, and no additional signaling overhead of a full-power transmission capability indication is added.

It should be noted that in a transmission channel resource pooling solution for the terminal device, when scheduling, for the terminal device, a codeword for uplink transmission, the network device not only refers to the full-power transmission codebook subset corresponding to the target frequency band after transmission channel switching, but also may refer to a coherence capability of transmission channels working in the target frequency band. The target frequency band is a frequency band to which an antenna port of the terminal device is switched. Therefore, this application further provides a method for determining a coherence capability of transmission channels, and the method may be applied to Embodiment 3 and Embodiment 4. For a specific process of the method, refer to the descriptions of the two manners of determining, by the network device, the coherence capability of the transmission channels corresponding to the target frequency band in Embodiment 4. Details are not described herein again.

It should be further noted that, similarly to a conventional transmit power optimization solution, in Embodiment 3 and Embodiment 4, after the network device determines the full-power transmission codebook subset corresponding to the target frequency band after switching, the maximum transmit power of each transmission channel after switching may be further determined based on the maximum transmit power of the transmission channel before switching.

For ease of description of the specified rule, the scenario shown in FIG. 4 is still used as an example, and an example in which a power class of the terminal device in each frequency band is PC3 and a power adjustment value (for example, a power back-off value) after transmission channel switching is 0 dBm (that is, maximum transmit power remains unchanged before and after transmission channel switching) is used. Specified rules in different cases are shown in Table 20 to Table 27. A correspondence between a first column and a second column in each table is a specified rule.

In the following tables, if a full-power transmission codebook subset corresponding to any frequency band is "00", it indicates that the full-power transmission codebook subset is null. In addition, for a full-power transmission codebook subset represented by each TPMI group in the second column in each table, refer to Table 10, where "mode 0" indicates that maximum transmit power of any transmission channel can reach 23 dBm, that is, all codewords in the uplink precoding codebook can implement full-power transmission; "X" indicates an unknown number less than 23 dBm; and "–" indicates absence. In each table, "+" in the first column is used to distinguish between a full-power transmission codebook subset corresponding to the frequency band 1 and a full-power transmission codebook subset corresponding to the frequency band 2, "+" in the second column indicates that the full-power transmission codebook subset is a union set of two TPMI groups before and after "+", and "+" in the third column indicates values used to distinguish between maximum transmit power of different transmission channels.

After transmission channel switching, four transmission channels in the frequency band 1 are sorted as Tx1_0, Tx1_1, Tx1_2, and Tx1_3. Tx1_0 is associated with a first row of a 4-port uplink precoding matrix, Tx1_1 is associated with a second row of the 4-port uplink precoding matrix, Tx1_2 is associated with a third row of the 4-port uplink precoding matrix, and Tx1_3 is associated with a fourth row of the 4-port uplink precoding matrix.

After transmission channel switching, the four transmission channels in the frequency band 1 are sorted as Tx1_0, Tx1_1, Tx1_2, and Tx1_3, and by default, the maximum transmit power of the four transmission channels in the frequency band 1 satisfies: Tx1_0≥Tx1_2≥Tx1_1≥Tx1_3.

The third column is maximum transmit power of each transmission channel, inferred by the network device based on the full-power transmission codebook subset corresponding to each frequency band before transmission channel switching. For example, the terminal device reports that the full-power transmission codebook subset corresponding to the frequency band 1 is

TABLE 20

| Full-power transmission codebook subset corresponding to the frequency band 1 + Full-power transmission codebook subset corresponding to the frequency band 2 | Full-power transmission codebook subset corresponding to the frequency band 1 after transmission channel switching | Maximum transmit power (dBm) of each transmission channel in the frequency band 1 after transmission channel switching |
| --- | --- | --- |
| $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ + $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | mode o | 23 + 23 + 23 + 23 |
| $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ + $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | G2 | 23 + 23 + 23 + X |
| $\left\{\frac{1}{\sqrt{2}}\begin{bmatrix}1\\0\end{bmatrix}, \frac{1}{\sqrt{2}}\begin{bmatrix}0\\1\end{bmatrix}\right\} + oo$ | G1 | 23 + X + 23 + X |
| $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ + $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | G1 | 23 + X + 23 + X |
| $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\} + oo$ | Go | 23 + X + X + X |
| oo + oo | — | X + X + X + X |

In the specified rule shown in Table 20, without considering a newly added indication codeword $$\frac{1}{\sqrt{2}}\begin{bmatrix}1 & 0\\0 & 1\end{bmatrix}$$

for extending a full-power transmission codebook subset corresponding to two transmission channels, two transmission channels in the frequency band 1 are incoherent, two transmission channels in the frequency band 2 are incoherent, and the two transmission channels in the frequency band 2 after switching to the frequency band 1 are incoherent with the two transmission channels in the frequency band 1. In other words, the four transmission channels in the frequency band 1 after transmission channel switching are incoherent.

$$\left\{\frac{1}{\sqrt{2}}\begin{bmatrix}1\\0\end{bmatrix}, \frac{1}{\sqrt{2}}\begin{bmatrix}0\\1\end{bmatrix}\right\}$$

and that the full-power transmission codebook subset corresponding to the frequency band 2 is $$\left\{\frac{1}{\sqrt{2}}\begin{bmatrix}1\\0\end{bmatrix}\right\},$$

as shown in the third row in Table 12. This means that maximum transmit power of Tx0, Tx1, and Tx2 of the terminal device can reach 23 dBm and that maximum transmit power of Tx3 is less than 23 dBm, as shown in the third row and the third column in Table 12. The network device may determine that the full-power transmission codebook subset of the four transmission channels in the frequency band 1 after transmission channel switching is the TPMI group G2 in Table 10. When the network device schedules the terminal device to use any codeword in G2 to perform uplink transmission in the frequency band 1, the terminal device may set the power scaling factor to 1, to implement full-power transmission.

TABLE 21

| Full-power transmission codebook subset corresponding to the frequency band 1 + Full-power transmission codebook subset corresponding to the frequency band 2 | Full-power transmission codebook subset corresponding to the frequency band 1 after transmission channel switching | Maximum transmit power (dBm) of each transmission channel in the frequency band 1 after transmission channel switching |
|---|---|---|
| $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ + $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | mode o | 23 + 23 + 23 + 23 |
| $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ + $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | $G_2 + G_5$ | 23 + 23 + 23 + X |
| $\left\{\frac{1}{\sqrt{2}}\begin{bmatrix}1\\0\end{bmatrix}, \frac{1}{\sqrt{2}}\begin{bmatrix}0\\1\end{bmatrix}\right\} + oo$ | $G_1 + G_4$ | 23 + X + 23 + X |
| $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ + $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | $G_1 + G_4$ | 23 + X + 23 + X |
| $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\} + oo$ | Go | 23 + X + X + X |
| oo + oo | — | X + X + X + X |

In the specified rule shown in Table 21, without considering the newly added indication codeword $$\frac{1}{\sqrt{2}}\begin{bmatrix}1 & 0\\0 & 1\end{bmatrix},$$

the two transmission channels in the frequency band 1 are coherent, the two transmission channels in the frequency band 2 are coherent, and the two transmission channels in the frequency band 2 after switching to the frequency band 1 are coherent with the two transmission channels in the frequency band 1. In other words, the four transmission channels in the frequency band 1 after transmission channel switching are completely coherent.

After transmission channel switching, the four transmission channels in the frequency band 1 are sorted as Tx1_0, Tx1_1, Tx1_2, and Tx1_3, and by default, the maximum transmit power of the four transmission channels in the frequency band 1 satisfies: Tx1_0≥Tx1_2≥Tx1_1≥Tx1_3.

TABLE 22

| Full-power transmission codebook subset corresponding to the frequency band 1 + Full-power transmission codebook subset corresponding to the frequency band 2 | Full-power transmission codebook subset corresponding to the frequency band 1 after transmission channel switching | Maximum transmit power (dBm) of each transmission channel in the frequency band 1 after transmission channel switching |
|---|---|---|
| $\left\{\frac{1}{\sqrt{2}}\begin{bmatrix}1\\0\end{bmatrix}, \frac{1}{\sqrt{2}}\begin{bmatrix}0\\1\end{bmatrix}\right\} + \left\{\frac{1}{\sqrt{2}}\begin{bmatrix}1\\0\end{bmatrix}, \frac{1}{\sqrt{2}}\begin{bmatrix}0\\1\end{bmatrix}\right\}$ | mode o | 23 + 23 + 23 + 23 |

TABLE 22-continued

| Full-power transmission codebook subset corresponding to the frequency band 1 + Full-power transmission codebook subset corresponding to the frequency band 2 | Full-power transmission codebook subset corresponding to the frequency band 1 after transmission channel switching | Maximum transmit power (dBm) of each transmission channel in the frequency band 1 after transmission channel switching |
|---|---|---|
| $\left\{\frac{1}{\sqrt{2}}\begin{bmatrix}1\\0\end{bmatrix}, \frac{1}{\sqrt{2}}\begin{bmatrix}0\\1\end{bmatrix}\right\} + \left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | $G2 + G_5$ | 23 + 23 + 23 + X |
| $\left\{\frac{1}{\sqrt{2}}\begin{bmatrix}1\\0\end{bmatrix}, \frac{1}{\sqrt{2}}\begin{bmatrix}0\\1\end{bmatrix}\right\} + oo$ | $G1 + G_4$ | 23 + X + 23 + X |
| $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\} + \left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | Go | 23 + 23 + X + X |
| $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\} + oo$ | Go | 23 + X + X + X |
| oo + oo | — | X+X + X + X |

In the specified rule shown in Table 22, without considering the newly added indication codeword $$\frac{1}{\sqrt{2}}\begin{bmatrix}1 & 0\\0 & 1\end{bmatrix},$$

the two transmission channels in the frequency band 1 are coherent, the two transmission channels in the frequency band 2 are coherent, and the two transmission channels in the frequency band 2 after switching to the frequency band 1 are incoherent with the two transmission channels in the frequency band 1. In other words, the four transmission channels in the frequency band 1 after transmission channel switching are partially coherent.

After transmission channel switching, the four transmission channels in the frequency band 1 are sorted as Tx1_0, Tx1_1, Tx1_2, and Tx1_3. By default, in the frequency band 1 after transmission channel switching, Tx1_0 is coherent with Tx1_2, Tx1_1 is coherent with Tx1_3, and the maximum transmit power of the four transmission channels satisfies: Tx1_0≥Tx1_2, and Tx1_1≥Tx1_3.

TABLE 23

| Full-power transmission codebook subset corresponding to the frequency band 1 + Full-power transmission codebook subset corresponding to the frequency band 2 | Full-power transmission codebook subset corresponding to the frequency band 1 after transmission channel switching | Maximum transmit power (dBm) of each transmission channel in the frequency band 1 after transmission channel switching |
|---|---|---|
| $\left\{\frac{1}{\sqrt{2}}\begin{bmatrix}1\\0\end{bmatrix}, \frac{1}{\sqrt{2}}\begin{bmatrix}0\\1\end{bmatrix}\right\} + \left\{\frac{1}{\sqrt{2}}\begin{bmatrix}1\\0\end{bmatrix}, \frac{1}{\sqrt{2}}\begin{bmatrix}0\\1\end{bmatrix}\right\}$ | mode o | 23 + 23 + 23 + 23 |
| $\left\{\frac{1}{\sqrt{2}}\begin{bmatrix}1\\0\end{bmatrix}, \frac{1}{\sqrt{2}}\begin{bmatrix}0\\1\end{bmatrix}\right\} + \left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | $G2 + G_5$ | 23 + 23 + 23 + X |
| $\left\{\frac{1}{\sqrt{2}}\begin{bmatrix}1\\0\end{bmatrix}, \frac{1}{\sqrt{2}}\begin{bmatrix}0\\1\end{bmatrix}\right\} + oo$ | $G1 + G_4$ | 23 + X + 23 + X |
| $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\} + \left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | Go | 23 + 23 + X + X |
| $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\} + oo$ | Go | 23 + X + X + X |
| oo + oo | — | X + X + X + X |

In the specified rule shown in Table 23, without considering the newly added indication codeword $$\frac{1}{\sqrt{2}}\begin{bmatrix}1 & 0\\0 & 1\end{bmatrix},$$

the two transmission channels in the frequency band 1 are coherent, and the two transmission channels in the frequency band 2 are incoherent (or the two transmission channels in the frequency band 1 are incoherent, and the two transmission channels in the frequency band 2 are coherent), and the two transmission channels in the frequency band 2 after switching to the frequency band 1 are incoherent with the two transmission channels in the frequency band 1. In other words, after transmission channel switching, only two of the four transmission channels in the frequency band 1 are coherent.

After transmission channel switching, the four transmission channels in the frequency band 1 are sorted as Tx1_0, Tx1_1, Tx1_2, and Tx1_3. By default, in the frequency band 1 after transmission channel switching, Tx1_0 is coherent with Tx1_2, Tx1_1 is incoherent with Tx1_3, and the maximum transmit power of the four transmission channels satisfies: Tx1_0≥Tx1_2, and Tx1_1≥Tx1_3.

In the specified rule shown in Table 24, without considering the newly added indication codeword $$\frac{1}{\sqrt{2}}\begin{bmatrix} 1 & 0 \\ 0 & 1 \end{bmatrix},$$

the two transmission channels in the frequency band 1 are incoherent, the two transmission channels in the frequency band 2 are incoherent, and the two transmission channels in the frequency band 2 after switching to the frequency band 1 are incoherent with the two transmission channels in the frequency band 1. In other words, the four transmission channels in the frequency band 1 after transmission channel switching are incoherent.

After transmission channel switching, the four transmission channels in the frequency band 1 are sorted as Tx1_0, Tx1_1, Tx1_2, and Tx1_3, and by default, the maximum transmit power of the four transmission channels in the frequency band 1 satisfies: Tx1_0≥Tx1_2≥_Tx1_1≥Tx1_3.

TABLE 24

| Full-power transmission codebook subset corresponding to the frequency band 1 + Full-power transmission codebook subset corresponding to the frequency band 2 | Full-power transmission codebook subset corresponding to the frequency band 1 after transmission channel switching | Maximum transmit power (dBm) of each transmission channel in the frequency band 1 after transmission channel switching |
|---|---|---|
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\} + \left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | mode 0 | 23 + 23 + 23 + 23 |
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\} + \left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | G2 | 23 + 23 + 23 + 20 |
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\} + \left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | G2 | 23 + 23 + 23 + 17 |
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\} + \left\{\frac{1}{\sqrt{2}}\begin{bmatrix}1&0\\0&1\end{bmatrix}\right\}$ | G1 + G3 | 23 + 20 + 23 + 20 |
| $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\} + \left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | G1 + G3 | 23 + 20 + 23 + 20 |
| $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\} + \left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | G1 + G3 | 23 + 20 + 23 + 17 |
| $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\} + \left\{\frac{1}{\sqrt{2}}\begin{bmatrix}1&0\\0&1\end{bmatrix}\right\}$ | G0 + G3 | 23 + 20 + 20 + 20 |
| $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\} + \left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | G1 | 23 + 17 + 23 + 17 |
| $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\} + \left\{\frac{1}{\sqrt{2}}\begin{bmatrix}1&0\\0&1\end{bmatrix}\right\}$ | G0 + G3 | 23 + 20 + 20 + 17 |
| $\left\{\frac{1}{\sqrt{2}}\begin{bmatrix}1&0\\0&1\end{bmatrix}\right\} + \left\{\frac{1}{\sqrt{2}}\begin{bmatrix}1&0\\0&1\end{bmatrix}\right\}$ | G3 | 20 + 20 + 20 + 20 |

TABLE 25

| Full-power transmission codebook subset corresponding to the frequency band 1 + Full-power transmission codebook subset corresponding to the frequency band 2 | Full-power transmission codebook subset corresponding to the frequency band 1 after transmission channel switching | Maximum transmit power (dBm) of each transmission channel in the frequency band 1 after transmission channel switching |
|---|---|---|
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\} + \left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | mode o | 23 + 23 + 23 + 23 |
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\} + \left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | G2 + G6 | 23 + 23 + 23 + 20 |
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\} + \left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | G2 + G5 | 23 + 23 + 23 + 17 |
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\} + \left\{\frac{1}{\sqrt{2}}\begin{bmatrix}1&0\\0&1\end{bmatrix}\right\}$ | G1 + G6 | 23 + 20 + 23 + 20 |
| $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\} + \left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | G1 + G6 | 23 + 20 + 23 + 20 |
| $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\} + \left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | G1 + G4 | 23 + 20 + 23 + 17 |
| $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\} + \left\{\frac{1}{\sqrt{2}}\begin{bmatrix}1&0\\0&1\end{bmatrix}\right\}$ | Go + G6 | 23 + 20 + 20 + 20 |
| $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\} + \left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | G1 + G4 | 23 + 17 + 23 + 17 |
| $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\} + \left\{\frac{1}{\sqrt{2}}\begin{bmatrix}1&0\\0&1\end{bmatrix}\right\}$ | Go + G5 | 23 + 20 + 20 + 17 |
| $\left\{\frac{1}{\sqrt{2}}\begin{bmatrix}1&0\\0&1\end{bmatrix}\right\} + \left\{\frac{1}{\sqrt{2}}\begin{bmatrix}1&0\\0&1\end{bmatrix}\right\}$ | G6 | 20 + 20 + 20 + 20 |

In the specified rule shown in Table 25, without considering the newly added indication codeword $$\frac{1}{\sqrt{2}}\begin{bmatrix}1&0\\0&1\end{bmatrix},$$

the two transmission channels in the frequency band 1 are coherent, and the two transmission channels in the frequency band 2 are coherent and the two transmission channels in the frequency band 2 after switching to the frequency band 1 are coherent with the two transmission channels in the frequency band 1. In other words, the four transmission channels in the frequency band after transmission channel switching are completely coherent.

After transmission channel switching, the four transmission channels in the frequency band 1 are sorted as Tx1_0, Tx1_1, Tx1_2, and Tx1_3, and by default, the maximum transmit power of the four transmission channels in the frequency band 1 satisfies: Tx1_0≥Tx1_2≥Tx1_1≥Tx1_3.

TABLE 26

| Full-power transmission codebook subset corresponding to the frequency band 1 + Full-power transmission codebook subset corresponding to the frequency band 2 | Full-power transmission codebook subset corresponding to the frequency band 1 after transmission channel switching | Maximum transmit power (dBm) of each transmission channel in the frequency band 1 after transmission channel switching |
|---|---|---|
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\} + \left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | mode o | 23 + 23 + 23 + 23 |
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\} + \left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | G2 + G6 | 23 + 23 + 23 + 20 |

TABLE 26-continued

| Full-power transmission codebook subset corresponding to the frequency band 1 + Full-power transmission codebook subset corresponding to the frequency band 2 | Full-power transmission codebook subset corresponding to the frequency band 1 after transmission channel switching | Maximum transmit power (dBm) of each transmission channel in the frequency band 1 after transmission channel switching |
|---|---|---|
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\} + \left\{\frac{1}{\sqrt{2}}\begin{bmatrix}1\\0\end{bmatrix} \text{ or } \frac{1}{\sqrt{2}}\begin{bmatrix}0\\1\end{bmatrix}\right\}$ | $G_2 + G_5$ | 23 + 23 + 23 + 17 |
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\} + \left\{\frac{1}{\sqrt{2}}\begin{bmatrix}1&0\\0&1\end{bmatrix}\right\}$ | $G_1 + G_6$ | 23 + 20 + 23 + 20 |
| $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\} + \left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $G_0 + G_6$ | 23 + 23 + 20 + 20 |
| $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\} + \left\{\frac{1}{\sqrt{2}}\begin{bmatrix}1\\0\end{bmatrix} \text{ or } \frac{1}{\sqrt{2}}\begin{bmatrix}0\\1\end{bmatrix}\right\}$ | $G_0 + G_4$ | 23 + 23 + 20 + 17 |
| $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\} + \left\{\frac{1}{\sqrt{2}}\begin{bmatrix}1&0\\0&1\end{bmatrix}\right\}$ | $G_0 + G_6$ | 23 + 20 + 20 + 20 |
| $\left\{\frac{1}{\sqrt{2}}\begin{bmatrix}1\\0\end{bmatrix} \text{ or } \left\{\frac{1}{\sqrt{2}}\begin{bmatrix}0\\1\end{bmatrix}\right\}\right\} + \left\{\frac{1}{\sqrt{2}}\begin{bmatrix}1\\0\end{bmatrix} \text{ or } \frac{1}{\sqrt{2}}\begin{bmatrix}0\\1\end{bmatrix}\right\}$ | $G_0$ | 23 + 23 + 17 + 17 |
| $\left\{\frac{1}{\sqrt{2}}\begin{bmatrix}1\\0\end{bmatrix} \text{ or } \left\{\frac{1}{\sqrt{2}}\begin{bmatrix}0\\1\end{bmatrix}\right\}\right\} + \left\{\frac{1}{\sqrt{2}}\begin{bmatrix}1&0\\0&1\end{bmatrix}\right\}$ | $G_0$ | 23 + 20 + 17 + 20 |
| $\left\{\frac{1}{\sqrt{2}}\begin{bmatrix}1&0\\0&1\end{bmatrix}\right\} + \left\{\frac{1}{\sqrt{2}}\begin{bmatrix}1&0\\0&1\end{bmatrix}\right\}$ | $G_6$ | 20 + 20 + 20 + 20 |

In the specified rule shown in Table 26, considering the newly added indication codeword $$\frac{1}{\sqrt{2}}\begin{bmatrix}1 & 0\\0 & 1\end{bmatrix},$$

the two transmission channels in the frequency band 1 are coherent, the two transmission channels in the frequency band 2 are coherent, and the two transmission channels in the frequency band 2 after switching to the frequency band 1 are incoherent with the two transmission channels in the frequency band 1. In other words, the four transmission channels in the frequency band 1 after transmission channel switching are partially coherent.

After transmission channel switching, the four transmission channels in the frequency band 1 are sorted as Tx1_0, Tx1_1, Tx1_2, and Tx1_3. By default, in the frequency band 1 after switching, Tx1_0 is coherent with Tx1_2, Tx1_1 is coherent with Tx1_3, and the maximum transmit power of the four transmission channels satisfies: Tx1_0≥Tx1_2, and Tx1_1≥Tx1_3.

TABLE 27

| Full-power transmission codebook subset corresponding to the frequency band 1 + Full-power transmission codebook subset corresponding to the frequency band 2 | Full-power transmission codebook subset corresponding to the frequency band 1 after transmission channel switching | Maximum transmit power (dBm) of each transmission channel in the frequency band 1 after transmission channel switching |
|---|---|---|
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\} + \left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | mode o | 23 + 23 + 23 + 23 |
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\} + \left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $G_2 + G_5$ | 23 + 23 + 23 + 20 |
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\} + \left\{\frac{1}{\sqrt{2}}\begin{bmatrix}1\\0\end{bmatrix} \text{ or } \frac{1}{\sqrt{2}}\begin{bmatrix}0\\1\end{bmatrix}\right\}$ | $G_2 + G_5$ | 23 + 23 + 23 + 17 |
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\} + \left\{\frac{1}{\sqrt{2}}\begin{bmatrix}1&0\\0&1\end{bmatrix}\right\}$ | $G_1 + G_5$ | 23 + 20 + 23 + 20 |

TABLE 27-continued

| Full-power transmission codebook subset corresponding to the frequency band 1 + Full-power transmission codebook subset corresponding to the frequency band 2 | Full-power transmission codebook subset corresponding to the frequency band 1 after transmission channel switching | Maximum transmit power (dBm) of each transmission channel in the frequency band 1 after transmission channel switching |
|---|---|---|
| $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\} + \left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $G_0 + G_5$ | 23 + 23 + 20 + 20 |
| $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\} + \left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | $G_0 + G_4$ | 23 + 23 + 20 + 17 |
| $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\} + \left\{\frac{1}{\sqrt{2}}\begin{bmatrix}1&0\\0&1\end{bmatrix}\right\}$ | $G_0 + G_5$ | 23 + 20 + 20 + 20 |
| $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\} + \left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | $G_0$ | 23 + 23 + 17 + 17 |
| $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\} + \left\{\frac{1}{\sqrt{2}}\begin{bmatrix}1&0\\0&1\end{bmatrix}\right\}$ | $G_0$ | 23 + 20 + 17 + 20 |
| $\left\{\frac{1}{\sqrt{2}}\begin{bmatrix}1&0\\0&1\end{bmatrix}\right\} + \left\{\frac{1}{\sqrt{2}}\begin{bmatrix}1&0\\0&1\end{bmatrix}\right\}$ | $G_5$ | 20 + 20 + 20 + 20 |

In the specified rule shown in Table 27, considering the newly added indication codeword $$\frac{1}{\sqrt{2}}\begin{bmatrix}1&0\\0&1\end{bmatrix},$$

the two transmission channels in the frequency band 1 are coherent, and the two transmission channels in the frequency band 2 are incoherent (or the two transmission channels in the frequency band 1 are incoherent, and the two transmission channels in the frequency band 2 are coherent), and the two transmission channels in the frequency band 2 after switching to the frequency band 1 are incoherent with the two transmission channels in the frequency band 1. In other words, after transmission channel switching, only two of the four transmission channels in the frequency band 1 are coherent.

After transmission channel switching, the four transmission channels in the frequency band 1 are sorted as Tx1_0, Tx1_1, Tx1_2, and Tx1_3. By default, in the frequency band 1 after switching, Tx1_0 is coherent with Tx1_2, Tx1_1 is incoherent with Tx1_3, and the maximum transmit power of the four transmission channels satisfies: Tx1_0≥Tx1_2, and Tx1_1≥Tx1_3.

Finally, it should be further noted that the transmission channel switching manner shown in FIG. 4 is merely an example, and does not constitute a limitation on the transmission channel switching manner of the terminal device. The method provided in embodiments of this application is applicable to various transmission channel switching manners. For example, the terminal device supports two transmission channels in both a frequency band 1 and a frequency band 2, and the two transmission channels in the frequency band 1 may be switched to the frequency band 2. For another example, the terminal device supports two transmission channels in each of a frequency band 1, a frequency band 2, and a frequency band 3, and one transmission channel in the frequency band 2 and one transmission channel in the frequency band 3 may be switched to the frequency band 1.

In addition, it should be noted that, in the descriptions of the foregoing examples, it is only assumed that a power class (Power Class, PC) of each frequency band is PC3, that is, maximum total transmit power of the terminal device allowed in each frequency band is 23 dBm. However, the method used in embodiments of this application is not limited to PC3, and the method is still applicable when the maximum total transmit power of the terminal device allowed in each frequency band is another value.

Figure 7:
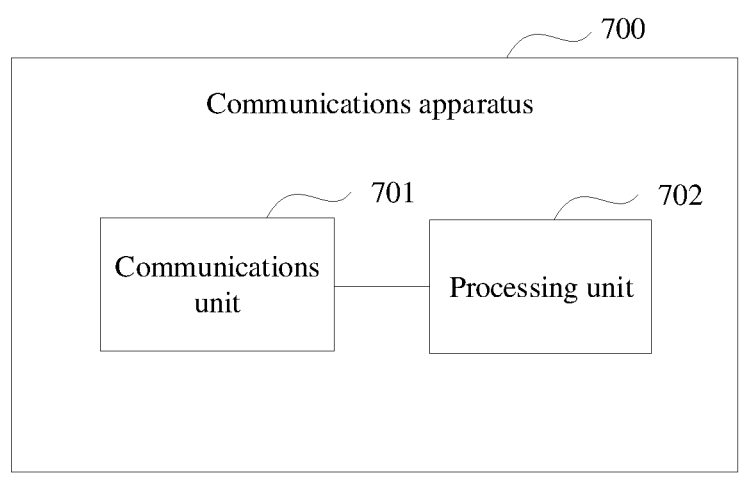
FIG. 7 is a diagram of a structure of a communications apparatus according to an embodiment of this application.

Based on a same technical concept, this application further provides a communications apparatus. The communications apparatus may be applied to the terminal device or the network device in the mobile communications system shown in FIG. 1A. The communications apparatus is configured to implement the methods provided in the foregoing embodiments and examples. Refer to FIG. 7. The communications apparatus includes a communications unit 701 and a processing unit 702. The communications unit 701 is configured to receive and send signals. A physical representation form of the communications unit 701 may be a transceiver, an antenna, or the like.

In an implementation, the communications apparatus 700 is used by the terminal device or the network device to implement the method for determining a full-power transmission codebook subset according to the embodiment shown in FIG. 6. The following describes functions of each unit in this implementation.

The processing unit 702 is configured to: determine a full-power transmission codebook subset corresponding to a frequency band supported by a terminal device before antenna port switching of the terminal device; and determine, according to a specified rule and full-power transmission codebook subsets corresponding to a plurality of source frequency bands, a full-power transmission codebook subset corresponding to a target frequency band after antenna port switching of the terminal device, where the plurality of source frequency bands are frequency bands in which a plurality of target antenna ports are located before antenna port switching, the plurality of target antenna ports are antenna ports in the target frequency band after antenna port switching, and the specified rule is used to indicate a correspondence between the full-power transmission codebook subsets corresponding to the plurality of source frequency bands before antenna port switching and the full-power transmission codebook subset corresponding to the target frequency band after antenna port switching.

In a possible design, when the communications apparatus 700 is applied to a network device, when determining the full-power transmission codebook subset corresponding to the frequency band supported by the terminal device before antenna port switching of the terminal device, the processing unit 702 is specifically configured to:

receive, by using the communications unit 701, a full-power transmission capability indication from the terminal device, where the full-power transmission capability indication is used to indicate the full-power transmission codebook subset corresponding to the frequency band supported by the terminal device before antenna port switching of the terminal device.

In a possible design, when the communications apparatus 700 is applied to the terminal device, the communications unit 701 is further configured to send a full-power transmission capability indication to a network device, where the full-power transmission capability indication is used to indicate the full-power transmission codebook subset corresponding to the frequency band supported by the terminal device before antenna port switching of the terminal device.

In a possible design, the specified rule is determined based on a coherence capability of the plurality of target antenna ports in the target frequency band.

In a possible design, when the method is applied to the network device, the coherence capability of the plurality of target antenna ports is determined in the following manner:

receiving a first coherence capability indication from the terminal device by using the communications unit 701, where the first coherence capability indication is used to indicate the coherence capability of the plurality of target antenna ports; or receiving a second coherence capability indication from the terminal device by using the communications unit 701, where the second coherence capability indication is used to indicate a coherence capability of antenna ports between the plurality of source frequency bands before antenna port switching of the terminal device; and determining the coherence capability of the plurality of target antenna ports based on a coherence capability of antenna ports in the plurality of source frequency bands and the coherence capability of antenna ports between the plurality of source frequency bands.

In a first possible implementation, the terminal device supports a first frequency band and a second frequency band, there are two antenna ports in the first frequency band before antenna port switching, there are two antenna ports in the second frequency band before antenna port switching, at least one antenna port in the second frequency band can be switched to a third frequency band, at least one antenna port in the first frequency band can be switched to the third frequency band, and there are four antenna ports in the third frequency band after antenna port switching; and in the foregoing case, the specified rule complies with a correspondence between a first column, a second column, and a third column in the following table:

| Full-power transmission codebook subset corresponding to the first frequency band before antenna port switching | Full-power transmission codebook subset corresponding to the second frequency band before antenna port switching | Full-power transmission codebook subset corresponding to the third frequency band after antenna port switching |
|---|---|---|
| $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | mode o |
| $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | G2 |
| $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | oo | G1 |
| $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | G1 |
| $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | oo | Go |
| oo | oo | — | where a full-power transmission codebook subset "00" corresponding to any frequency band indicates that the full-power transmission codebook subset is null, G0 to G6 represent different transmitted precoding matrix indicator TPMI groups, "mode 0" represents all codewords in an uplink precoding codebook, and "—" indicates absence.

In a second possible implementation, the terminal device supports a first frequency band and a second frequency band, there are two antenna ports in the first frequency band before antenna port switching, there are two antenna ports in the second frequency band before antenna port switching, at least one antenna port in the second frequency band can be switched to a third frequency band, at least one antenna port in the first frequency band can be switched to the third frequency band, and there are four antenna ports in the third frequency band after antenna port switching; and in the foregoing case, the specified rule complies with a correspondence between a first column, a second column, and a third column in the following table:

| Full-power transmission codebook subset corresponding to the first frequency band before antenna port switching | Full-power transmission codebook subset corresponding to the second frequency band before antenna port switching | Full-power transmission codebook subset corresponding to the third frequency band after antenna port switching |
|---|---|---|
| $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | mode 0 |
| $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | G2 + G5 |
| $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | 00 | G1 + G4 |
| $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | G1 + G4 |
| $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | 00 | G0 |
| 00 | 00 | — | where a full-power transmission codebook subset "00" corresponding to any frequency band indicates that the full-power transmission codebook subset is null, G0 to G6 represent different transmitted precoding matrix indicator TPMI groups, "mode 0" represents all codewords in an uplink precoding codebook, "+" indicates that the full-power transmission codebook subset is a union set of two TPMI groups before and after "+", and "−" indicates absence.

In a third possible implementation, the terminal device supports a first frequency band and a second frequency band, there are two antenna ports in the first frequency band before antenna port switching, there are two antenna ports in the second frequency band before antenna port switching, at least one antenna port in the second frequency band can be switched to a third frequency band, at least one antenna port in the first frequency band can be switched to the third frequency band, and there are four antenna ports in the third frequency band after antenna port switching; and in the foregoing case, the specified rule complies with a correspondence between a first column, a second column, and a third column in the following table:

| Full-power transmission codebook subset corresponding to the first frequency band before antenna port switching | Full-power transmission codebook subset corresponding to the second frequency band before antenna port switching | Full-power transmission codebook subset corresponding to the third frequency band after antenna port switching |
|---|---|---|
| $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | mode 0 |
| $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | G2 + G5 |
| $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | 00 | G1 + G4 |
| $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | G0 |
| $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | 00 | G0 |
| 00 | 00 | — | where a full-power transmission codebook subset "00" corresponding to any frequency band indicates that the full-power transmission codebook subset is null, G0 to G6 represent different transmitted precoding matrix indicator TPMI groups, "mode 0" represents all codewords in an uplink precoding codebook, "+" indicates that the full-power transmission codebook subset is a union set of two TPMI groups before and after "+", and "−" indicates absence.

In a fourth possible implementation, the terminal device supports a first frequency band and a second frequency band, there are two antenna ports in the first frequency band before antenna port switching, there are two antenna ports in the second frequency band before antenna port switching, at least one antenna port in the second frequency band can be switched to a third frequency band, at least one antenna port in the first frequency band can be switched to the third frequency band, and there are four antenna ports in the third frequency band after antenna port switching; and in the foregoing case, the specified rule complies with a correspondence between a first column, a second column, and a third column in the following table:

| Full-power transmission codebook subset corresponding to the first frequency band before antenna port switching | Full-power transmission codebook subset corresponding to the second frequency band before antenna port switching | Full-power transmission codebook subset corresponding to the third frequency band after antenna port switching |
|---|---|---|
| $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | mode 0 |
| $\left\{\frac{1}{\sqrt{2}}\begin{bmatrix}1\\0\end{bmatrix}, \frac{1}{\sqrt{2}}\begin{bmatrix}0\\1\end{bmatrix}\right\} + 00$ | $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | G2 + G5 |
| $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | 00 | G1 + G4 |
| $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | G0 |
| $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | 00 | G0 |
| 00 + 00 | 00 | — | where a full-power transmission codebook subset "00" corresponding to any frequency band indicates that the full-power transmission codebook subset is null, G0 to G6 represent different transmitted precoding matrix indicator TPMI groups, "mode 0" represents all codewords in an uplink precoding codebook, "+" indicates that the full-power transmission codebook subset is a union set of two TPMI groups before and after "+", and "—" indicates absence.

In a fifth possible implementation, the terminal device supports a first frequency band and a second frequency band, there are two antenna ports in the first frequency band before antenna port switching, there are two antenna ports in the second frequency band before antenna port switching, at least one antenna port in the second frequency band can be switched to a third frequency band, at least one antenna port in the first frequency band can be switched to the third frequency band, and there are four antenna ports in the third frequency band after antenna port switching; and in the foregoing case, the specified rule complies with a correspondence between a first column, a second column, and a third column in the following table:

| Full-power transmission codebook subset corresponding to the first frequency band before antenna port switching | Full-power transmission codebook subset corresponding to the second frequency band before antenna port switching | Full-power transmission codebook subset corresponding to the third frequency band after antenna port switching |
|---|---|---|
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | mode 0 |
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix}\right\}$ or $\frac{1}{\sqrt{2}}\begin{bmatrix}0\\1\end{bmatrix}, \frac{1}{\sqrt{2}}\begin{bmatrix}1&0\\0&1\end{bmatrix}$ | G2 |
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | G2 |
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1&0\\0&1\end{bmatrix}\right\}$ | G1 + G3 |
| $\left\{\frac{1}{\sqrt{2}}\begin{bmatrix}1\\0\end{bmatrix}\right\}$ or $\frac{1}{\sqrt{2}}\begin{bmatrix}0\\1\end{bmatrix}, \frac{1}{\sqrt{2}}\begin{bmatrix}1&0\\0&1\end{bmatrix}$ | $\left\{\frac{1}{\sqrt{2}}\begin{bmatrix}1\\0\end{bmatrix}\right\}$ or $\frac{1}{\sqrt{2}}\begin{bmatrix}0\\1\end{bmatrix}, \frac{1}{\sqrt{2}}\begin{bmatrix}1&0\\0&1\end{bmatrix}$ | G1 + G3 |

-continued

| Full-power transmission codebook subset corresponding to the first frequency band before antenna port switching | Full-power transmission codebook subset corresponding to the second frequency band before antenna port switching | Full-power transmission codebook subset corresponding to the third frequency band after antenna port switching |
|---|---|---|
| $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | G1 + G3 |
| $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1&0\\0&1\end{bmatrix}\right\}$ | G0 + G3 |
| $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | G1 |
| $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | $\left\{\frac{1}{\sqrt{2}}\begin{bmatrix}1&0\\0&1\end{bmatrix}\right\}$ | G0 + G3 |
| $\left\{\frac{1}{\sqrt{2}}\begin{bmatrix}1&0\\0&1\end{bmatrix}\right\}$ | $\left\{\frac{1}{\sqrt{2}}\begin{bmatrix}1&0\\0&1\end{bmatrix}\right\}$ | G3 | where G0 to G6 represent different transmitted precoding matrix indicator TPMI groups, "mode 0" represents all codewords in an uplink precoding codebook, and "+" indicates that the full-power transmission codebook subset is a union set of two TPMI groups before and after "+"; and
a codeword $$\frac{1}{\sqrt{2}}\begin{bmatrix}1&0\\0&1\end{bmatrix}$$

included in any full-power transmission codebook subset is an indication codeword, and when a full-power transmission codebook subset corresponding to any frequency band includes the indication codeword, it indicates that maximum transmit power of each antenna port in the frequency band is greater than or equal to a preset value, or when a full-power transmission codebook subset corresponding to any frequency band does not include the indication codeword, it indicates that maximum transmit power of at least one antenna port in the frequency band is less than a preset value.

Optionally, based on the first and fifth possible implementations, the two antenna ports in the first frequency band are incoherent, the two antenna ports in the second frequency band are incoherent, and the four antenna ports in the third frequency band after antenna port switching of the terminal device are incoherent.

Optionally, based on the first and fifth possible implementations, the antenna ports in the third frequency band after antenna port switching of the terminal device include a first antenna port, a second antenna port, a third antenna port, and a fourth antenna port, where the first antenna port is associated with a first row of a 4-port uplink precoding matrix, the second antenna port is associated with a second row of the 4-port uplink precoding matrix, the third antenna port is associated with a third row of the 4-port uplink precoding matrix, and the fourth antenna port is associated with a fourth row of the 4-port uplink precoding matrix; and by default, in the third frequency band after antenna port switching of the terminal device, maximum transmit power of the first antenna port is not less than maximum transmit power of the third antenna port, the maximum transmit power of the third antenna port is not less than maximum transmit power of the second antenna port, and the maximum transmit power of the second antenna port is not less than maximum transmit power of the fourth antenna port.

In a sixth possible implementation, the terminal device supports a first frequency band and a second frequency band, there are two antenna ports in the first frequency band before antenna port switching, there are two antenna ports in the second frequency band before antenna port switching, at least one antenna port in the second frequency band can be switched to a third frequency band, at least one antenna port in the first frequency band can be switched to the third frequency band, and there are four antenna ports in the third frequency band after antenna port switching; and
in the foregoing case, the specified rule complies with a correspondence between a first column, a second column, and a third column in the following table:

| Full-power transmission codebook subset corresponding to the first frequency band before antenna port switching | Full-power transmission codebook subset corresponding to the second frequency band before antenna port switching | Full-power transmission codebook subset corresponding to the third frequency band after antenna port switching |
|---|---|---|
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | mode 0 |

| Full-power transmission codebook subset corresponding to the first frequency band before antenna port switching | Full-power transmission codebook subset corresponding to the second frequency band before antenna port switching | Full-power transmission codebook subset corresponding to the third frequency band after antenna port switching |
|---|---|---|
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | G2 + G6 |
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | G2 + G5 |
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1&0\\0&1\end{bmatrix}\right\}$ | G1 + G6 |
| $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | G1 + G6 |
| $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | G1 + G4 |
| $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1&0\\0&1\end{bmatrix}\right\}$ | G0 + G6 |
| $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | G1 + G4 |
| $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | $\left\{\frac{1}{\sqrt{2}}\begin{bmatrix}1&0\\0&1\end{bmatrix}\right\}$ | G0 + G5 |
| $\left\{\frac{1}{\sqrt{2}}\begin{bmatrix}1&0\\0&1\end{bmatrix}\right\}$ | $\left\{\frac{1}{\sqrt{2}}\begin{bmatrix}1&0\\0&1\end{bmatrix}\right\}$ | G6 | where G0 to G6 represent different transmitted precoding matrix indicator TPMI groups, "mode 0" represents all codewords in an uplink precoding codebook, and "+" indicates that the full-power transmission codebook subset is a union set of two TPMI groups before and after "+"; and a codeword $$\frac{1}{\sqrt{2}}\begin{bmatrix}1&0\\0&1\end{bmatrix}$$

included in any full-power transmission codebook subset is an indication codeword, and when a full-power transmission codebook subset corresponding to any frequency band includes the indication codeword, it indicates that maximum transmit power of each antenna port in the frequency band is greater than or equal to a preset value, or when a full-power transmission codebook subset corresponding to any frequency band does not include the indication codeword, it indicates that maximum transmit power of at least one antenna port in the frequency band is less than a preset value.

Optionally, based on the second and sixth possible implementations, the two antenna ports in the first frequency band are coherent, the two antenna ports in the second frequency band are coherent, and the four antenna ports in the third frequency band after antenna port switching of the terminal device are completely coherent.

Optionally, based on the second and sixth possible implementations, the antenna ports in the third frequency band after antenna port switching of the terminal device include a first antenna port, a second antenna port, a third antenna port, and a fourth antenna port, where the first antenna port is associated with a first row of a 4-port uplink precoding matrix, the second antenna port is associated with a second row of the 4-port uplink precoding matrix, the third antenna port is associated with a third row of the 4-port uplink precoding matrix, and the fourth antenna port is associated with a fourth row of the 4-port uplink precoding matrix; and by default, in the third frequency band after antenna port switching of the terminal device, maximum transmit power of the first antenna port is not less than maximum transmit power of the third antenna port, the maximum transmit power of the third antenna port is not less than maximum transmit power of the second antenna port, and the maximum transmit power of the second antenna port is not less than maximum transmit power of the fourth antenna port.

In a seventh possible implementation, the terminal device supports a first frequency band and a second frequency band, there are two antenna ports in the first frequency band before antenna port switching, there are two antenna ports in the second frequency band and before antenna port switching, at least one antenna port in the second frequency band can be switched to a third frequency band, at least one antenna port in the first frequency band can be switched to the third frequency band, and there are four antenna ports in the third frequency band after antenna port switching; and in the foregoing case, the specified rule complies with a correspondence between a first column, a second column, and a third column in the following table:

| Full-power transmission codebook subset corresponding to the first frequency band before antenna port switching | Full-power transmission codebook subset corresponding to the second frequency band before antenna port switching | Full-power transmission codebook subset corresponding to the third frequency band before antenna port switching |
|---|---|---|
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1 & 0\\0 & 1\end{bmatrix}\right\}$ | $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1 & 0\\0 & 1\end{bmatrix}\right\}$ | mode 0 |
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1 & 0\\0 & 1\end{bmatrix}\right\}$ | $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1 & 0\\0 & 1\end{bmatrix}\right\}$ | G2 + G6 |
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1 & 0\\0 & 1\end{bmatrix}\right\}$ | $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | G2 + G5 |
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1 & 0\\0 & 1\end{bmatrix}\right\}$ | $\left\{\frac{1}{\sqrt{2}}\begin{bmatrix}1 & 0\\0 & 1\end{bmatrix}\right\}$ | G1 + G6 |
| $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1 & 0\\0 & 1\end{bmatrix}\right\}$ | $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1 & 0\\0 & 1\end{bmatrix}\right\}$ | G0 + G6 |
| $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1 & 0\\0 & 1\end{bmatrix}\right\}$ | $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | G0 + G4 |
| $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1 & 0\\0 & 1\end{bmatrix}\right\}$ | $\left\{\frac{1}{\sqrt{2}}\begin{bmatrix}1 & 0\\0 & 1\end{bmatrix}\right\}$ | G0 + G6 |
| $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | G0 |
| $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | $\left\{\frac{1}{\sqrt{2}}\begin{bmatrix}1 & 0\\0 & 1\end{bmatrix}\right\}$ | G0 |
| $\left\{\frac{1}{\sqrt{2}}\begin{bmatrix}1 & 0\\0 & 1\end{bmatrix}\right\}$ | $\left\{\frac{1}{\sqrt{2}}\begin{bmatrix}1 & 0\\0 & 1\end{bmatrix}\right\}$ | G6 | where G0 to G6 represent different transmitted precoding matrix indicator TPMI groups, "mode 0" represents all codewords in an uplink precoding codebook, and "+" indicates that the full-power transmission codebook subset is a union set of two TPMI groups before and after "+"; and a codeword $$\frac{1}{\sqrt{2}}\begin{bmatrix}1 & 0\\0 & 1\end{bmatrix}$$

included in any full-power transmission codebook subset is an indication codeword, and when a full-power transmission codebook subset corresponding to any frequency band includes the indication codeword, it indicates that maximum transmit power of each antenna port in the frequency band is greater than or equal to a preset value, or when a full-power transmission codebook subset corresponding to any frequency band does not include the indication codeword, it indicates that maximum transmit power of at least one antenna port in the frequency band is less than a preset value.

Optionally, based on the third and seventh possible implementations, the two antenna ports in the first frequency band are coherent, the two antenna ports in the second frequency band are coherent, and the four antenna ports in the third frequency band after antenna port switching of the terminal device are partially coherent.

Optionally, based on the third and seventh possible implementations, the antenna ports in the third frequency band after antenna port switching of the terminal device include a first antenna port, a second antenna port, a third antenna port, and a fourth antenna port, where the first antenna port is associated with a first row of a 4-port uplink precoding matrix, the second antenna port is associated with a second row of the 4-port uplink precoding matrix, the third antenna port is associated with a third row of the 4-port uplink precoding matrix, and the fourth antenna port is associated with a fourth row of the 4-port uplink precoding matrix; and by default, in the third frequency band after antenna port switching of the terminal device, the first antenna port is coherent with the third antenna port, the second antenna port is coherent with the fourth antenna port, maximum transmit power of the first antenna port is not less than maximum transmit power of the third antenna port, and maximum transmit power of the second antenna port is not less than maximum transmit power of the fourth antenna port.

In an eighth possible implementation, the terminal device supports a first frequency band and a second frequency band, there are two antenna ports in the first frequency band before antenna port switching, there are two antenna ports in the second frequency band before antenna port switching, at least one antenna port in the second frequency band can be switched to a third frequency band, at least one antenna port in the first frequency band can be switched to the third frequency band, and there are four antenna ports in the third frequency band after antenna port switching; and in the foregoing case, the specified rule complies with a correspondence between a first column, a second column, and a third column in the following table:

| Full-power transmission codebook subset corresponding to the first frequency band before antenna port switching | Full-power transmission codebook subset corresponding to the second frequency band before antenna port switching | Full-power transmission codebook subset corresponding to the third frequency band after antenna port switching |
|---|---|---|
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | mode 0 |
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | G2 + G5 |
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | G2 + G5 |
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1&0\\0&1\end{bmatrix}\right\}$ | G1 + G5 |
| $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | G0 + G5 |
| $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | G0 + G4 |
| $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1&0\\0&1\end{bmatrix}\right\}$ | G0 + G5 |
| $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | G0 |
| $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | $\left\{\frac{1}{\sqrt{2}}\begin{bmatrix}1&0\\0&1\end{bmatrix}\right\}$ | G0 |
| $\left\{\frac{1}{\sqrt{2}}\begin{bmatrix}1&0\\0&1\end{bmatrix}\right\}$ | $\left\{\frac{1}{\sqrt{2}}\begin{bmatrix}1&0\\0&1\end{bmatrix}\right\}$ | G5 | where G0 to G6 represent different transmitted precoding matrix indicator TPMI groups, "mode 0" represents all codewords in an uplink precoding codebook, and "+" indicates that the full-power transmission codebook subset is a union set of two TPMI groups before and after "+"; and
a codeword $$\frac{1}{\sqrt{2}}\begin{bmatrix}1&0\\0&1\end{bmatrix}$$

included in any full-power transmission codebook subset is an indication codeword, and when a full-power transmission codebook subset corresponding to any frequency band includes the indication codeword, it indicates that maximum transmit power of each antenna port in the frequency band is greater than or equal to a preset value, or when a full-power transmission codebook subset corresponding to any frequency band does not include the indication codeword, it indicates that maximum transmit power of at least one antenna port in the frequency band is less than a preset value.

Optionally, based on the fourth and eighth possible implementations, the two antenna ports in the first frequency band are coherent and the two antenna ports in the second frequency band are incoherent, or the two antenna ports in the first frequency band are incoherent and the two antenna ports in the second frequency band are coherent; and in the third frequency band after antenna port switching of the terminal device, only two of the four antenna ports are coherent.

Optionally, based on the fourth and eighth possible implementations, the antenna ports in the third frequency band after antenna port switching of the terminal device include a first antenna port, a second antenna port, a third antenna port, and a fourth antenna port, where the first antenna port is associated with a first row of a 4-port uplink precoding matrix, the second antenna port is associated with a second row of the 4-port uplink precoding matrix, the third antenna port is associated with a third row of the 4-port uplink precoding matrix, and the fourth antenna port is associated with a fourth row of the 4-port uplink precoding matrix; and by default, in the third frequency band after antenna port switching of the terminal device, the first antenna port is coherent with the third antenna port, the second antenna port is incoherent with the fourth antenna port, maximum transmit power of the first antenna port is not less than maximum transmit power of the third antenna port, and maximum transmit power of the second antenna port is not less than maximum transmit power of the fourth antenna port.

In a possible design, when the communications apparatus 700 is applied to the network device, the processing unit 702 is further configured to:

determine maximum transmit power of the plurality of target antenna ports in the target frequency band based on the full-power transmission codebook subset corresponding to the target frequency band; or receive transmit power indication information from the terminal device by using the communications unit 701, where the transmit power indication information is used to indicate maximum transmit power of the plurality of target antenna ports in the target frequency band after antenna port switching of the terminal device.

In a possible design, when the plurality of source frequency bands include a first frequency band and a second frequency band, when receiving the full-power transmission capability indication from the terminal device by using the communications unit 701, the processing unit 702 includes:

receiving a first full-power transmission capability indication from the terminal device by using the communications unit 701, and receiving a second full-power transmission capability indication from the terminal device, where the first full-power transmission capability indication includes first indication information and second indication information, the second full-power transmission capability indication includes third indication information and fourth indication information, the first indication information is used to indicate a full-power transmission codebook subset corresponding to the first frequency band, the second indication information is used to indicate value distribution of maximum transmit power of antenna ports in the first frequency band, the third indication information is used to indicate a full-power transmission codebook subset corresponding to the second frequency band, and the fourth indication information is used to indicate value distribution of maximum transmit power of antenna ports in the second frequency band; and the processing unit 702 is further configured to:

determine maximum transmit power of the plurality of target antenna ports in the target frequency band based on the full-power transmission codebook subset that is corresponding to the first frequency band and that is indicated by the first indication information, the value distribution indicated by the second indication information, the full-power transmission codebook subset that is corresponding to the second frequency band and that is indicated by the third indication information, and the value distribution indicated by the fourth indication information.

In an implementation, the communications apparatus 700 is used by a network device to implement the method for determining a full-power transmission codebook subset according to the embodiment shown in FIG. 5. The following describes functions of each unit in this implementation.

The communications unit 701 is configured to receive a full-power transmission capability indication from a terminal device, where the full-power transmission capability indication is used to indicate a full-power transmission codebook subset corresponding to a target frequency band after antenna port switching of the terminal device; and the processing unit 702 is configured to determine, according to the full-power transmission capability indication, the full-power transmission codebook subset corresponding to the target frequency band after antenna port switching of the terminal device, where the target frequency band is a frequency band to which an antenna port of the terminal device is switched.

In an implementation, the communications apparatus 700 is used by a terminal device to implement the method for determining a full-power transmission codebook subset according to the embodiment shown in FIG. 5. The following describes functions of each unit in this implementation.

The processing unit 702 is configured to determine a full-power transmission codebook subset corresponding to a target frequency band after antenna port switching; and the communications unit 701 is configured to send a full-power transmission capability indication to a network device, where the full-power transmission capability indication is used to indicate the full-power transmission codebook subset corresponding to the target frequency band after antenna port switching of the terminal device, where the target frequency band is a frequency band to which an antenna port of the terminal device is switched.

In an implementation, the communications apparatus 700 is used by a network device to implement the method for determining maximum transmit power of an antenna port according to the embodiment shown in FIG. 3. The following describes functions of each unit in this implementation.

The communications unit 701 is configured to receive a full-power transmission capability indication from a terminal device, where the full-power transmission capability indication includes first indication information and second indication information, the first indication information is used to indicate a full-power transmission codebook subset corresponding to a first frequency band, and the second indication information is used to indicate value distribution of maximum transmit power of antenna ports in the first frequency band; and the processing unit 702 is configured to determine the maximum transmit power of the antenna ports in the first frequency band based on the full-power transmission codebook subset and the value distribution.

In a possible design, the second indication information is used to indicate that maximum transmit power of all antenna ports in the first frequency band is greater than or equal to a first preset value; or when a value of the second indication information is a first value, the second indication information indicates that maximum transmit power of all antenna ports in the first frequency band is greater than or equal to a first preset value; or when a value of the second indication information is a second value, the second indication information indicates that maximum transmit power of at least one antenna port in the first frequency band is less than a first preset value, where the first preset value is less than maximum total transmit power P of the terminal device allowed in the first frequency band.

In a possible design, the terminal device has two antenna ports in the first frequency band; and when the full-power transmission codebook subset indicated by the first indication information is $$\left\{ \frac{1}{\sqrt{2}} \begin{bmatrix} 1 \\ 0 \end{bmatrix}, \frac{1}{\sqrt{2}} \begin{bmatrix} 0 \\ 1 \end{bmatrix} \right\},$$

and the second indication information indicates that the maximum transmit power of all the antenna ports in the first frequency band is greater than or equal to the first preset value, maximum transmit power of the two antenna ports in the first frequency band is P and P respectively; or when the full-power transmission codebook subset indicated by the first indication information is $$\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\},$$

and the second indication information indicates that the maximum transmit power of all the antenna ports in the first frequency band is greater than or equal to the first preset value, maximum transmit power of the two antenna ports in the first frequency band is P and the first preset value respectively; or when the full-power transmission codebook subset indicated by the first indication information is $$\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\},$$

and the second indication information indicates that the maximum transmit power of the at least one antenna port in the first frequency band is less than the first preset value, maximum transmit power of the two antenna ports in the first frequency band is P and a second preset value respectively, where the second preset value is less than the first preset value; or when the full-power transmission codebook subset indicated by the first indication information is null, and the second indication information indicates that the maximum transmit power of all the antenna ports in the first frequency band is greater than or equal to the first preset value, maximum transmit power of the two antenna ports in the first frequency band is the first preset value and the first preset value respectively.

In a possible design, when the second indication information indicates that the maximum transmit power of all the antenna ports in the first frequency band is greater than or equal to the first preset value, the second indication information is used to indicate a codeword $$\frac{1}{\sqrt{2}}\begin{bmatrix}1 & 0\\0 & 1\end{bmatrix}.$$

In a possible design, the processing unit 702 is further configured to:

after determining the maximum transmit power of the antenna ports in the first frequency band, receive a switching adjustment value of a target antenna port from the terminal device by using the communications unit 701, where the target antenna port is an antenna port that is in the first frequency band and that can be switched to another frequency band, and the switching adjustment value is an adjustment value of maximum transmit power of the target antenna port after the target antenna port is switched to the another frequency band; and determine, based on maximum transmit power of the target antenna port in a target frequency band and the switching adjustment value of the target antenna port, the maximum transmit power of the target antenna port in the another frequency band after antenna port switching of the terminal device; or receive transmit power indication information from the terminal device by using the communications unit 701, where the transmit power indication information is used to indicate maximum transmit power of antenna ports in a second frequency band after antenna port switching of the terminal device.

In an implementation, the communications apparatus 700 is used by a terminal device to implement the method for determining maximum transmit power of an antenna port according to the embodiment shown in FIG. 3. The following describes functions of each unit in this implementation.

The processing unit 702 is configured to determine a full-power transmission codebook set corresponding to a first frequency band, and maximum transmit power of antenna ports in the first frequency band; and the communications unit 701 is configured to send a full-power transmission capability indication to a network device, where the full-power transmission capability indication includes first indication information and second indication information, the first indication information is used to indicate a full-power transmission codebook subset corresponding to the first frequency band, and the second indication information is used to indicate value distribution of maximum transmit power of antenna ports in the first frequency band.

In a possible design, the second indication information is used to indicate that maximum transmit power of all antenna ports in the first frequency band is greater than or equal to a first preset value; or when a value of the second indication information is a first value, the second indication information indicates that maximum transmit power of all antenna ports in the first frequency band is greater than or equal to a first preset value; or when a value of the second indication information is a second value, the second indication information indicates that maximum transmit power of at least one antenna port in the first frequency band is less than a first preset value, where the first preset value is less than maximum total transmit power P of the terminal device allowed in the first frequency band.

In a possible design, the terminal device has two antenna ports in the first frequency band; and when the full-power transmission codebook subset indicated by the first indication information is $$\left\{\frac{1}{\sqrt{2}}\begin{bmatrix}1\\0\end{bmatrix}, \frac{1}{\sqrt{2}}\begin{bmatrix}0\\1\end{bmatrix}\right\},$$

and maximum transmit power of the two antenna ports in the first frequency band is P and P respectively, the second indication information indicates that the maximum transmit power of all the antenna ports in the first frequency band is greater than or equal to the first preset value; or when the full-power transmission codebook subset indicated by the first indication information is $$\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\},$$

and maximum transmit power of the two antenna ports in the first frequency band is P and the first preset value respectively, the second indication information indicates that the maximum transmit power of all the antenna ports in the first frequency band is greater than or equal to the first preset value; or when the full-power transmission codebook subset indicated by the first indication information is $$\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\},$$

and maximum transmit power of the two antenna ports in the first frequency band is P and a second preset value respectively, the second indication information indicates that the maximum transmit power of the at least one antenna port in the first frequency band is less than the first preset value, where the second preset value is less than the first preset value; or when the full-power transmission codebook subset indicated by the first indication information is null, and maximum transmit power of the two antenna ports in the first frequency band is the first preset value and the first preset value respectively, the second indication information indicates that the maximum transmit power of all the antenna ports in the first frequency band is greater than or equal to the first preset value.

In a possible design, when the second indication information indicates that the maximum transmit power of all the antenna ports in the first frequency band is greater than or equal to the first preset value, the second indication information is used to indicate a codeword $$\frac{1}{\sqrt{2}}\begin{bmatrix}1 & 0\\0 & 1\end{bmatrix}.$$

In a possible design, the processing unit 702 is further configured to:

determine a switching adjustment value of a target antenna port, where the target antenna port is an antenna port that is in a target frequency band and that can be switched to another frequency band, and the switching adjustment value is an adjustment value of maximum transmit power of the target antenna port after the target antenna port is switched to the another frequency band; and send the switching adjustment value of the target antenna port to the network device by using the communications unit 701; or send transmit power indication information to the network device by using the communications unit 701, where the transmit power indication information is used to indicate maximum transmit power of antenna ports in a second frequency band after antenna port switching of the terminal device.

In an implementation, the communications apparatus 700 is used by a network device to implement the method for determining maximum transmit power of an antenna port according to the embodiment shown in FIG. 2. The following describes functions of each unit in this implementation.

The communications unit 701 is configured to receive transmit power indication information from a terminal device, where the transmit power indication information is used to indicate maximum transmit power of antenna ports in a first frequency band supported by the terminal device; and the processing unit 702 is configured to determine the maximum transmit power of the antenna ports of the terminal device in the first frequency band according to the transmit power indication information.

In an implementation, the communications apparatus 700 is used by a terminal device to implement the method for determining maximum transmit power of an antenna port according to the embodiment shown in FIG. 2. The following describes functions of each unit in this implementation.

The processing unit 702 is configured to determine maximum transmit power of antenna ports in a supported first frequency band; and the communications unit 701 is configured to send transmit power indication information to a network device, where the transmit power indication information is used to indicate the maximum transmit power of the antenna ports in the first frequency band.

It should be noted that in embodiments of this application, division into modules is an example, and is only a logical function division. During actual implementation, there may be another division manner. In addition, functional units in embodiments of this application may be integrated into one processing unit, or may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the prior art, or all or a part of the technical solutions may be implemented in the form of a software product. The computer software product is stored in a storage medium and includes several instructions for instructing a computer device (which may be a personal computer, a server, a network device, or the like) or a processor (processor) to perform all or a part of the steps of the methods in embodiments of this application. The foregoing storage medium includes any medium that can store program code, like a USB flash drive, a removable hard disk, a read-only memory (read-only memory, ROM), a random access memory (random access memory, RAM), a magnetic disk, or an optical disc.

Figure 8:
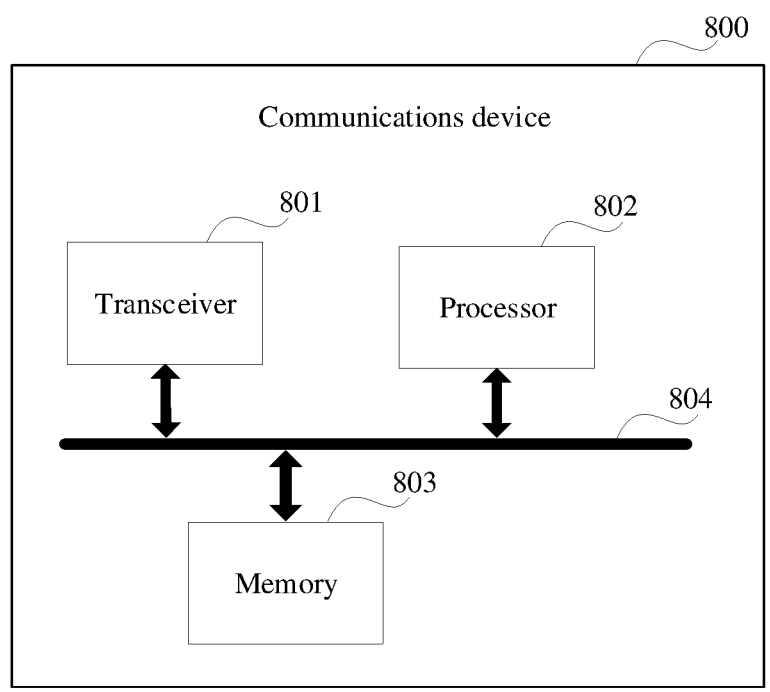
FIG. 8 is a diagram of a structure of a communications device according to an embodiment of this application

Based on the foregoing embodiment, an embodiment of this application further provides a communications device. The communications device may be applied to the communications system shown in FIG. 1A, may implement the method in the foregoing embodiment, and has functions of the communications apparatus 700 provided in the foregoing embodiment. Refer to FIG. 8. The communications device 800 includes a transceiver 801 and a processor 802. Optionally, the communications device 800 further includes a memory 803. The transceiver 801, the processor 802, and the memory 803 are connected to each other.

Optionally, the transceiver 801, the processor 802, and the memory 803 are connected to each other by using a bus 804. The bus 804 may be a peripheral component interconnect (peripheral component interconnect, PCI) bus, an extended industry standard architecture (extended industry standard architecture, EISA) bus, or the like. The bus may be classified into an address bus, a data bus, a control bus, and the like. For ease of representation, only one bold line is used for representing the bus in FIG. 8, but this does not mean that there is only one bus or only one type of bus.

The transceiver 801 is configured to receive and send signals, to implement communication with another device in the communications system. Optionally, the transceiver 801 includes at least one transmission channel used to send a signal and at least one receiving channel used to receive a signal. For example, any transmission channel may have the structure of the transmission channel in the radio transmission system shown in FIG. 1B. Certainly, the transmission channel in the communications device in this embodiment may have more or fewer components than those described in FIG. 1B, or some components may be combined, or some components may be split, or different component arrangements may be used.

The processor 802 is configured to implement the method provided in the foregoing embodiment. For a specific process, refer to the description in the foregoing embodiment. Details are not described herein again.

The processor 802 may be a central processing unit (central processing unit, CPU), a network processor (network processor, NP), a combination of a CPU and an NP, or the like. The processor 802 may further include a hardware chip. The hardware chip may be an application-specific integrated circuit (application-specific integrated circuit, ASIC), a programmable logic device (programmable logic device, PLD), or a combination thereof. The PLD may be a complex programmable logic device (complex programmable logic device, CPLD), a field programmable logic gate array (field-programmable gate array, FPGA), generic array logic (generic array logic, GAL), or any combination thereof. The processor 802 may implement the foregoing functions by hardware or certainly by hardware executing corresponding software.

The memory 803 is configured to store program instructions, and the like. Specifically, the program instructions may include program code. The program code includes computer operation instructions. The memory 803 may include a random access memory (random access memory, RAM), and may further include a non-volatile memory (non-volatile memory), for example, at least one magnetic disk memory. The processor 802 executes the program instructions stored in the memory 803, to implement the foregoing functions, thereby implementing the method provided in the foregoing embodiment.

Based on the foregoing embodiment, an embodiment of this application further provides a computer program. When the computer program runs on a computer, the computer is enabled to perform the method provided in the foregoing embodiment.

Based on the foregoing embodiment, an embodiment of this application further provides a computer-readable storage medium. The computer-readable storage medium stores a computer program. When the computer program is executed by a computer, the computer is enabled to perform the method provided in the foregoing embodiment.

The storage medium may be any available medium that can be accessed by the computer. By way of example and not limitation, the computer-readable medium may include a RAM, a ROM, an EEPROM, a CD-ROM, another optical disc storage or disk storage medium, another magnetic storage device, or any other medium that can carry or store expected program code in a form of instructions or a data structure and can be accessed by a computer.

Based on the foregoing embodiment, an embodiment of this application further provides a chip. The chip is configured to read a computer program stored in a memory, to implement the method provided in the foregoing embodiment.

Based on the foregoing embodiment, an embodiment of this application provides a chip system. The chip system includes a processor, configured to support a computer apparatus in implementing the functions related to the communications device in the foregoing embodiment. In a possible design, the chip system further includes a memory. The memory is configured to store a program and data that are necessary for the computer apparatus. The chip system may include a chip, or may include a chip and another discrete component.

In summary, embodiments of this application provide a method for determining a full-power transmission codebook subset and a device. In the method, the terminal device reports, to the network device, the full-power transmission codebook subset corresponding to the frequency band supported by the terminal device before transmission channel switching. The network device or the terminal device in the communications system may determine, according to the specified rule and the full-power transmission codebook subsets corresponding to the plurality of source frequency bands, the full-power transmission codebook subset corresponding to the target frequency band after transmission channel switching. The plurality of source frequency bands are the frequency bands in which the plurality of target antenna ports are located before antenna port switching, and the plurality of target antenna ports are the antenna ports in the target frequency band after antenna port switching. By using this method, the network device or the terminal device can determine the full-power transmission codebook subset of the terminal device after transmission channel switching.

A person skilled in the art should understand that embodiments of this application may be provided as a method, a system, or a computer program product. Therefore, this application may use a form of a hardware-only embodiment, a software-only embodiment, or an embodiment with a combination of software and hardware. In addition, this application may use a form of a computer program product implemented on one or more computer-usable storage media (including but not limited to a disk memory, a CD-ROM, an optical memory, and the like) that include computer-usable program code.

This application is described with reference to the flowcharts and/or the block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

Alternatively, these computer program instructions may be stored in a computer-readable memory that can instruct a computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

Alternatively, these computer program instructions may be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more processes in the flowcharts and/or in one or more blocks in the block diagrams.

It is clearly that a person skilled in the art can make various changes and variations to this application without departing from the scope of this application. Therefore, this application is also intended to cover the changes and variations provided that the changes and variations of this application fall within the scope of the claims of this application or equivalent technologies thereof.

What is claimed is:

1. A method, comprising:
    determining a first full-power transmission codebook subset corresponding to a frequency band supported by a terminal device before antenna port switching of the terminal device; and
    determining, according to a specified rule and a plurality of full-power transmission codebook subsets corresponding to a plurality of source frequency bands, a second full-power transmission codebook subset corresponding to a target frequency band after antenna port switching of the terminal device,
    wherein the plurality of source frequency bands are frequency bands in which a plurality of target antenna ports are located before antenna port switching, the plurality of target antenna ports are antenna ports in the target frequency band after antenna port switching, and the specified rule indicates a correspondence between the first full-power transmission codebook subsets corresponding to the plurality of source frequency bands before antenna port switching and the second full-power transmission codebook subset corresponding to the target frequency band after antenna port switching.

2. The method according to claim 1, wherein when the method is applied to a network device, determining the first full-power transmission codebook subset corresponding to the frequency band supported by a terminal device before antenna port switching of the terminal device comprises:
    receiving a full-power transmission capability indication from the terminal device, wherein the full-power transmission capability indication indicates the first full-power transmission codebook subset corresponding to the frequency band supported by the terminal device before antenna port switching of the terminal device.

3. The method according to claim 1, wherein the specified rule is determined based on a coherence capability of the plurality of target antenna ports in the target frequency band.

4. The method according to claim 3, wherein when the method is applied to a network device, the method further comprises determining the coherence capability of the plurality of target antenna ports, wherein determining the coherence capability of the plurality of target antenna ports comprises:
    receiving a first coherence capability indication from the terminal device, wherein the first coherence capability indication indicates the coherence capability of the plurality of target antenna ports; or
    receiving a second coherence capability indication from the terminal device, wherein the second coherence capability indication indicates a coherence capability of antenna ports between the plurality of source frequency bands before antenna port switching of the terminal device and determining the coherence capability of the plurality of target antenna ports based on a coherence capability of antenna ports in the plurality of source frequency bands and the coherence capability of antenna ports between the plurality of source frequency bands.

5. The method according to claim 1, wherein the terminal device supports a first frequency band and a second frequency band, there are two antenna ports in the first frequency band before antenna port switching, there are two antenna ports in the second frequency band before antenna port switching, at least one antenna port in the second frequency band is switchable to a third frequency band, at least one antenna port in the first frequency band is switchable to the third frequency band, and there are four antenna ports in the third frequency band after antenna port switching; and
    the specified rule complies with a correspondence between a first column, a second column, and a third column in the following table:

| Full-power transmission codebook subset corresponding to the first frequency band before antenna port switching | Full-power transmission codebook subset corresponding to the second frequency band before antenna port switching | Full-power transmission codebook subset corresponding to the third frequency band after antenna port switching |
| --- | --- | --- |
| $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | mode 0 |
| $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | G2 |
| $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | 00 | G1 |
| $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | G1 |
| $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | 00 | G0 |
| 00 | 00 | | wherein a full-power transmission codebook subset "00" corresponding to any frequency band indicates that the full-power transmission codebook subset is null, G0 to G6 represent different transmitted precoding matrix indicator (TPMI) groups, "mode 0" represents all codewords in an uplink precoding codebook, and "–" indicates absence.

6. The method according to claim 1, wherein the terminal device supports a first frequency band and a second frequency band, there are two antenna ports in the first frequency band before antenna port switching, there are two antenna ports in the second frequency band before antenna port switching, at least one antenna port in the second frequency band is switchable to a third frequency band, at least one antenna port in the first frequency band is switchable to the third frequency band, and there are four antenna ports in the third frequency band after antenna port switching; and the specified rule complies with a correspondence between a first column, a second column, and a third column in the following table:

| Full-power transmission codebook subset corresponding to the first frequency band before antenna port switching | Full-power transmission codebook subset corresponding to the second frequency band before antenna port switching | Full-power transmission codebook subset corresponding to the third frequency band after antenna port switching |
|---|---|---|
| $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | mode 0 |
| $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | G2 + G5 |
| $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | 00 | G1 + G4 |
| $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | G1 + G4 |
| $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | 00 | G0 |
| 00 | 00 | — | wherein a full-power transmission codebook subset "00" corresponding to any frequency band indicates that the full-power transmission codebook subset is null, G0 to G6 represent different transmitted precoding matrix indicator (TPMI) groups, "mode 0" represents all codewords in an uplink precoding codebook, "+" indicates that the full-power transmission codebook subset is a union set of two TPMI groups before and after "+", and "–" indicates absence.

7. The method according to claim 1, wherein the terminal device supports a first frequency band and a second frequency band, there are two antenna ports in the first frequency band before antenna port switching, there are two antenna ports in the second frequency band before antenna port switching, at least one antenna port in the second frequency band is switchable to a third frequency band, at least one antenna port in the first frequency band is switchable to the third frequency band, and there are four antenna ports in the third frequency band after antenna port switching; and the specified rule complies with a correspondence between a first column, a second column, and a third column in the following table:

| Full-power transmission codebook subset corresponding to the first frequency band before antenna port switching | Full-power transmission codebook subset corresponding to the second frequency band before antenna port switching | Full-power transmission codebook subset corresponding to the third frequency band after antenna port switching |
|---|---|---|
| $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | mode 0 |

-continued

| Full-power transmission codebook subset corresponding to the first frequency band before antenna port switching | Full-power transmission codebook subset corresponding to the second frequency band before antenna port switching | Full-power transmission codebook subset corresponding to the third frequency band after antenna port switching |
|---|---|---|
| $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | G2 + G5 |
| $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | 00 | G1 + G4 |
| $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | G0 |
| $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | 00 | G0 |
| 00 | 00 | — | wherein a full-power transmission codebook subset "00" corresponding to any frequency band indicates that the full-power transmission codebook subset is null, G0 to G6 represent different transmitted precoding matrix indicator (TPMI) groups, "mode 0" represents all codewords in an uplink precoding codebook, "+" indicates that the full-power transmission codebook subset is a union set of two TPMI groups before and after "+", and "−" indicates absence.

8. The method according to claim 1, wherein the terminal device supports a first frequency band and a second frequency band, there are two antenna ports in the first frequency band before antenna port switching, there are two antenna ports in the second frequency band before antenna port switching, at least one antenna port in the second frequency band is switchable to a third frequency band, at least one antenna port in the first frequency band is switchable to the third frequency band, and there are four antenna ports in the third frequency band after antenna port switching; and the specified rule complies with a correspondence between a first column, a second column, and a third column in the following table:

| Full-power transmission codebook subset corresponding to the first frequency band before antenna port switching | Full-power transmission codebook subset corresponding to the second frequency band before antenna port switching | Full-power transmission codebook subset corresponding to the third frequency band after antenna port switching |
|---|---|---|
| $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | mode 0 |
| $\left\{\frac{1}{\sqrt{2}}\begin{bmatrix}1\\0\end{bmatrix}, \frac{1}{\sqrt{2}}\begin{bmatrix}0\\1\end{bmatrix}\right\}$ | $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | G2 + G5 |
| $\left\{\frac{1}{\sqrt{2}}\begin{bmatrix}1\\0\end{bmatrix}, \frac{1}{\sqrt{2}}\begin{bmatrix}0\\1\end{bmatrix}\right\} + 00$ | 00 | G1 + G4 |
| $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\}$ | G0 |
| $\left\{\frac{1}{\sqrt{2}}\begin{bmatrix}1\\0\end{bmatrix}\right\}$ or $\left\{\frac{1}{\sqrt{2}}\begin{bmatrix}0\\1\end{bmatrix}\right\} + 00$ | 00 | G0 |
| 00 + 00 | 00 | — | wherein a full-power transmission codebook subset "00" corresponding to any frequency band indicates that the full-power transmission codebook subset is null, G0 to G6 represent different transmitted precoding matrix indicator (TPMI) groups, "mode 0" represents all codewords in an uplink precoding codebook, "+" indicates that the full-power transmission codebook subset is a union set of two TPMI groups before and after "+", and "−" indicates absence.

9. The method according to claim 1, wherein the terminal device supports a first frequency band and a second frequency band, there are two antenna ports in the first frequency band before antenna port switching, there are two antenna ports in the second frequency band before antenna port switching, at least one antenna port in the second frequency band is switchable to a third frequency band, at least one antenna port in the first frequency band is switchable to the third frequency band, and there are four antenna ports in the third frequency band after antenna port switching; and the specified rule complies with a correspondence between a first column, a second column, and a third column in the following table:

| Full-power transmission codebook subset corresponding to the first frequency band before antenna port switching | Full-power transmission codebook subset corresponding to the second frequency band before antenna port switching | Full-power transmission codebook subset corresponding to the third frequency band after antenna port switching |
|---|---|---|
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | mode 0 |
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | G2 |
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | G2 |
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1&0\\0&1\end{bmatrix}\right\}$ | G1 + G3 |
| $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | G1 + G3 |
| $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | G1 + G3 |
| $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1&0\\0&1\end{bmatrix}\right\}$ | G0 + G3 |
| $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | G1 |
| $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | $\left\{\frac{1}{\sqrt{2}}\begin{bmatrix}1&0\\0&1\end{bmatrix}\right\}$ | G0 + G3 |
| $\left\{\frac{1}{\sqrt{2}}\begin{bmatrix}1&0\\0&1\end{bmatrix}\right\}$ | $\left\{\frac{1}{\sqrt{2}}\begin{bmatrix}1&0\\0&1\end{bmatrix}\right\}$ | G3 | wherein G0 to G6 represent different transmitted precoding matrix indicator (TPMI_groups, "mode 0" represents all codewords in an uplink precoding codebook, and "+" indicates that the full-power transmission codebook subset is a union set of two TPMI groups before and after "+"; and a codeword $$\frac{1}{\sqrt{2}}\begin{bmatrix}1&0\\0&1\end{bmatrix}$$

comprised in any full-power transmission codebook subset is an indication codeword, and a full-power transmission codebook subset corresponding to any frequency band comprising the indication codeword indicates that maximum transmit power of each antenna port in the frequency band is greater than or equal to a preset value, or a full-power transmission codebook subset corresponding to any frequency band not comprising the indication codeword indicates that maximum transmit power of at least one antenna port in the frequency band is less than a preset value.

10. The method according to claim 9, wherein the two antenna ports in the first frequency band are incoherent, the two antenna ports in the second frequency band are incoherent, and the four antenna ports in the third frequency band after antenna port switching of the terminal device are incoherent.

11. The method according to claim 1, wherein the terminal device supports a first frequency band and a second frequency band, there are two antenna ports in the first frequency band before antenna port switching, there are two antenna ports in the second frequency band before antenna port switching, at least one antenna port in the second frequency band is switchable to a third frequency band, at least one antenna port in the first frequency band is switchable to the third frequency band, and there are four antenna ports in the third frequency band after antenna port switching; and the specified rule complies with a correspondence between a first column, a second column, and a third column in the following table:

| Full-power transmission codebook subset corresponding to the first frequency band before antenna port switching | Full-power transmission codebook subset corresponding to the second frequency band before antenna port switching | Full-power transmission codebook subset corresponding to the third frequency band after antenna port switching |
|---|---|---|
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | mode 0 |
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | G2 + G6 |
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | G2 + G5 |
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1&0\\0&1\end{bmatrix}\right\}$ | G1 + G6 |
| $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | G1 + G6 |
| $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | G1 + G4 |
| $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1&0\\0&1\end{bmatrix}\right\}$ | G0 + G6 |
| $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | G1 + G4 |
| $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | $\left\{\frac{1}{\sqrt{2}}\begin{bmatrix}1&0\\0&1\end{bmatrix}\right\}$ | G0 + G5 |
| $\left\{\frac{1}{\sqrt{2}}\begin{bmatrix}1&0\\0&1\end{bmatrix}\right\}$ | $\left\{\frac{1}{\sqrt{2}}\begin{bmatrix}1&0\\0&1\end{bmatrix}\right\}$ | G6 | wherein G0 to G6 represent different transmitted precoding matrix indicator (TPMI) groups, "mode 0" represents all codewords in an uplink precoding codebook, and "+" indicates that the full-power transmission codebook subset is a union set of two TPMI groups before and after "+"; and a codeword $$\frac{1}{\sqrt{2}}\begin{bmatrix}1&0\\0&1\end{bmatrix}$$

comprised in any full-power transmission codebook subset is an indication codeword, and a full-power transmission codebook subset corresponding to any frequency band comprising the indication codeword indicates that maximum transmit power of each antenna port in the frequency band is greater than or equal to a preset value, or a full-power transmission codebook subset corresponding to any frequency band not comprising the indication codeword indicates that maximum transmit power of at least one antenna port in the frequency band is less than a preset value.

12. The method according to claim 11, wherein the two antenna ports in the first frequency band are coherent, the two antenna ports in the second frequency band are coherent, and the four antenna ports in the third frequency band after antenna port switching of the terminal device are completely coherent.

13. The method according to claim 1, wherein the terminal device supports a first frequency band and a second frequency band, there are two antenna ports in the first frequency band before antenna port switching, there are two antenna ports in the second frequency band before antenna port switching, at least one antenna port in the second frequency band is switchable to a third frequency band, at least one antenna port in the first frequency band is switchable to the third frequency band, and there are four antenna ports in the third frequency band after antenna port switching; and the specified rule complies with a correspondence between a first column, a second column, and a third column in the following table:

| Full-power transmission codebook subset corresponding to the first frequency band before antenna port switching | Full-power transmission codebook subset corresponding to the second frequency band before antenna port switching | Full-power transmission codebook subset corresponding to the third frequency band after antenna port switching |
|---|---|---|
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | mode 0 |
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | G2 + G6 |
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | G2 + G5 |
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1&0\\0&1\end{bmatrix}\right\}$ | G1 + G6 |
| $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | G0 + G6 |
| $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | G0 + G4 |
| $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1&0\\0&1\end{bmatrix}\right\}$ | G0 + G6 |
| $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | G0 |
| $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | $\left\{\frac{1}{\sqrt{2}}\begin{bmatrix}1&0\\0&1\end{bmatrix}\right\}$ | G0 |
| $\left\{\frac{1}{\sqrt{2}}\begin{bmatrix}1&0\\0&1\end{bmatrix}\right\}$ | $\left\{\frac{1}{\sqrt{2}}\begin{bmatrix}1&0\\0&1\end{bmatrix}\right\}$ | G6 | wherein G0 to G6 represent different transmitted precoding matrix indicator (TPMI) groups, "mode 0" represents all codewords in an uplink precoding codebook, and "+" indicates that the full-power transmission codebook subset is a union set of two TPMI groups before and after "+"; and a codeword $$\frac{1}{\sqrt{2}}\begin{bmatrix}1&0\\0&1\end{bmatrix}$$

comprised in any full-power transmission codebook subset is an indication codeword, and a full-power transmission codebook subset corresponding to any frequency band comprising the indication codeword indicates that maximum transmit power of each antenna port in the frequency band is greater than or equal to a preset value, or a full-power transmission codebook subset corresponding to any frequency band not comprising the indication codeword indicates that maximum transmit power of at least one antenna port in the frequency band is less than a preset value.

14. The method according to claim 13, wherein the two antenna ports in the first frequency band are coherent, the two antenna ports in the second frequency band are coherent, and the four antenna ports in the third frequency band after antenna port switching of the terminal device are partially coherent.

15. The method according to claim 1, wherein the terminal device supports a first frequency band and a second frequency band, there are two antenna ports in the first frequency band before antenna port switching, there are two antenna ports in the second frequency band before antenna port switching, at least one antenna port in the second frequency band is switchable to a third frequency band, at least one antenna port in the first frequency band is switchable to the third frequency band, and there are four antenna ports in the third frequency band after antenna port switching; and the specified rule complies with a correspondence between a first column, a second column, and a third column in the following table:

| Full-power transmission codebook subset corresponding to the first frequency band before antenna port switching | Full-power transmission codebook subset corresponding to the second frequency band before antenna port switching | Full-power transmission codebook subset corresponding to the third frequency band after antenna port switching |
|---|---|---|
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | mode 0 |
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | G2 + G5 |
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | G2 + G5 |
| $\left\{\frac{1}{\sqrt{2}}\begin{bmatrix}1\\0\end{bmatrix}, \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1&0\\0&1\end{bmatrix}\right\}$ | G1 + G5 |
| $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | G0 + G5 |
| $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | G0 + G4 |
| $\left\{\frac{1}{\sqrt{2}}\begin{bmatrix}1\\0\end{bmatrix} \text{ or } \frac{1}{\sqrt{2}}\begin{bmatrix}0\\1\end{bmatrix}, \frac{1}{\sqrt{2}}\begin{bmatrix}1&0\\0&1\end{bmatrix}\right\}$ | $\left\{\frac{1}{\sqrt{2}}\begin{bmatrix}1&0\\0&1\end{bmatrix}\right\}$ | G0 + G5 |
| $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | G0 |
| $\left\{\frac{1}{\sqrt{2}}\begin{bmatrix}1\\0\end{bmatrix}\right\} \text{ or } \left\{\frac{1}{\sqrt{2}}\begin{bmatrix}0\\1\end{bmatrix}\right\}$ | $\left\{\frac{1}{\sqrt{2}}\begin{bmatrix}1&0\\0&1\end{bmatrix}\right\}$ | G0 |
| $\left\{\frac{1}{\sqrt{2}}\begin{bmatrix}1&0\\0&1\end{bmatrix}\right\}$ | $\left\{\frac{1}{\sqrt{2}}\begin{bmatrix}1&0\\0&1\end{bmatrix}\right\}$ | G5 | wherein G0 to G6 represent different transmitted precoding matrix indicator (TPMI) groups, "mode 0" represents all codewords in an uplink precoding codebook, and "+" indicates that the full-power transmission codebook subset is a union set of two TPMI groups before and after "+"; and a codeword $$\frac{1}{\sqrt{2}}\begin{bmatrix}1&0\\0&1\end{bmatrix}$$

comprised in any full-power transmission codebook subset is an indication codeword, and a full-power transmission codebook subset corresponding to any frequency band comprising the indication codeword indicates that maximum transmit power of each antenna port in the frequency band is greater than or equal to a preset value, or when a full-power transmission codebook subset corresponding to any frequency band not comprising the indication codeword indicates that maximum transmit power of at least one antenna port in the frequency band is less than a preset value.

16. The method according to claim 15, wherein:
the two antenna ports in the first frequency band are coherent and the two antenna ports in the second frequency band are incoherent, or the two antenna ports in the first frequency band are incoherent and the two antenna ports in the second frequency band are coherent; and in the third frequency band after antenna port switching of the terminal device, only two of the four antenna ports are coherent.

17. The method according to claim 1, wherein when the method is applied to a network device, the method further comprises:
determining maximum transmit power of the plurality of target antenna ports in the target frequency band based on the second full-power transmission codebook subset corresponding to the target frequency band; or
receiving transmit power indication information from the terminal device, wherein the transmit power indication information indicates maximum transmit power of the plurality of target antenna ports in the target frequency band after antenna port switching of the terminal device.

18. The method according to claim 2, wherein when the plurality of source frequency bands comprises a first frequency band and a second frequency band, receiving the full-power transmission capability indication from the terminal device comprises:
receiving a first full-power transmission capability indication and receiving a second full-power transmission capability indication from the terminal device, wherein the first full-power transmission capability indication comprises first indication information and second indication information, the second full-power transmission capability indication comprises third indication information and fourth indication information, the first indication information indicates a third full-power transmission codebook subset corresponding to the first frequency band, the second indication information indicates first value distribution of maximum transmit power of antenna ports in the first frequency band, the third indication information indicates a fourth full-power transmission codebook subset corresponding to the second frequency band, and the fourth indication information indicates second value distribution of maximum transmit power of antenna ports in the second frequency band; and the method further comprises determining maximum transmit power of the plurality of target antenna ports in the target frequency band based on the third full-power transmission codebook subset that is corresponding to the first frequency band and that is indicated by the first indication information, the first value distribution indicated by the second indication information, the fourth full-power transmission codebook subset that is corresponding to the second frequency band and that is indicated by the third indication information, and the second value distribution indicated by the fourth indication information.

19. A device, comprising:
a transceiver;
a non-transitory memory storage comprising instructions; and
one or more processors in communication with the transceiver and the non-transitory memory storage, wherein the one or more processors execute the instructions to:
determine a first full-power transmission codebook subset corresponding to a frequency band supported by a terminal device before antenna port switching of the terminal device; and
determine, according to a specified rule and a plurality of full-power transmission codebook subsets corresponding to a plurality of source frequency bands, a second full-power transmission codebook subset corresponding to a target frequency band after antenna port switching of the terminal device, wherein the plurality of source frequency bands are frequency bands in which a plurality of target antenna ports are located before antenna port switching, the plurality of target antenna ports are antenna ports in the target frequency band after antenna port switching, and the specified rule indicates a correspondence between the first full-power transmission codebook subsets corresponding to the plurality of source frequency bands before antenna port switching and the second full-power transmission codebook subset corresponding to the target frequency band after antenna port switching.

20. A chip, wherein the chip is coupled to a non-transitory memory, and the chip reads a computer program stored in the non-transitory memory, and execute the computer program to:
determine a first full-power transmission codebook subset corresponding to a frequency band supported by a terminal device before antenna port switching of the terminal device; and
determine, according to a specified rule and a plurality of full-power transmission codebook subsets corresponding to a plurality of source frequency bands, a second full-power transmission codebook subset corresponding to a target frequency band after antenna port switching of the terminal device,
wherein the plurality of source frequency bands are frequency bands in which a plurality of target antenna ports are located before antenna port switching, the plurality of target antenna ports are antenna ports in the target frequency band after antenna port switching, and the specified rule indicates a correspondence between the first full-power transmission codebook subsets corresponding to the plurality of source frequency bands before antenna port switching and the second full-power transmission codebook subset corresponding to the target frequency band after antenna port switching.

* * * * *